(12) United States Patent
Wu et al.

(10) Patent No.: US 10,379,322 B2
(45) Date of Patent: Aug. 13, 2019

(54) OPTICAL IMAGING SYSTEM, IMAGING APPARATUS AND ELECTRONIC DEVICE

(71) Applicant: LARGAN PRECISION CO., LTD., Taichung (TW)

(72) Inventors: Chien-Hsun Wu, Taichung (TW); Tzu-Chieh Kuo, Taichung (TW); Kuan-Ming Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 239 days.

(21) Appl. No.: 15/628,992

(22) Filed: Jun. 21, 2017

(65) Prior Publication Data

US 2018/0224633 A1 Aug. 9, 2018

(30) Foreign Application Priority Data

Feb. 8, 2017 (TW) .............................. 106104071 A

(51) Int. Cl.
*G02B 15/14* (2006.01)
*G02B 13/00* (2006.01)
*G02B 13/02* (2006.01)
*G02B 13/14* (2006.01)
*G02B 9/60* (2006.01)
*G02B 13/18* (2006.01)

(52) U.S. Cl.
CPC ......... *G02B 13/0045* (2013.01); *G02B 13/02* (2013.01); *G02B 13/146* (2013.01); *G02B 9/60* (2013.01); *G02B 13/18* (2013.01)

(58) Field of Classification Search
CPC ................................................ G02B 13/0045
See application file for complete search history.

(56) References Cited

U.S. PATENT DOCUMENTS

| | | | |
|---|---|---|---|
| 3,035,490 A | 5/1962 | Tibbetts | |
| 4,441,792 A | 4/1984 | Tateoka | |
| 8,325,429 B2 | 12/2012 | Tang et al. | |
| 2012/0321293 A1 | 12/2012 | Schauss et al. | |
| 2014/0313596 A1 | 10/2014 | Hashimoto | |
| 2016/0011399 A1* | 1/2016 | Hashimoto | G02B 27/0025 359/714 |
| 2016/0274332 A1 | 9/2016 | Tang et al. | |
| 2016/0274333 A1 | 9/2016 | Tang et al. | |
| 2016/0349483 A1 | 12/2016 | Liu et al. | |
| 2016/0349484 A1 | 12/2016 | Liu et al. | |
| 2016/0349487 A1 | 12/2016 | Liu et al. | |
| 2016/0349488 A1 | 12/2016 | Liu et al. | |

FOREIGN PATENT DOCUMENTS

| | | |
|---|---|---|
| CN | 201594156 U | 9/2010 |
| CN | 204229034 U | 3/2015 |
| CN | 105467562 A | 4/2016 |
| JP | S58-184917 | 10/1983 |
| JP | H02-167516 | 6/1990 |
| WO | 2012020554 A1 | 2/2012 |

* cited by examiner

*Primary Examiner* — Alicia M Harrington
(74) *Attorney, Agent, or Firm* — Locke Lord LLP; Tim Tingkang Xia, Esq.

(57) ABSTRACT

An optical imaging system includes five lens elements, the five lens elements being, in order from an object side to an image side: a first lens element having positive refractive power; a second lens element having negative refractive power; a third lens element having positive refractive power; a fourth lens element having positive refractive power; and a fifth lens element having negative refractive power.

40 Claims, 35 Drawing Sheets

OPTICAL IMAGING SYSTEM, IMAGING APPARATUS AND ELECTRONIC DEVICE

RELATED APPLICATIONS

This application claims priority to Taiwan Application Serial Number 106104071, filed on Feb. 8, 2017, which is incorporated by reference herein in its entirety.

BACKGROUND

Technical Field

The present disclosure relates to an optical imaging system and an imaging apparatus, and more particularly, to an optical imaging system and an imaging apparatus applicable to electronic devices.

Description of Related Art

With the rapid developments in technology, various electronic devices equipped with multifunction have become a trend in development. At the mean time, requirements of shooting quality become even higher for wider application ranges, such as electronic devices equipped with both macro shooting and telephoto functions. As a result, using one single shooting module is hard to meet the requirements concurrently. Therefore, electronic devices such as smart phones using shooting modules with dual lens or multiple lenses become the mainstream of development now. For example, a wide angle lens can be used with a small angle telephoto lens or multiple lenses with similar view angle collaborate with each other.

Due to the booming development of portable devices, the requirements of miniaturized shooting modules are also increased. Conventional small angle telephoto lens usually requires a larger electronic image sensor to maintain high imaging quality, thus a lens with larger outer diameter being required, but that contradicts with the requirements of miniaturization. Therefore, a miniaturized small angle telephoto lens with high imaging quality is desired.

SUMMARY

According to one aspect of the present disclosure, an optical imaging system, comprises five lens elements, the five lens elements being, in order from an object side to an image side: a first lens element having positive refractive power; a second lens element having negative refractive power; a third lens element having positive refractive power; a fourth lens element having positive refractive power; and a fifth lens element having negative refractive power, wherein an Abbe number of the third lens element is V3, an Abbe number of the fifth lens element is V5, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following conditions are satisfied:

$20.0 < V3+V5 < 70.0;$ $4.4 < (T12+T23)/(T34+T45) < 25;$ $0.05 < T12/T23 < 3.3.$

According to another aspect of the present disclosure, an optical imaging system, comprises five lens elements, the five lens elements being, in order from an object side to an image side: a first lens element having positive refractive power; a second lens element with negative refractive power having an image-side surface being concave in a paraxial region thereof; a third lens element with positive refractive power having an object-side surface being convex in a paraxial region thereof; a fourth lens element having positive refractive power; and a fifth lens element having negative refractive power having an image-side surface being concave in a paraxial region thereof, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the optical imaging system is f, a curvature radius of the object-side surface of the third lens element is R5, and the following conditions are satisfied:

$4.4 < (T12+T23)/(T34+T45) < 100;$ $0.19 < T12/T23 < 9.7;$ $0.22 \le f/R5 < 8.0.$

According to another aspect of the present disclosure, an imaging apparatus comprises the aforementioned optical imaging system and an image sensor disposed on an image surface of the optical imaging system.

According to another aspect of the present disclosure, an electronic device comprises the aforementioned imaging apparatus.

According to another aspect of the present disclosure, an optical imaging system, comprises five lens elements, the five lens elements being, in order from an object side to an image side: a first lens element having positive refractive power; a second lens element having negative refractive power; a third lens element having positive refractive power; a fourth lens element having positive refractive power; and a fifth lens element having negative refractive power, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a central thickness of the third lens element is CT3, a composite focal length of the first lens element and the second lens element is f12, a composite focal length of the third lens element, the fourth lens element and the fifth lens element is f345, and the following conditions are satisfied:

$2.7 < (T12+T23)/(T34+T45) < 100;$ $0.50 < T23/CT3 < 1.24;$ $-5.5 \le f12/f345 < 0.$

According to yet another aspect of the present disclosure, an optical imaging system, comprises five lens elements, the five lens elements being, in order from an object side to an image side: a first lens element having positive refractive power; a second lens element having negative refractive power; a third lens element having positive refractive power; a fourth lens element having positive refractive power; and a fifth lens element having negative refractive power, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the optical imaging system is f, a curvature radius of an image-side surface of the fifth lens element is R10, and the following conditions are satisfied:

$4.4 < (T12+T23)/(T34+T45) < 20;$ $4.0 < f/R10 < 10.$

DETAILED DESCRIPTION

Figure 1A:
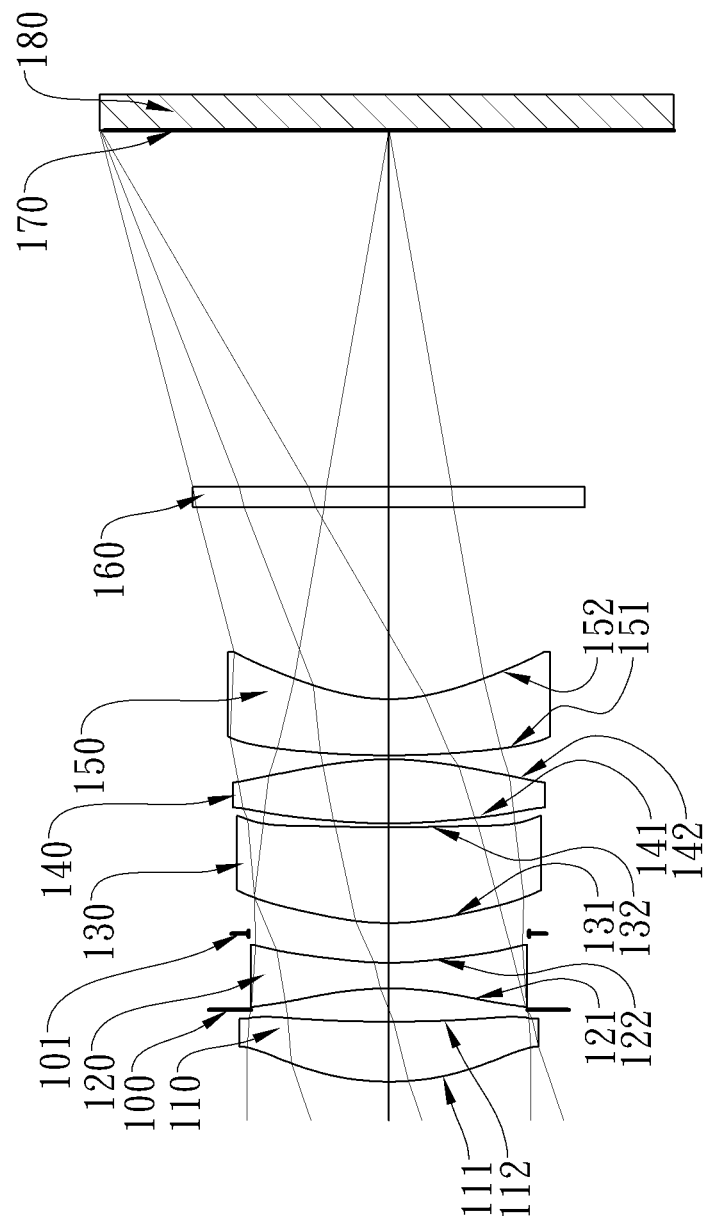
FIG. 1A is a schematic view of an imaging apparatus according to the 1st embodiment of the present disclosure.

The present disclosure provides an optical imaging system including five lens elements, the five lens elements being, in order from an object side to an image side, a first lens element, a second lens element, a third lens element, a fourth lens element, and a fifth lens element.

The first lens element with positive refractive power can provide the system with power to converge the light.

The second lens element with negative refractive power can correct the spherical and chromatic aberrations resulted from the first lens element. The second lens element may have an image-side surface being concave in a paraxial region thereof so as to favorably correct the aberrations in an off-axial region.

The third lens element with positive refractive power can reduce the incident angle of light on an image surface and also reduce the outer diameter of the backend in the system. The third lens element may have an object-side surface being convex in a paraxial region so as to correct the aberrations in the off-axial region with the second lens element and further reduce the outer diameter of the system.

The fourth lens element with positive refractive power may further reduce the incident angle of light on the image surface to reduce the outer diameter of the backend in the system.

The fifth lens element with negative refractive power can favorably correct the astigmatism and field curvature of the system. The fifth lens element may have an image-side surface being concave in a paraxial region thereof so as to correct Petzval sum, making the image surface even flat and further enhance the correction of the astigmatism to obtain an increased sharpness of the image. The fifth lens element may have at least one inflection point on at least one surface of an object-side surface and the image-side surface thereof to favorably correct the aberrations in the off-axial region.

When at least three lens elements among the first lens element, the second lens element, the third lens element, the fourth lens element and the fifth lens element have an Abbe number less than 40.0, the chromatic aberration of the system can be corrected and the features of small angle lens can be favorably exhibited.

When an Abbe number of the third lens element is V3, an Abbe number of the fifth lens element is V5, and the following condition can be satisfied: $20.0 < V3+V5 < 70.0$, the chromatic aberrations of the system can be reduced and the features of small angle lens can be exhibited.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following conditions can be satisfied: $2.7 < (T12+T23)/(T34+T45) < 100$, the spacing between the lens elements can be arranged in a suitable ratio so as to favorably make the second lens element correct the spherical aberrations and chromatic aberrations resulted from the first lens element. Also, by making enough space in a peripheral region with the shape of the third lens element, the fourth lens element and the fifth lens element to correct astigmatism and field curvature in the off-axial region, an increased area of the image surface in the system can be obtained while remaining a relative small outer diameter. Preferably, the following condition can be satisfied: $4.4 < (T12+T23)/(T34+T45) < 100$. Preferably, the following condition can be satisfied: $4.4 < (T12+T23)/(T34+T45) < 25$. Preferably, the following condition can be satisfied: $4.4 < (T12+T23)/(T34+T45) < 20$.

When the axial distance between the first lens element and the second lens element is T12, the axial distance between the second lens element and the third lens element is T23, and the following condition can be satisfied: $0.05 < T12/T23 < 9.7$, an appropriate spacing between the first lens element and the second lens element can be obtained to correct the spherical aberrations and chromatic aberrations caused by the first lens element and also make enough space in the backend of the system to correct the aberrations in the off-axial region so as to reduce the color shifts and make the image sharper. Preferably, the following condition can be satisfied: $0.19 < T12/T23 < 9.7$. Besides, the following condition of the optical imaging system can be satisfied: $0.05 < T12/T23 < 3.3$. Preferably, the following condition can be satisfied: $0.19 < T12/T23 < 3.3$.

When a focal length of the optical imaging system is f, a curvature radius of the object-side surface of the third lens element is R5, and the following condition can be satisfied: $0.22 < f/R5 < 8.0$, the outer diameter of the system can be reduced while correcting the aberrations in the off-axial region. Preferably, the following condition can be satisfied: $1.5 < f/R5 < 5.5$.

When the axial distance between the second lens element and the third lens element is T23, a central thickness of the third lens element is CT3, and the following condition can be satisfied: $0.50 < T23/CT3 < 1.24$, the astigmatism and field curvature in an off-axial region caused by the system can be favorably corrected to avoid image distortions. Preferably, the following condition can be satisfied: $0.50 < T23/CT3 < 1.0$.

When a composite focal length of the first lens element and the second lens element is f12, a composite focal length of the third lens element, the fourth lens element and the fifth lens element is f345, and the following condition can be satisfied: $-5.5 < f12/f345 < 0$, the outer diameter in the backend of the system can be favorably reduced by appropriately configuring the refractive power in the frontend and the backend of the system. Preferably, the following condition can be satisfied: $-2.5 < f12/f345 < -0.58$.

When the focal length of the optical imaging system is f, a curvature radius of the image-side surface of the fifth lens element is R10, and the following condition can satisfied: $4.0 < f/R10 < 10$, the incident angle of light on the image surface can be reduced and the occurrence of astigmatism can be favorably reduced.

When an axial distance between the image-side surface of the fifth lens element and the image surface is BL (calculated for the same when the optical path is deflected), the curvature radius of the image-side surface of the fifth lens element is R10, and the following conditions can be satisfied: $3.0 < BL/R10$, the occurrence of astigmatism can be reduced and the position of exit pupil can be shifted toward the object side to reduce the incident angle of light on the image surface.

When the focal length of the optical imaging system is f, a focal length of the first lens element is f1, a focal length of the second lens element is f2, a focal length of the third lens element is f3, a focal length of the fourth lens element is f4, a focal length of the fifth lens element is f5, and the following condition can be satisfied: $8.0 < |f/f1| + |f/f3| + |f/f4| + |f/f5| < 20.0$, each lens element can obtain sufficient refractive power to correct astigmatism and remain a relatively small outer diameter and a suitable back focal length for the system while correcting the aberration in the off-axial region.

When the focal length of the optical imaging system is f, an axial distance between an object-side surface of the first lens element and the image-side surface of the fifth lens element is TD, and the following condition can be satisfied: $1.40 < f/TD$, the features of long focus small angle lens can be favorably performed. Preferably, the following condition can be satisfied: $1.90 < f/TD$.

When the focal length of the first lens element is f1, the focal length of the second lens element is f2, and the following condition can be satisfied: $|f2|/f1 < 1.0$, the refractive power in the frontend of the system will not be made too strong so as to favorably correct the aberrations and reduce the outer diameter of the system.

The optical imaging system may further include at least one reflective component such as prism or mirror to make the spatial arrangement more flexible. The at least one reflective component can be disposed at an object side of the first lens element so as to favorably reduce the height of the optical imaging system. The number of the at least one reflective component may be more than 2 according to the requirements of design and the configuration of the reflective surface can be adjusted according to the requirement such as the spatial arrangement. Also, the height, the length and the width of the prism and mirror can be made unequal to reduce the volume occupied. Materials such as glass or plastic can be selected as the material of the prism according to the design. When the at least one reflective component is a prism, the axial distance between the object-side surface of the first lens element and the image-side surface of the fifth lens element is TD, a total length of internal optical paths of the prism is TP, and the following condition can be satisfied: 0.20<TD/TP<1.35, the volume of the system can be maintained.

When a vertical distance between a maximum effective diameter position on the object-side surface of the first lens element and an optical axis is Y11, a vertical distance between a maximum effective diameter position on the image-side surface of the fifth lens element and the optical axis is Y52, and the following condition can be satisfied: 0.80<Y11/Y52<1.50, the incident and emergent angle of the light can be limited in a suitable range to favorably maintain the volume of the system when the image surface is increased. Preferably, the following condition can be satisfied: 0.90<Y11/Y52<1.30.

The first lens element may have at least one critical point in an off-axial region of an image-side surface thereof. When a vertical distance between the at least one critical point and the optical axis is Yc12, a vertical distance between a maximum effective diameter position on the image-side surface of the first lens element and the optical axis is Y12, and the following condition can be satisfied: 0.60<Yc12/Y12<1.0, the aberrations in the off-axial region can be favorably corrected and the volume of the system can be compressed.

When an Abbe number of the fourth lens element is V4, the Abbe number of the fifth lens element is V5, and the following condition can be satisfied: 1.3<V4/V5, the chromatic aberration caused by the system can be reduced to reduce the occurrence of color shifts.

When the axial distance between the object-side surface of the first lens element and the image-side surface of the fifth lens element is TD, and the following condition can be satisfied: TD<7 mm, the volume of the system can be compressed.

According to the optical imaging system of the present disclosure, the definition of the inflection point is the transition point where the curvature centers along the curve of the lens element surface from the optical axis to a peripheral region transit from an object side to an image side (or from an image side to an object side). The definition of the critical point is a point on the surface of the lens element where the tangential plane of the point is perpendicular to the optical axis.

According to the optical imaging system of the present disclosure, the lens elements thereof can be made of glass or plastic material. When the lens elements are made of glass material, the distribution of the refractive power of the optical imaging system may be more flexible to design. When the lens elements are made of plastic material, the manufacturing cost can be effectively reduced. Furthermore, surfaces of each lens element can be arranged to be aspheric (ASP). Since these aspheric surfaces can be easily formed into shapes other than spherical shapes so as to have more controllable variables for eliminating aberrations and to further decrease the required quantity of lens elements, the total track length of the optical imaging system can be effectively reduced.

According to the optical imaging system of the present disclosure, the optical imaging system can include at least one stop, such as an aperture stop, a glare stop or a field stop, so as to favorably reduce the amount of stray light and thereby improving the image quality.

According to the optical imaging system of the present disclosure, an aperture stop can be configured as a front stop or a middle stop. A front stop disposed between an imaged object and the first lens element can provide a longer distance between the exit pupil and the image surface so that there is a telecentric effect for improving the image-sensing efficiency of an image sensor, such as a CCD or CMOS sensor. A middle stop disposed between the first lens element and the image surface is favorable for enlarging the field of view, thereby providing the optical imaging system with the advantage of a wide-angle lens.

According to the optical imaging system of the present disclosure, when the lens element has a convex surface and the region of convex shape is not defined, it indicates that the surface can be convex in the paraxial region thereof. When the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the optical imaging system of the present disclosure, the image surface of the optical imaging system, based on the corresponding image sensor, can be a plane or a curved surface with an arbitrary curvature, especially a curved surface being concave facing towards the object side.

According to the above description of the present disclosure, the following 1st-17th specific embodiments are provided for further explanation.

1st Embodiment

Figure 1B:
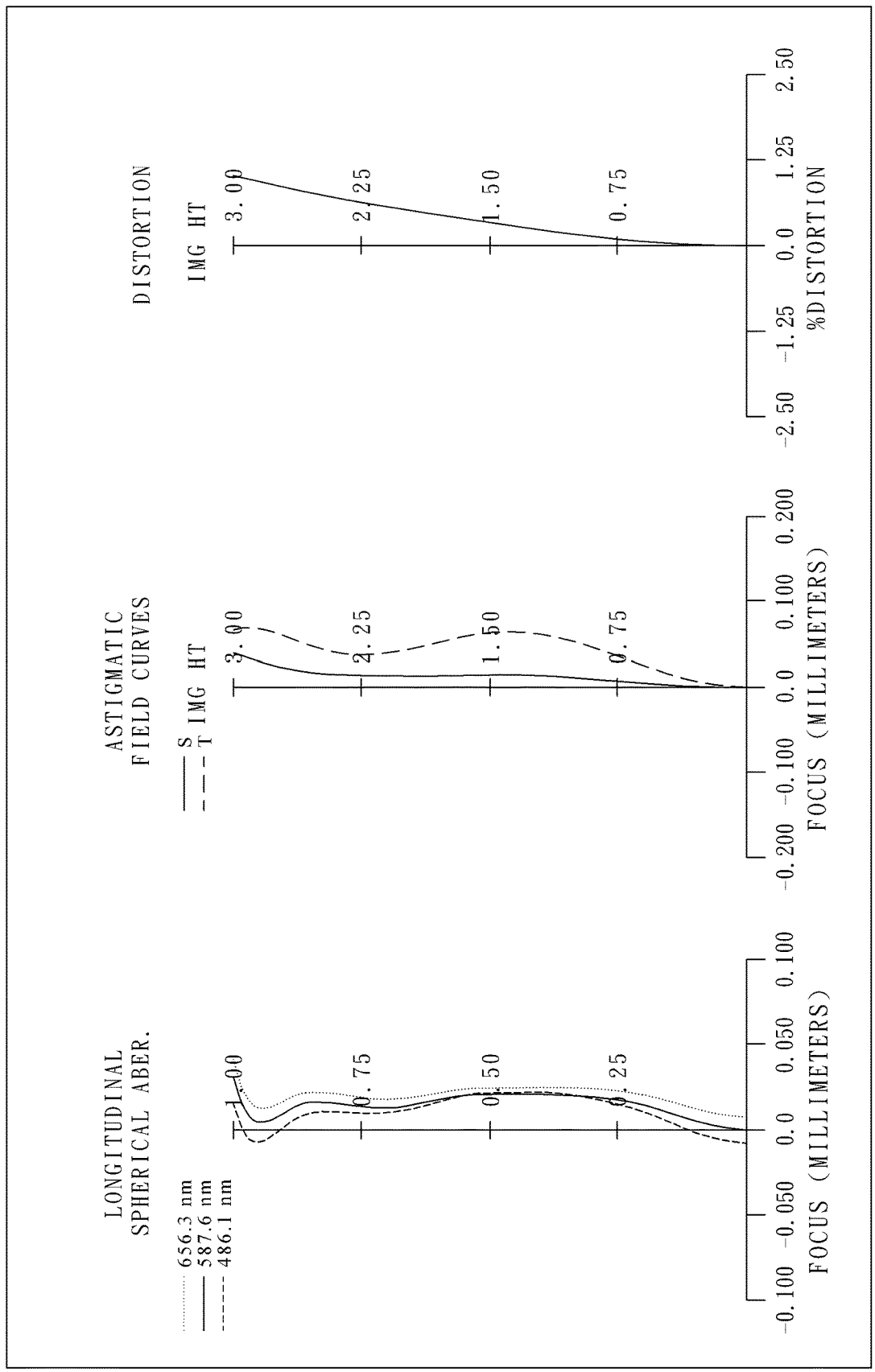
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes an optical imaging system (not otherwise herein labeled) of the present disclosure and an image sensor 180. The optical imaging system includes, in order from an object side to an image side, a first lens element 110, an aperture stop 100, a second lens element 120, a stop 101, a third lens element 130, a fourth lens element 140, and a fifth lens element 150. The optical imaging system includes five lens elements (110, 120, 130, 140 and 150) without any other lens elements being inserted between the first lens element 110 and the fifth lens element 150.

The first lens element 110 with positive refractive power has an object-side surface 111 being convex in a paraxial region thereof, an image-side surface 112 being concave in a paraxial region thereof, both the object-side surface 111 and the image-side surface 112 being aspheric, and one critical point in an off-axial region of the image-side surface 112 thereof. The first lens element 110 is made of plastic material.

The second lens element 120 with negative refractive power has an object-side surface 121 being concave in a paraxial region thereof, an image-side surface 122 being concave in a paraxial region thereof, and both the object-side surface 121 and the image-side surface 122 being aspheric. The second lens element 120 is made of plastic material.

The third lens element 130 with positive refractive power has an object-side surface 131 being convex in a paraxial region thereof, an image-side surface 132 being concave in a paraxial region thereof, and both the object-side surface 131 and the image-side surface 132 being aspheric. The third lens element 130 is made of plastic material.

The fourth lens element 140 with positive refractive power has an object-side surface 141 being convex in a paraxial region thereof, an image-side surface 142 being convex in a paraxial region thereof, and both the object-side surface 141 and the image-side surface 142 being aspheric. The fourth lens element 140 is made of plastic material.

The fifth lens element 150 with negative refractive power has an object-side surface 151 being convex in a paraxial region thereof, an image-side surface 152 being concave in a paraxial region thereof, and both the object-side surface 151 and the image-side surface 152 being aspheric. The fifth lens element 150 is made of plastic material.

The optical imaging system further includes an IR cut filter 160 located between the fifth lens element 150 and an image surface 170. The IR cut filter 160 is made of glass material and will not affect the focal length of the optical imaging system. The image sensor 180 is disposed on or near the image surface 170 of the optical imaging system.

The detailed optical data of the 1st embodiment are shown in TABLE 1, and the aspheric surface data are shown in HFOV is a half of the maximal field of view, and surfaces #0 to #15 refer to the surfaces in order from the object side to the image side. The aspheric surface data are shown in TABLE 2, wherein k is the conic coefficient in the equation of the aspheric surface profiles, and A4-A16 refer to the 4th to 16th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

(1st Embodiment)
f = 8.56 mm, Fno = 2.90, HFOV = 19.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.698 | ASP | 0.625 | Plastic | 1.511 | 56.8 | 6.23 |
| 2 | | 16.378 | ASP | 0.123 | | | | |
| 3 | Ape. Stop | Plano | | 0.223 | | | | |
| 4 | Lens 2 | -3.936 | ASP | 0.267 | Plastic | 1.582 | 30.2 | -2.79 |
| 5 | | 2.843 | ASP | 0.305 | | | | |
| 6 | Stop | Plano | | 0.109 | | | | |
| 7 | Lens 3 | 2.471 | ASP | 0.998 | Plastic | 1.582 | 30.2 | 4.62 |
| 8 | | 25.512 | ASP | 0.040 | | | | |
| 9 | Lens 4 | 6.043 | ASP | 0.669 | Plastic | 1.544 | 56.0 | 3.77 |
| 10 | | -2.980 | ASP | 0.040 | | | | |
| 11 | Lens 5 | 9.837 | ASP | 0.586 | Plastic | 1.566 | 37.4 | -4.11 |
| 12 | | 1.839 | ASP | 2.000 | | | | |
| 13 | IR Cut Filter | Plano | | 0.210 | Glass | 1.517 | 64.2 | — |
| 14 | | Plano | | 3.710 | | | | |
| 15 | Image Surface | Plano | | — | | | | |

* Reference wavelength is d-line 587.6 nm.
* The effective radius of Surface 6 is 1.460 mm.
* The effective radius of Surface 12 is 1.610 mm.

TABLE 2

Aspheric Coefficients

| Surface # | 1 | 2 | 4 | 5 | 7 |
|---|---|---|---|---|---|
| k = | -6.8674E-01 | -5.6950E+01 | -3.0105E+01 | -8.8732E+00 | -3.0599E+00 |
| A4 = | -5.1051E-04 | 1.0488E-02 | -1.1315E-01 | -1.2901E-01 | -5.0104E-02 |
| A6 = | 4.1743E-03 | -4.2618E-03 | 1.4140E-01 | 1.2823E-01 | -2.5609E-03 |
| A8 = | -4.6314E-03 | 1.6658E-03 | -8.1689E-02 | -5.2762E-02 | 2.6136E-02 |
| A10 = | 5.7883E-04 | -1.6959E-03 | 2.6897E-02 | 6.2410E-03 | -1.5201E-02 |
| A12 = | -1.9840E-04 | 1.3562E-04 | -4.6262E-03 | 2.7953E-03 | 4.3035E-03 |
| A14 = | | | 2.5941E-04 | -1.1153E-03 | -5.4350E-04 |
| A16 = | | | | 1.0443E-04 | 7.0862E-06 |

| Surface # | 8 | 9 | 10 | 11 | 12 |
|---|---|---|---|---|---|
| k = | 3.8161E+01 | -9.7706E+01 | -2.6316E+01 | 1.9811E+01 | -9.8748E+00 |
| A4 = | 3.4428E-02 | 7.7614E-02 | 9.1962E-03 | 5.3249E-02 | 9.4626E-02 |
| A6 = | -1.1559E-01 | -1.5216E-01 | -7.5189E-02 | -1.7085E-01 | -1.4222E-01 |
| A8 = | 1.2665E-01 | 1.4140E-01 | 1.0325E-01 | 2.2452E-01 | 1.5136E-01 |
| A10 = | -6.8049E-02 | -6.7211E-02 | -6.3260E-02 | -1.5572E-01 | -1.0367E-01 |
| A12 = | 2.0835E-02 | 1.7309E-02 | 1.9905E-02 | 5.9324E-02 | 4.2269E-02 |
| A14 = | -3.1950E-03 | -2.3674E-03 | -3.2014E-03 | -1.1654E-02 | -9.2229E-03 |
| A16 = | 1.4868E-04 | 1.3526E-04 | 2.2127E-04 | 9.2410E-04 | 8.2864E-04 |

TABLE 2, wherein the units of the curvature radius, the thickness and the focal length are expressed in mm, and The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, a focal length of the optical imaging system is f, an f-number of the optical imaging system is Fno, a half of a maximal field of view of the optical imaging system is HFOV, and these parameters have the following values: f=8.56 mm; Fno=2.90; and HFOV=19.1 degrees.

In the 1st embodiment, an Abbe number of the third lens element 130 is V3, an Abbe number of the fifth lens element 150 is V5, and they satisfy the condition: V3+V5=67.7.

In the 1st embodiment, an Abbe number of the fourth lens element 140 is V4, the Abbe number of the fifth lens element 150 is V5, and they satisfy the condition: V4/V5=1.50.

In the 1st embodiment, an axial distance between the image-side surface 152 of the fifth lens element 150 and the image surface 170 is BL, a curvature radius of the image-side surface 152 of the fifth lens element 150 is R10, and they satisfy the condition: BL/R10=3.22.

In the 1st embodiment, an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and they satisfy the condition: (T12+T23)/(T34+T45)=9.50.

In the 1st embodiment, the axial distance between the first lens element 110 and the second lens element 120 is T12, the axial distance between the second lens element 120 and the third lens element 130 is T23, and they satisfy the condition: T12/T23=0.84.

In the 1st embodiment, the axial distance between the second lens element 120 and the third lens element 130 is T23, a central thickness of the third lens element 130 is CT3, and they satisfy the condition: T23/CT3=0.41.

In the 1st embodiment, an axial distance between the object-side surface 111 of the first lens element 110 and the image-side surface 152 of the fifth lens element 150 is TD, and it satisfies the condition: TD=3.99 mm.

In the 1st embodiment, the focal length of the optical imaging system is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, and they satisfy the condition: |f/f1|+|f/f2|+|f/f3|+|f/f4|+|f/f5|=10.64.

In the 1st embodiment, the focal length of the optical imaging system is f, a curvature radius of the object-side surface 131 of the third lens element 130 is R5, and they satisfy the condition: f/R5=3.46.

In the 1st embodiment, the focal length of the optical imaging system is f, the curvature radius of the image-side surface 152 of the fifth lens element 150 is R10, and they satisfy the condition: f/R10=4.65.

In the 1st embodiment, the focal length of the optical imaging system is f, the axial distance between the object-side surface 111 of the first lens element 110 and the image-side surface 152 of the fifth lens element 150 is TD, and they satisfy the condition: f/TD=2.15.

In the 1st embodiment, a composite focal length of the first lens element 110 and the second lens element 120 is f12, a composite focal length of the third lens element 130, the fourth lens element 140 and the fifth lens element 150 is f345, and they satisfy the condition: f12/f345=−2.09.

In the 1st embodiment, the focal length of the first lens element 110 is f1, the focal length of the second lens element 120 is f2, and they satisfy the condition: |f2|/f1=0.45.

In the 1st embodiment, a vertical distance between a maximum effective diameter position on the object-side surface 111 of the first lens element 110 and an optical axis is Y11, a vertical distance between a maximum effective diameter position on the image-side surface 152 of the fifth lens element 150 and the optical axis is Y52, and they satisfy the condition: Y11/Y52=0.97.

In the 1st embodiment, a vertical distance between the critical point in the off-axial region of the image-side surface 112 of the first lens element 110 and an optical axis is Yc12, a vertical distance between a maximum effective diameter position on the image-side surface 112 of the first lens element 110 and the optical axis is Y12, and they satisfy the condition: Yc12/Y12=0.87.

2nd Embodiment

Figure 2A:
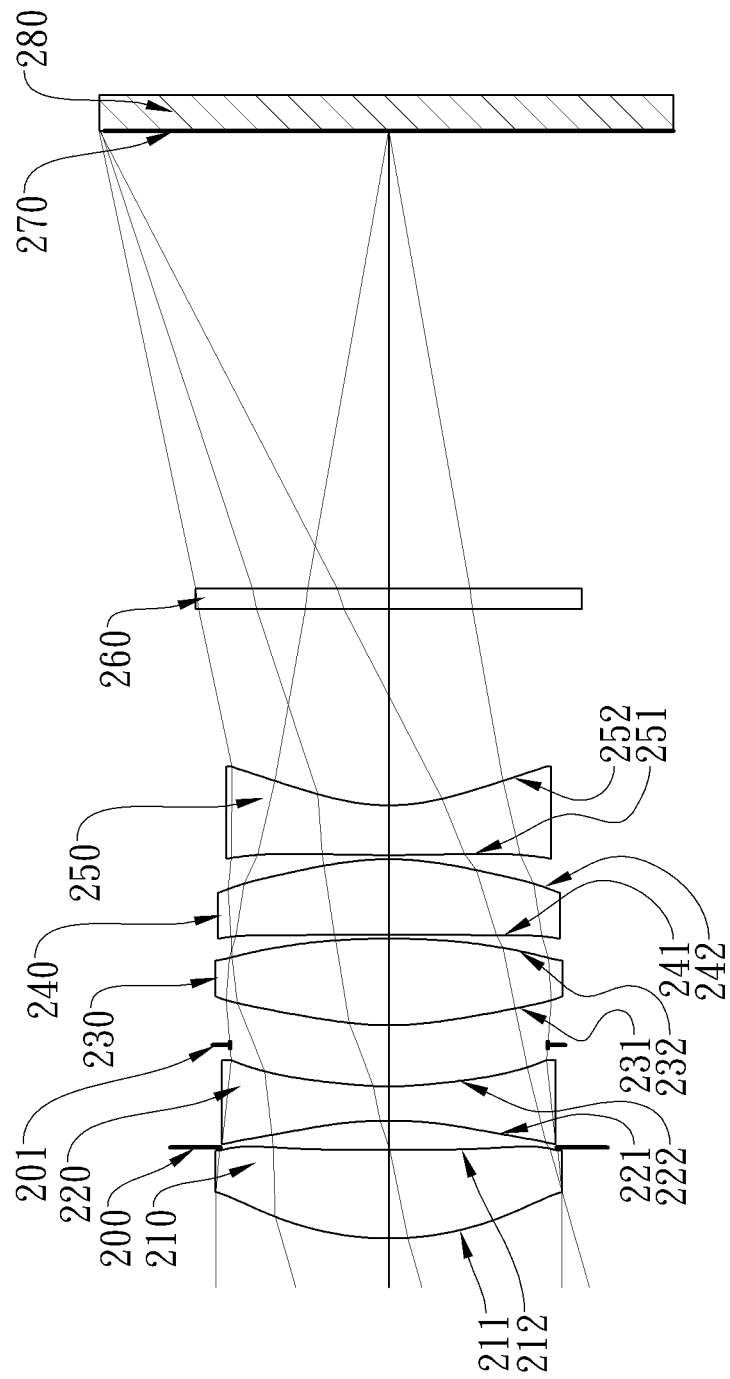
FIG. 2A is a schematic view of an imaging apparatus according to the 2nd embodiment of the present disclosure.
Figure 2B:
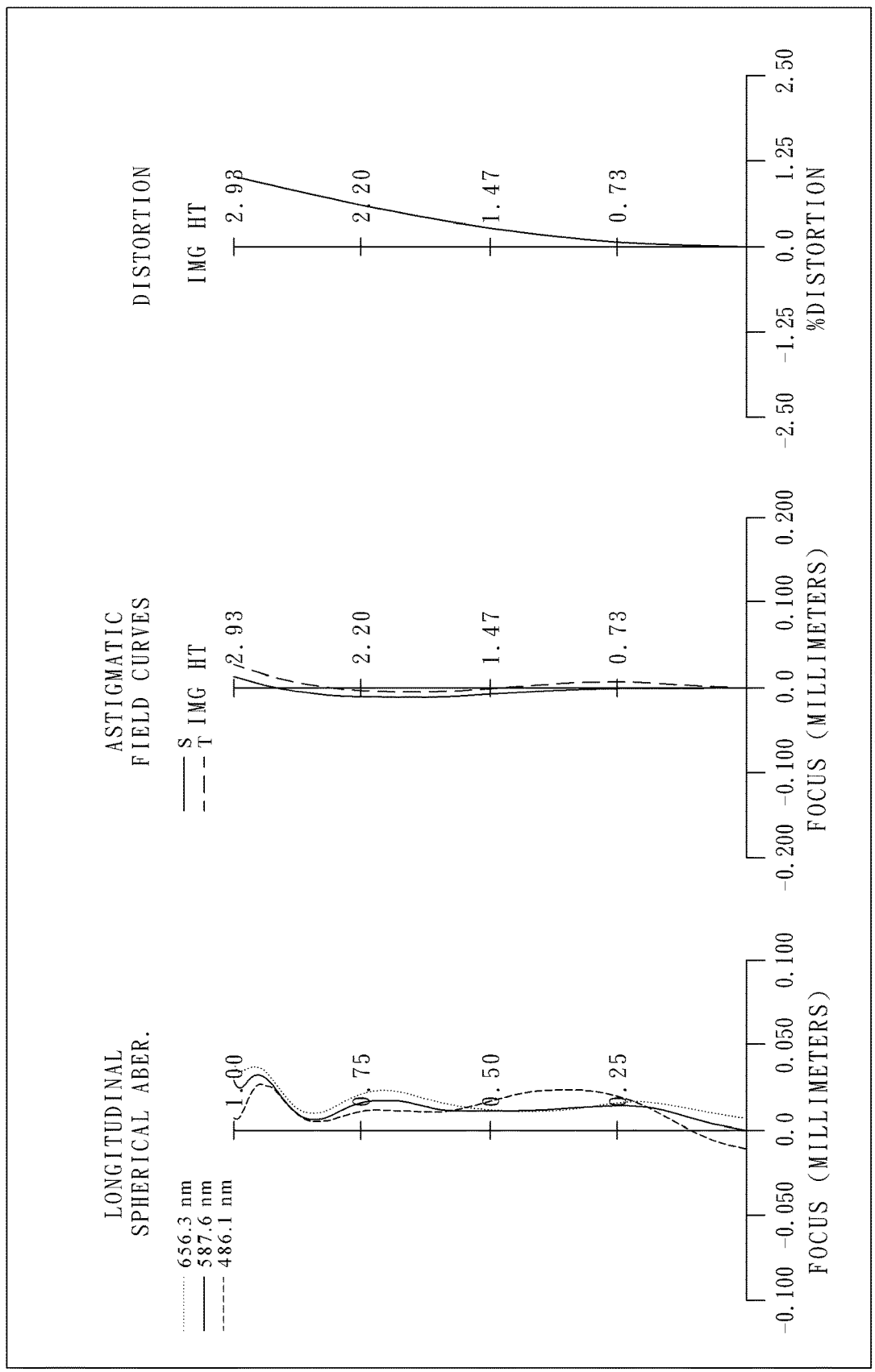
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes an optical imaging system (not otherwise herein labeled) of the present disclosure and an image sensor 280. The optical imaging system includes, in order from an object side to an image side, a first lens element 210, an aperture stop 200, a second lens element 220, a stop 201, a third lens element 230, a fourth lens element 240, and a fifth lens element 250. The optical imaging system includes five lens elements (210, 220, 230, 240 and 250) without any other lens elements being inserted between the first lens element 210 and the fifth lens element 250.

The first lens element 210 with positive refractive power has an object-side surface 211 being convex in a paraxial region thereof, an image-side surface 212 being concave in a paraxial region thereof, both the object-side surface 211 and the image-side surface 212 being aspheric, and one critical point in an off-axial region of the image-side surface 212 thereof. The first lens element 210 is made of plastic material.

The second lens element 220 with negative refractive power has an object-side surface 221 being concave in a paraxial region thereof, an image-side surface 222 being concave in a paraxial region thereof, and both the object-side surface 221 and the image-side surface 222 being aspheric. The second lens element 220 is made of plastic material.

The third lens element 230 with positive refractive power has an object-side surface 231 being convex in a paraxial region thereof, an image-side surface 232 being convex in a paraxial region thereof, and both the object-side surface 231 and the image-side surface 232 being aspheric. The third lens element 230 is made of plastic material.

The fourth lens element 240 with positive refractive power has an object-side surface 241 being concave in a paraxial region thereof, an image-side surface 242 being convex in a paraxial region thereof, and both the object-side surface 241 and the image-side surface 242 being aspheric. The fourth lens element 240 is made of plastic material.

The fifth lens element 250 with negative refractive power has an object-side surface 251 being convex in a paraxial region thereof, an image-side surface 252 being concave in a paraxial region thereof, both the object-side surface 251 and the image-side surface 252 being aspheric, and at least one inflection point on both the object-side surface 251 and the image-side surface 252 thereof. The fifth lens element 250 is made of plastic material.

The optical imaging system further includes an IR cut filter 260 located between the fifth lens element 250 and an image surface 270. The IR cut filter 260 is made of glass material and will not affect the focal length of the optical imaging system. The image sensor 280 is disposed on or near the image surface 270 of the optical imaging system.

The detailed optical data of the 2nd embodiment are shown in TABLE 3, and the aspheric surface data are shown in TABLE 4, wherein the units of the curvature radius, the thickness and the focal length are expressed in mm, and HFOV is a half of the maximal field of view.

TABLE 3

(2nd Embodiment)
f = 10.09 mm, Fno = 2.86, HFOV = 16.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.134 | ASP | 0.901 | Plastic | 1.545 | 56.0 | 6.01 |
| 2 | | 65.005 | ASP | 0.028 | | | | |
| 3 | Ape. Stop | Plano | | 0.271 | | | | |
| 4 | Lens 2 | −5.029 | ASP | 0.350 | Plastic | 1.639 | 23.3 | −3.01 |
| 5 | | 3.195 | ASP | 0.422 | | | | |
| 6 | Stop | Plano | | 0.202 | | | | |
| 7 | Lens 3 | 3.123 | ASP | 0.884 | Plastic | 1.660 | 20.4 | 3.44 |
| 8 | | −7.388 | ASP | 0.040 | | | | |
| 9 | Lens 4 | −22.929 | ASP | 0.771 | Plastic | 1.544 | 55.9 | 5.34 |
| 10 | | −2.608 | ASP | 0.040 | | | | |
| 11 | Lens 5 | 26.987 | ASP | 0.508 | Plastic | 1.639 | 23.3 | −3.30 |
| 12 | | 1.939 | ASP | 2.000 | | | | |
| 13 | IR Cut Filter | Plano | | 0.210 | Glass | 1.517 | 64.2 | — |
| 14 | | Plano | | 4.667 | | | | |
| 15 | Image Surface | Plano | | — | | | | |

* Reference wavelength is d-line 587.6 nm.
* The effective radius of Surface 1 is 1.765 mm.
* The effective radius of Surface 6 is 1.620 mm.
* The effective radius of Surface 12 is 1.600 mm.

TABLE 4

Aspheric Coefficients

| Surface # | 1 | 2 | 4 | 5 | 7 |
|---|---|---|---|---|---|
| k = | −4.3492E−01 | −1.7837E+01 | −5.1345E+01 | −7.1118E+00 | −2.1010E+00 |
| A4 = | 2.0240E−03 | 1.2371E−02 | −1.1773E−01 | −1.2316E−01 | −4.7105E−02 |
| A6 = | 3.0745E−03 | −2.5422E−03 | 1.4085E−01 | 1.2874E−01 | −3.7118E−03 |
| A8 = | −3.4964E−03 | 1.5729E−03 | −8.1908E−02 | −5.4261E−02 | 2.4719E−02 |
| A10 = | 1.1347E−03 | −1.5422E−03 | 2.6562E−02 | 5.9801E−03 | −1.5507E−02 |
| A12 = | −1.7939E−04 | 2.3627E−04 | −4.6977E−03 | 3.0622E−03 | 4.3067E−03 |
| A14 = | | | 3.5545E−04 | −1.0623E−03 | −5.3081E−04 |
| A16 = | | | | 9.7213E−05 | 2.2613E−05 |

| Surface # | 8 | 9 | 10 | 11 | 12 |
|---|---|---|---|---|---|
| k = | −6.0684E+01 | −9.0000E+01 | −2.5148E+01 | 8.6815E+01 | −1.2797E+01 |
| A4 = | 3.0165E−02 | 7.8571E−02 | 5.3336E−03 | 4.6721E−02 | 8.8766E−02 |
| A6 = | −1.1746E−01 | −1.5267E−01 | −7.5867E−02 | −1.7123E−01 | −1.4228E−01 |
| A8 = | 1.2580E−01 | 1.4073E−01 | 1.0353E−01 | 2.2469E−01 | 1.5124E−01 |
| A10 = | −6.8593E−02 | −6.7318E−02 | −6.3085E−02 | −1.5602E−01 | −1.0363E−01 |
| A12 = | 2.0578E−02 | 1.7260E−02 | 1.9829E−02 | 5.9204E−02 | 4.2230E−02 |
| A14 = | −3.2866E−03 | −2.3291E−03 | −3.2043E−03 | −1.1661E−02 | −9.2343E−03 |
| A16 = | 2.2518E−04 | 1.3821E−04 | 2.1591E−04 | 9.3793E−04 | 8.3277E−04 |

In the 2nd embodiment, the equation of the aspheric surface profiles of the aforementioned lens elements is the same as the equation of the 1st embodiment. Also, the definitions of these parameters shown in table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in table below.

| 2nd Embodiment | | | |
|---|---|---|---|
| f [mm] | 10.09 | TD | 4.42 |
| Fno | 2.86 | $|f/f1| + |f/f2| + |f/f3| + |f/f4| + |f/f5|$ | 12.91 |
| HFOV [deg.] | 16.0 | f/R5 | 3.23 |
| V3 + V5 | 43.7 | f/R10 | 5.20 |
| V4/V5 | 2.40 | f/TD | 2.28 |
| BL/R10 | 3.55 | f12/f345 | −2.28 |
| (T12 + T23)/(T34 + T45) | 11.54 | |f2|/f1 | 0.50 |
| T12/T23 | 0.48 | Y11/Y52 | 1.10 |
| T23/CT3 | 0.71 | Yc12/Y12 | 0.82 |

3rd Embodiment

Figure 3A:
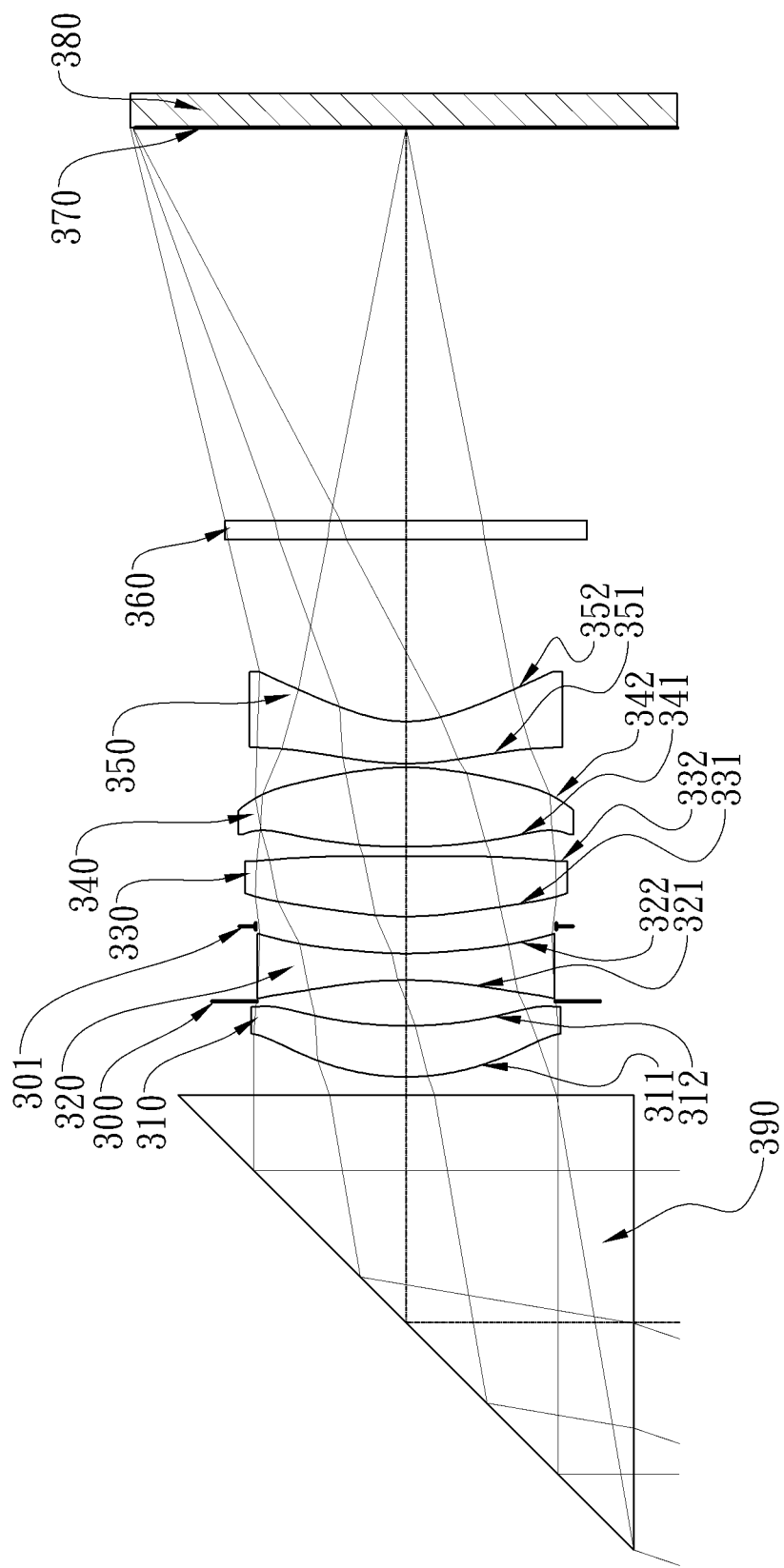
FIG. 3A is a schematic view of an imaging apparatus according to the 3rd embodiment of the present disclosure.
Figure 3B:
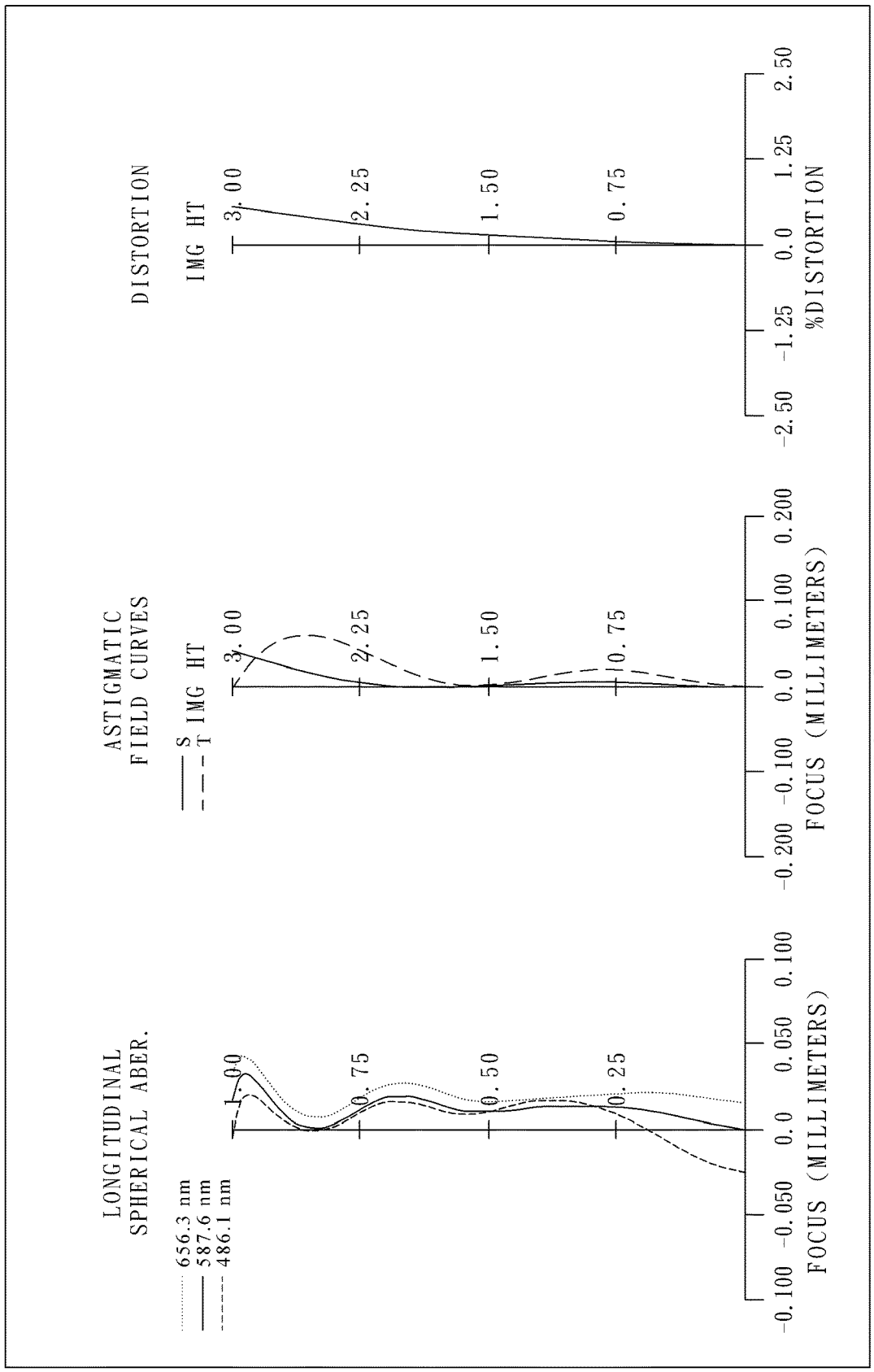
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes an optical imaging system (not otherwise herein labeled) of the present disclosure and an image sensor 380. The optical imaging system includes, in order from an object side to an image side, a first lens element 310, an aperture stop 300, a second lens element 320, a stop 301, a third lens element 330, a fourth lens element 340, and a fifth lens element 350. The optical imaging system includes five lens elements (310, 320, 330, 340 and 350) without any other lens elements being inserted between the first lens element 310 and the fifth lens element 350.

The first lens element 310 with positive refractive power has an object-side surface 311 being convex in a paraxial region thereof, an image-side surface 312 being concave in a paraxial region thereof, both the object-side surface 311 and the image-side surface 312 being aspheric, and one critical point in an off-axial region of the image-side surface 312 thereof. The first lens element 310 is made of plastic material.

The second lens element 320 with negative refractive power has an object-side surface 321 being concave in a paraxial region thereof, an image-side surface 322 being concave in a paraxial region thereof, and both the object-side surface 321 and the image-side surface 322 being aspheric. The second lens element 320 is made of plastic material.

The third lens element 330 with positive refractive power has an object-side surface 331 being convex in a paraxial region thereof, an image-side surface 332 being concave in a paraxial region thereof, and both the object-side surface 331 and the image-side surface 332 being aspheric. The third lens element 330 is made of plastic material.

The fourth lens element 340 with positive refractive power has an object-side surface 341 being convex in a paraxial region thereof, an image-side surface 342 being convex in a paraxial region thereof, and both the object-side surface 341 and the image-side surface 342 being aspheric. The fourth lens element 340 is made of plastic material.

The fifth lens element 350 with negative refractive power has an object-side surface 351 being convex in a paraxial region thereof, an image-side surface 352 being concave in a paraxial region thereof, both the object-side surface 351 and the image-side surface 352 being aspheric, and at least one inflection point on the object-side surface 351 thereof. The fifth lens element 350 is made of plastic material.

The optical imaging system further includes a reflective component 390 disposed at an object side of the first lens element 310, and an IR cut filter 360 located between the fifth lens element 350 and an image surface 370. The reflective component 390 is a prism. Both the reflective component 390 and the IR cut filter 370 are made of glass material and will not affect the focal length of the optical imaging system. The image sensor 380 is disposed on or near the image surface 370 of the optical imaging system.

Figure 15:
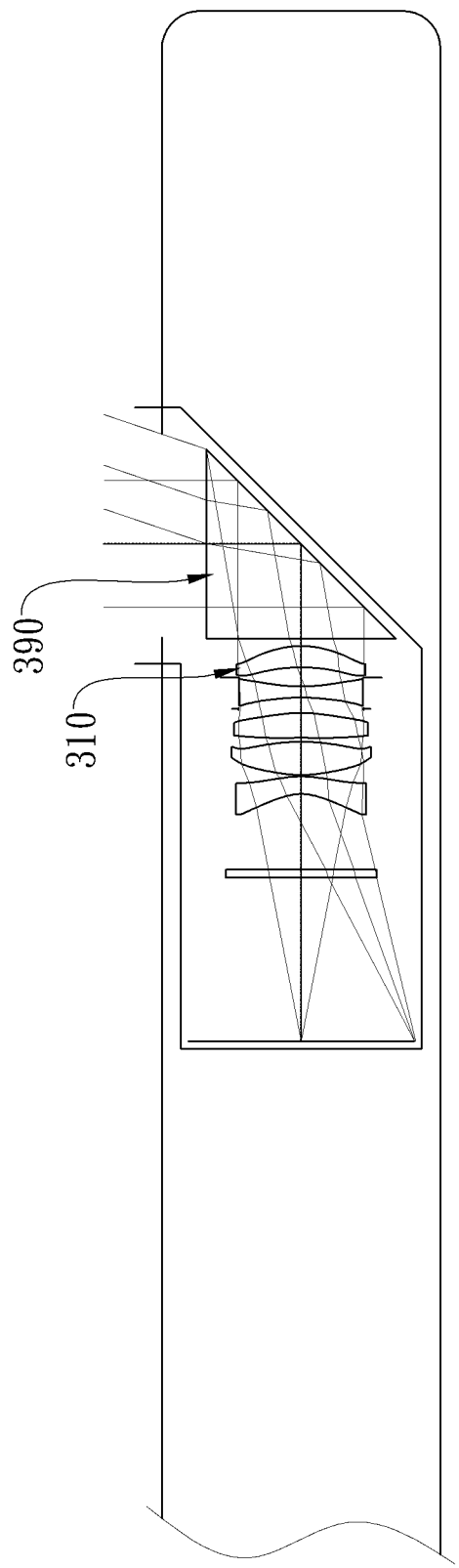
FIG. 15 is a schematic view of a reflective component in an electronic device including the 3rd embodiment of the present disclosure as an example.

Please refer to FIG. 15, which is a schematic view of a reflective component in an electronic device including the 3rd embodiment of the present disclosure as an example thereto. One skilled person in the art will recognize and understand any of other embodiments of the imaging apparatus implemented in the present disclosure is also applicable to the electronic device based on the present disclosure. The reflective component 390 is disposed at the object side of the first lens element 310 and is a prism made of glass material in order to shorten the height of the optical imaging system by deflecting the optical path.

Figure 16A:
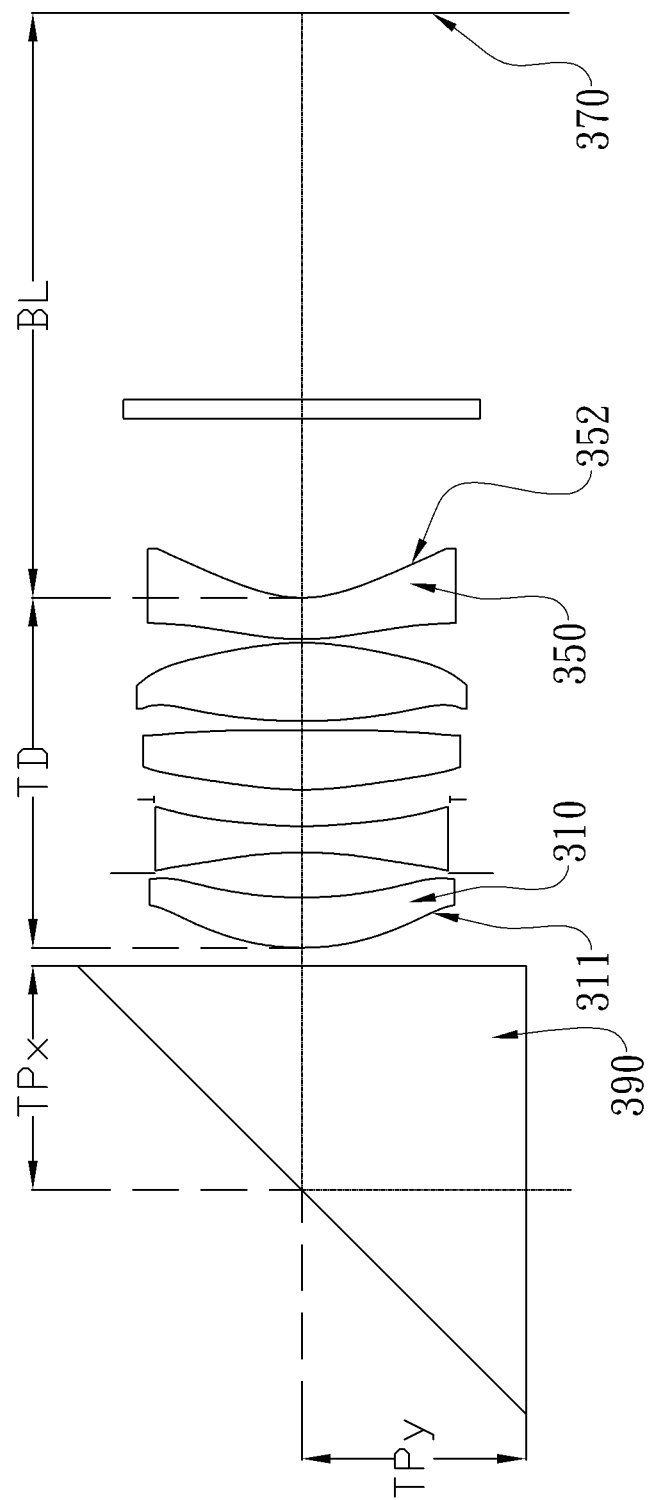
FIG. 16A is a schematic view showing the parameters TPx, TPy, TD and BL of the 3rd embodiment of the present disclosure as an example.

Please refer to FIG. 16A, which is a schematic view showing the parameters TPx, TPy, TD and BL of the 3rd embodiment of the present disclosure as an example. An axial distance between the object-side surface 311 of the first lens element 310 and the image-side surface 352 of the fifth lens element 350 is TD, and an axial distance between the image-side surface 352 of the fifth lens element 350 and the image surface 370 is BL. The reflective component 390 is a prism and is disposed at the object side of the first lens element 310. An internal optical path length of the prism along X-direction is TPx and an internal optical path length of the prism along Y-direction is TPy. A total length of the internal optical paths of the prism is TP and TP=TPx+TPy. Please note the definition of TP is also applicable to any of other embodiments of the imaging apparatus of the present disclosure.

Figure 16B:
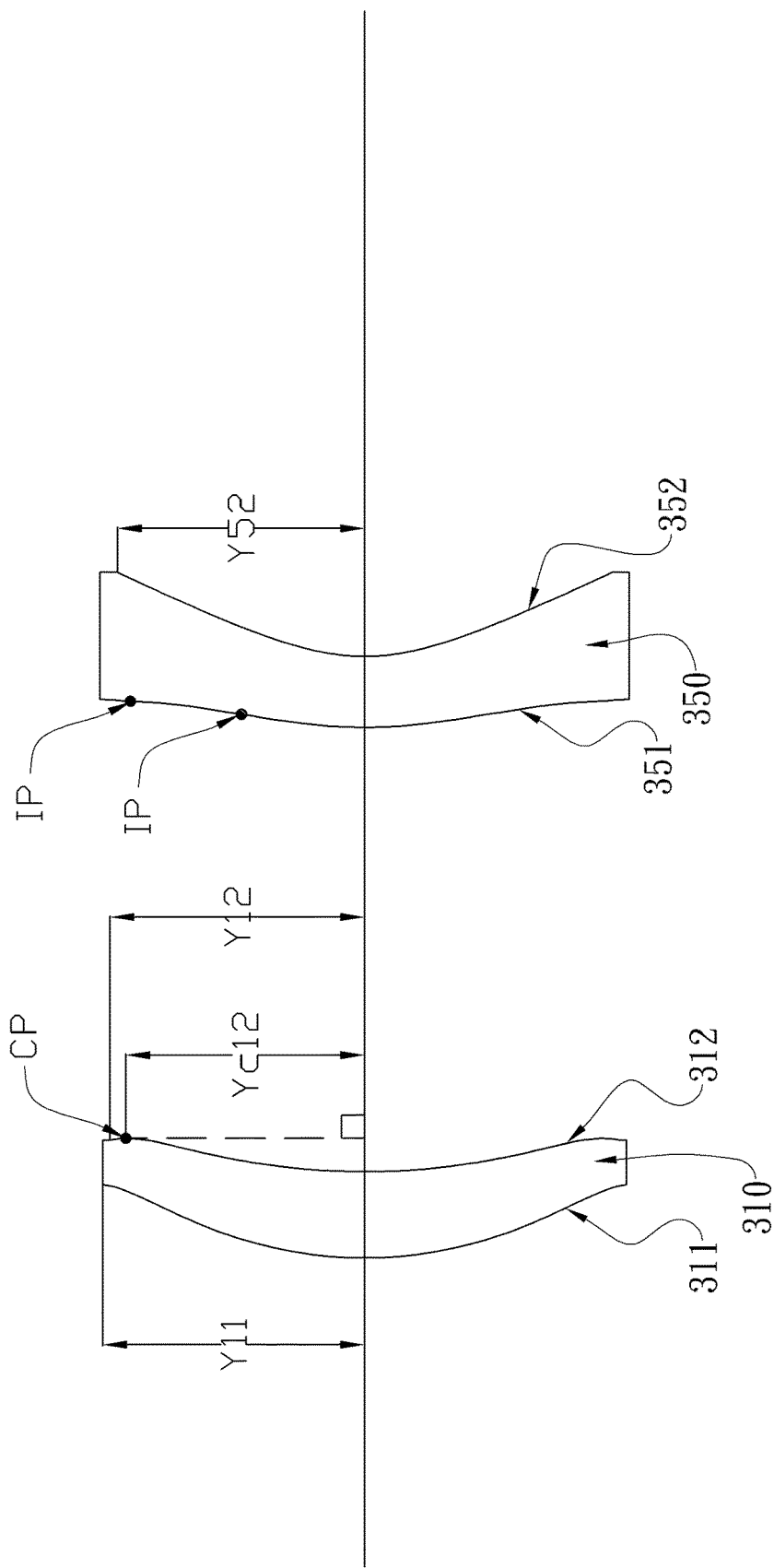
FIG. 16B is a schematic view showing the parameters Y11, Y12, Yc12, Y52, CP, and IP of the 3rd embodiment of the present disclosure as an example.

Please refer to FIG. 16B, which is a schematic view showing the parameters Y11, Y12, Yc12, Y52, CP, and IP of the 3rd embodiment of the present disclosure as an example. Please note the definitions of these characters exemplarily shown in FIG. 16B are also applicable to any of other embodiments of the imaging apparatus of the present disclosure. The first lens element 310 has a critical point CP in the off-axial region of the image-side surface 312 thereof. A vertical distance between the critical point CP and the optical axis is Yc12. A vertical distance between a maximum effective diameter position on the object-side surface 311 of the first lens element 310 and the optical axis is Y11. A vertical distance between a maximum effective diameter position on the image-side surface 312 of the first lens element 310 and the optical axis is Y12. The fifth lens element 350 has at least one inflection point IP on the object-side surface 351 thereof. A vertical distance between a maximum effective diameter position on the image-side surface 352 of the fifth lens element 350 and the optical axis is Y52.

The detailed optical data of the 3rd embodiment are shown in TABLE 5, and the aspheric surface data are shown in TABLE 6, wherein the units of the curvature radius, the thickness and the focal length are expressed in mm, and HFOV is a half of the maximal field of view.

TABLE 5

(3rd Embodiment)
f = 8.75 mm, Fno = 2.62, HFOV = 18.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Reflective Component (Prism) | Plano | | 5.000 | Glass | 1.921 | 24.0 | — |
| 2 | | Plano | | 0.200 | | | | |
| 3 | Lens 1 | 2.668 | ASP | 0.561 | Plastic | 1.544 | 55.9 | 10.89 |
| 4 | | 4.495 | ASP | 0.269 | | | | |
| 5 | Ape. Stop | Plano | | 0.232 | | | | |
| 6 | Lens 2 | −6.130 | ASP | 0.293 | Plastic | 1.642 | 22.5 | −3.58 |
| 7 | | 3.738 | ASP | 0.301 | | | | |
| 8 | Stop | Plano | | 0.107 | | | | |
| 9 | Lens 3 | 3.493 | ASP | 0.659 | Plastic | 1.671 | 219.3 | 5.38 |
| 10 | | 100.000 | ASP | 0.107 | | | | |
| 11 | Lens 4 | 6.757 | ASP | 0.875 | Plastic | 1.544 | 56.0 | 3.69 |
| 12 | | −2.727 | ASP | 0.040 | | | | |
| 13 | Lens 5 | 3.130 | ASP | 0.462 | Plastic | 1.584 | 28.2 | −4.48 |
| 14 | | 1.348 | ASP | 2.000 | | | | |
| 15 | IR Cut Filter | Plano | | 0.210 | Glass | 1.517 | 64.2 | — |
| 16 | | Plano | | 4.307 | | | | |
| 17 | Image Surface | Plano | | — | | | | |

* Reference wavelength is d-line 587.6 nm.
* The effective radius of Surface 1 is 2.500 mm.
* The effective radius of Surface 3 is 1.700 mm.
* The effective radius of Surface 8 is 1.650 mm.
* The effective radius of Surface 14 is 1.605 mm.

TABLE 6

Aspheric Coefficients

| Surface # | 3 | 4 | 6 | 7 | 9 |
|---|---|---|---|---|---|
| k = | −5.3989E−01 | −1.3773E+01 | −7.7381E+01 | −5.7497E+00 | −3.0749E+00 |
| A4 = | 1.1326E−04 | 1.5819E−02 | −1.1483E−01 | −1.2405E−01 | −4.7438E−02 |
| A6 = | 3.4520E−03 | −1.6400E−03 | 1.3944E−01 | 1.2782E−01 | −2.3459E−03 |
| A8 = | −3.3133E−03 | 1.0227E−03 | −8.2408E−02 | −5.4463E−02 | 2.4705E−02 |
| A10 = | 7.8641E−04 | −1.6664E−03 | 2.6725E−02 | 5.8580E−03 | −1.5522E−02 |
| A12 = | −1.8107E−04 | 2.1179E−04 | −4.5558E−03 | 3.0857E−03 | 4.2991E−03 |
| A14 = | | | 3.0717E−04 | −1.0421E−03 | −5.3725E−04 |
| A16 = | | | | 9.1790E−05 | 2.4506E−05 |

| Surface # | 10 | 11 | 12 | 13 | 14 |
|---|---|---|---|---|---|
| k = | −9.9000E+01 | −1.1477E+01 | −2.6643E+01 | −1.4214E+01 | −6.2326E+00 |
| A4 = | 3.3127E−02 | 7.7569E−02 | 7.6913E−03 | 4.6259E−02 | 8.3176E−02 |
| A6 = | −1.1864E−01 | −1.4989E−01 | −7.8236E−02 | −1.7295E−01 | −1.3962E−01 |
| A8 = | 1.2602E−01 | 1.3996E−01 | 1.0340E−01 | 2.2448E−01 | 1.5028E−01 |
| A10 = | −6.8475E−02 | −6.7694E−02 | −6.3023E−02 | −1.5595E−01 | −1.0349E−01 |
| A12 = | 2.0565E−02 | 1.7316E−02 | 1.9834E−02 | 5.9342E−02 | 4.2319E−02 |
| A14 = | −3.2972E−03 | −2.3017E−03 | −3.1974E−03 | −1.1658E−02 | −9.2595E−03 |
| A16 = | 2.2695E−04 | 1.2780E−04 | 2.1010E−04 | 9.2863E−04 | 8.3402E−04 |

In the 3rd embodiment, the equation of the aspheric surface profiles of the aforementioned lens elements is the same as the equation of the 1st embodiment.

In the 3rd embodiment, the axial distance between the object-side surface 311 of the first lens element 310 and the image-side surface 352 of the fifth lens element 350 is TD, the total length of internal optical paths of the reflective component 390 (prism) is TP, and they satisfy the condition: TD/TP=0.78.

As the other definitions of these parameters shown in table below are the same as those stated in the 1st embodiment with corresponding values for the 3rd embodiment, an explanation in this regard will not be provided again.

Moreover, these parameters can be calculated from TABLE 5 and TABLE 6 and satisfy the conditions stated in table below.

| 3rd Embodiment | | | |
|---|---|---|---|
| f [mm] | 8.75 | TD | 3.91 |
| Fno | 2.62 | $|f/f1| + |f/f2| + |f/f3| + |f/f4| + |f/f5|$ | 9.20 |
| HFOV [deg.] | 18.8 | f/R5 | 2.51 |
| V3 + V5 | 47.5 | f/R10 | 6.49 |
| V4/V5 | 1.98 | f/TD | 2.24 |
| BL/R10 | 4.83 | f2/f345 | −1.96 |
| (T12 + T23)/(T34 + T45) | 6.18 | $|f2|/f1$ | 0.33 |

-continued

3rd Embodiment

| T12/T23 | 1.23 | Y11/Y52 | 1.06 |
| T23/CT3 | 0.62 | Yc12/Y12 | 0.94 |

4th Embodiment

Figure 4A:
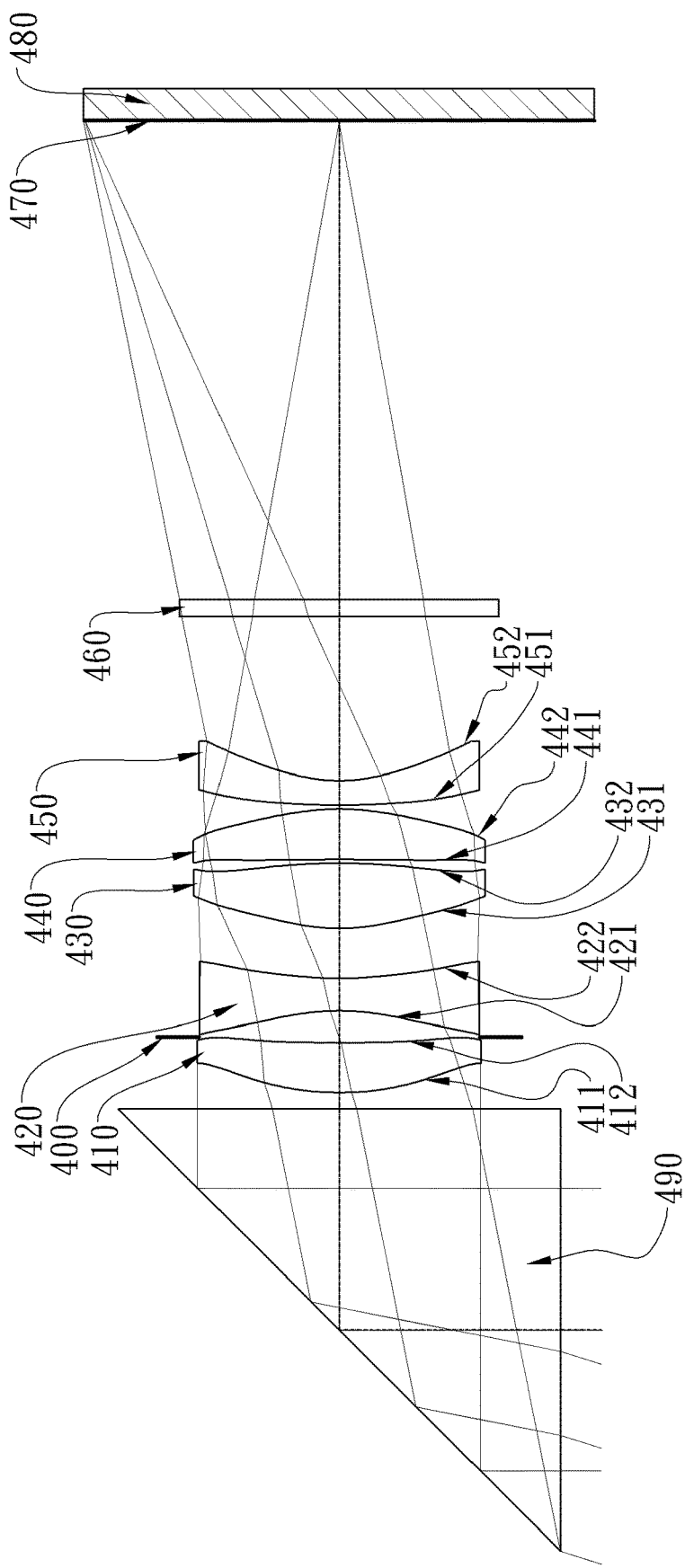
FIG. 4A is a schematic view of an imaging apparatus according to the 4th embodiment of the present disclosure.
Figure 4B:
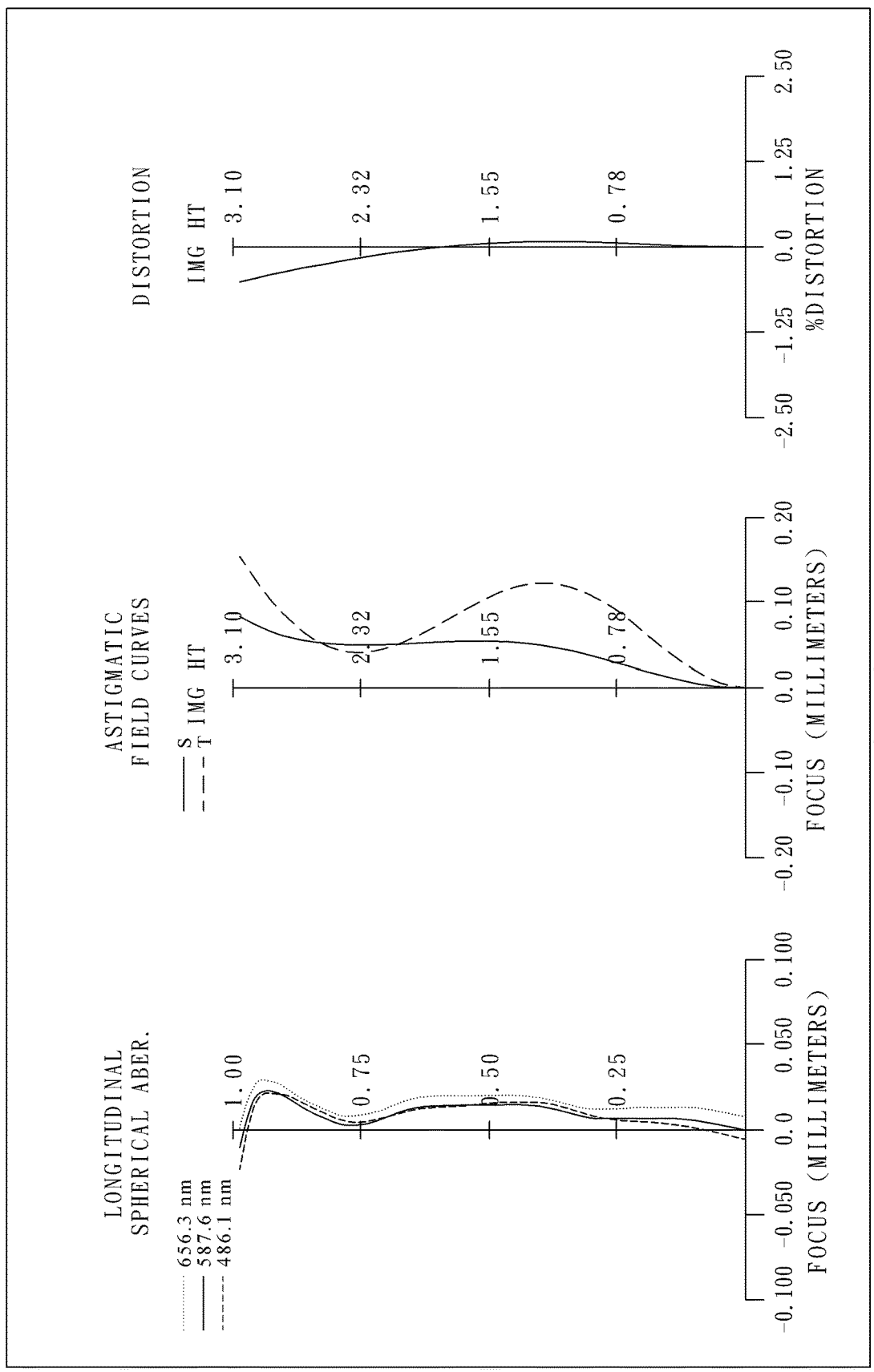
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes an optical imaging system (not otherwise herein labeled) of the present disclosure and an image sensor 480. The optical imaging system includes, in order from an object side to an image side, a first lens element 410, an aperture stop 400, a second lens element 420, a third lens element 430, a fourth lens element 440, and a fifth lens element 450. The optical imaging system includes five lens elements (410, 420, 430, 440 and 450) without any other lens elements being inserted between the first lens element 410 and the fifth lens element 450.

The first lens element 410 with positive refractive power has an object-side surface 411 being convex in a paraxial region thereof, an image-side surface 412 being concave in a paraxial region thereof, both the object-side surface 411 and the image-side surface 412 being aspheric, and one critical point in an off-axial region of the image-side surface 412 thereof. The first lens element 410 is made of plastic material.

The second lens element 420 with negative refractive power has an object-side surface 421 being concave in a paraxial region thereof, an image-side surface 422 being concave in a paraxial region thereof, and both the object-side surface 421 and the image-side surface 422 being aspheric. The second lens element 420 is made of plastic material.

The third lens element 430 with positive refractive power has an object-side surface 431 being convex in a paraxial region thereof, an image-side surface 432 being convex in a paraxial region thereof, and both the object-side surface 431 and the image-side surface 432 being aspheric. The third lens element 430 is made of plastic material.

The fourth lens element 440 with positive refractive power has an object-side surface 441 being concave in a paraxial region thereof, an image-side surface 442 being convex in a paraxial region thereof, and both the object-side surface 441 and the image-side surface 442 being aspheric. The fourth lens element 440 is made of plastic material.

The fifth lens element 450 with negative refractive power has an object-side surface 451 being convex in a paraxial region thereof, an image-side surface 452 being concave in a paraxial region thereof, and both the object-side surface 451 and the image-side surface 452 being aspheric. The fifth lens element 450 is made of plastic material.

The optical imaging system further includes a reflective component 490 disposed at an object side of the first lens element 410, and an IR cut filter 460 located between the fifth lens element 450 and an image surface 470. The reflective component 490 is a prism and is made of plastic material. The IR cut filter 460 is made of glass material. Both the reflective component 490 and the IR cut filter 460 will not affect the focal length of the optical imaging system. The image sensor 480 is disposed on or near the image surface 470 of the optical imaging system.

The detailed optical data of the 4th embodiment are shown in TABLE 7, and the aspheric surface data are shown in TABLE 8, wherein the units of the curvature radius, the thickness and the focal length are expressed in mm, and HFOV is a half of the maximal field of view.

TABLE 7

(4th Embodiment)
f = 9.87 mm, Fno = 2.86, HFOV = 17.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Reflective Component (Prism) | Plano | | 5.400 | Plastic | 1.545 | 56.1 | — |
| 2 | | Plano | | 0.200 | | | | |
| 3 | Lens 1 | 3.468 | ASP | 0.611 | Plastic | 1.566 | 37.4 | 6.82 |
| 4 | | 32.032 | ASP | 0.068 | | | | |
| 5 | Ape. Stop | Plano | | 0.317 | | | | |
| 6 | Lens 2 | -3.410 | ASP | 0.396 | Plastic | 1.614 | 26.0 | -2.72 |
| 7 | | 3.420 | ASP | 0.614 | | | | |
| 8 | Lens 3 | 2.355 | ASP | 0.797 | Plastic | 1.584 | 28.2 | 3.04 |
| 9 | | -6.330 | ASP | 0.044 | | | | |
| 10 | Lens 4 | -17.539 | ASP | 0.619 | Plastic | 1.544 | 56.0 | 5.85 |
| 11 | | -2.728 | ASP | 0.046 | | | | |
| 12 | Lens 5 | 11.984 | ASP | 0.301 | Plastic | 1.614 | 26.0 | -3.85 |
| 13 | | 1.953 | ASP | 2.000 | | | | |
| 14 | IR Cut Filter | Plano | | 0.210 | Glass | 1.517 | 64.2 | — |
| 15 | | Plano | | 5.850 | | | | |
| 16 | Image Surface | Plano | | — | | | | |

\* Reference wavelength is d-line 587.6 nm.
\* The effective radius of Surface 1 is 2.700 mm.
\* The effective radius of Surface 13 is 1.610 mm.

TABLE 8

Aspheric Coefficients

| Surface # | 3 | 4 | 6 | 7 | 8 |
|---|---|---|---|---|---|
| k = | −4.1144E−01 | 5.4264E+01 | −2.7530E+01 | −6.8437E+00 | −2.8951E+00 |
| A4 = | 2.1986E−03 | 1.4601E−02 | −1.1528E−01 | −1.2531E−01 | −5.0297E−02 |
| A6 = | 3.5530E−03 | −2.2661E−03 | 1.4176E−01 | 1.2698E−01 | −3.7797E−03 |
| A8 = | −4.0703E−03 | 1.6919E−03 | −8.1870E−02 | −5.4504E−02 | 2.5291E−02 |
| A10 = | 8.8434E−04 | −1.5832E−03 | 2.6453E−02 | 6.1357E−03 | −1.5378E−02 |
| A12 = | −1.1684E−04 | 2.1703E−04 | −4.6877E−03 | 3.0320E−03 | 4.3428E−03 |
| A14 = | | | 3.5060E−04 | −1.1146E−03 | −5.5059E−04 |
| A16 = | | | | 1.0975E−04 | 2.0185E−05 |

| Surface # | 9 | 10 | 11 | 12 | 13 |
|---|---|---|---|---|---|
| k = | −9.7888E+01 | −2.8564E+01 | −2.8013E+01 | 2.9120E+01 | −1.2653E+01 |
| A4 = | 3.4282E−02 | 8.2868E−02 | 7.7243E−05 | 5.8641E−02 | 9.7133E−02 |
| A6 = | −1.1566E−01 | −1.5215E−01 | −7.5401E−02 | −1.6961E−01 | −1.3987E−01 |
| A8 = | 1.2639E−01 | 1.4075E−01 | 1.0396E−01 | 2.2483E−01 | 1.5117E−01 |
| A10 = | −6.8494E−02 | −6.7300E−02 | −6.3018E−02 | −1.5594E−01 | −1.0397E−01 |
| A12 = | 2.0573E−02 | 1.7250E−02 | 1.9833E−02 | 5.9315E−02 | 4.2318E−02 |
| A14 = | −3.2899E−03 | −2.3371E−03 | −3.2094E−03 | −1.1724E−02 | −9.2176E−03 |
| A16 = | 2.2283E−04 | 1.3693E−04 | 2.1060E−04 | 9.4116E−04 | 8.2386E−04 |

In the 4th embodiment, the equation of the aspheric surface profiles of the aforementioned lens elements is the same as the equation of the 1st embodiment. Also, the definitions of these parameters shown in table below are the same as those stated in the 3rd embodiment with corresponding values for the 4th embodiment, so an explanation in this regard will not be provided again.

Moreover, these parameters can be calculated from TABLE 7 and TABLE 8 and satisfy the conditions stated in table below.

| 4th Embodiment | | | |
|---|---|---|---|
| f [mm] | 9.87 | TD/TP | 0.71 |
| Fno | 2.86 | $|f/f1| + |f/f2| + |f/f3| + |f/f4| + |f/f5|$ | 12.57 |
| HFOV [deg.] | 17.5 | f/R5 | 4.19 |
| V3 + V5 | 54.2 | f/R10 | 5.05 |
| V4/V5 | 2.16 | f/TD | 2.59 |
| BL/R10 | 4.13 | f12/f345 | −1.70 |
| (T12 + T23)/(T34 + T45) | 11.10 | |f2|/f1 | 0.40 |
| T12/T23 | 0.63 | Y11/Y52 | 1.10 |
| T23/CT3 | 0.77 | Yc12/Y12 | 0.86 |
| TD | 3.81 | | |

5th Embodiment

Figure 5A:
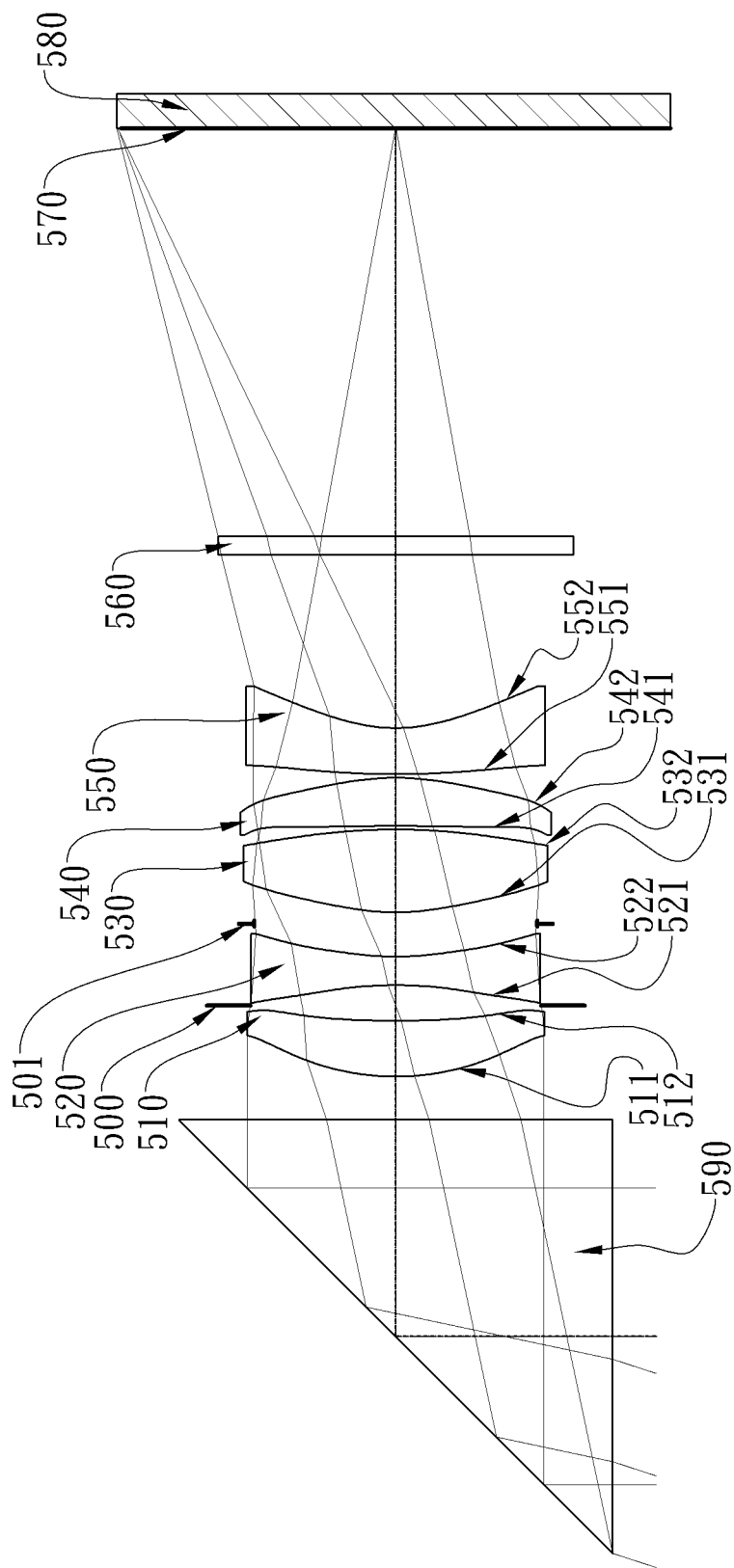
FIG. 5A is a schematic view of an imaging apparatus according to the 5th embodiment of the present disclosure.
Figure 5B:
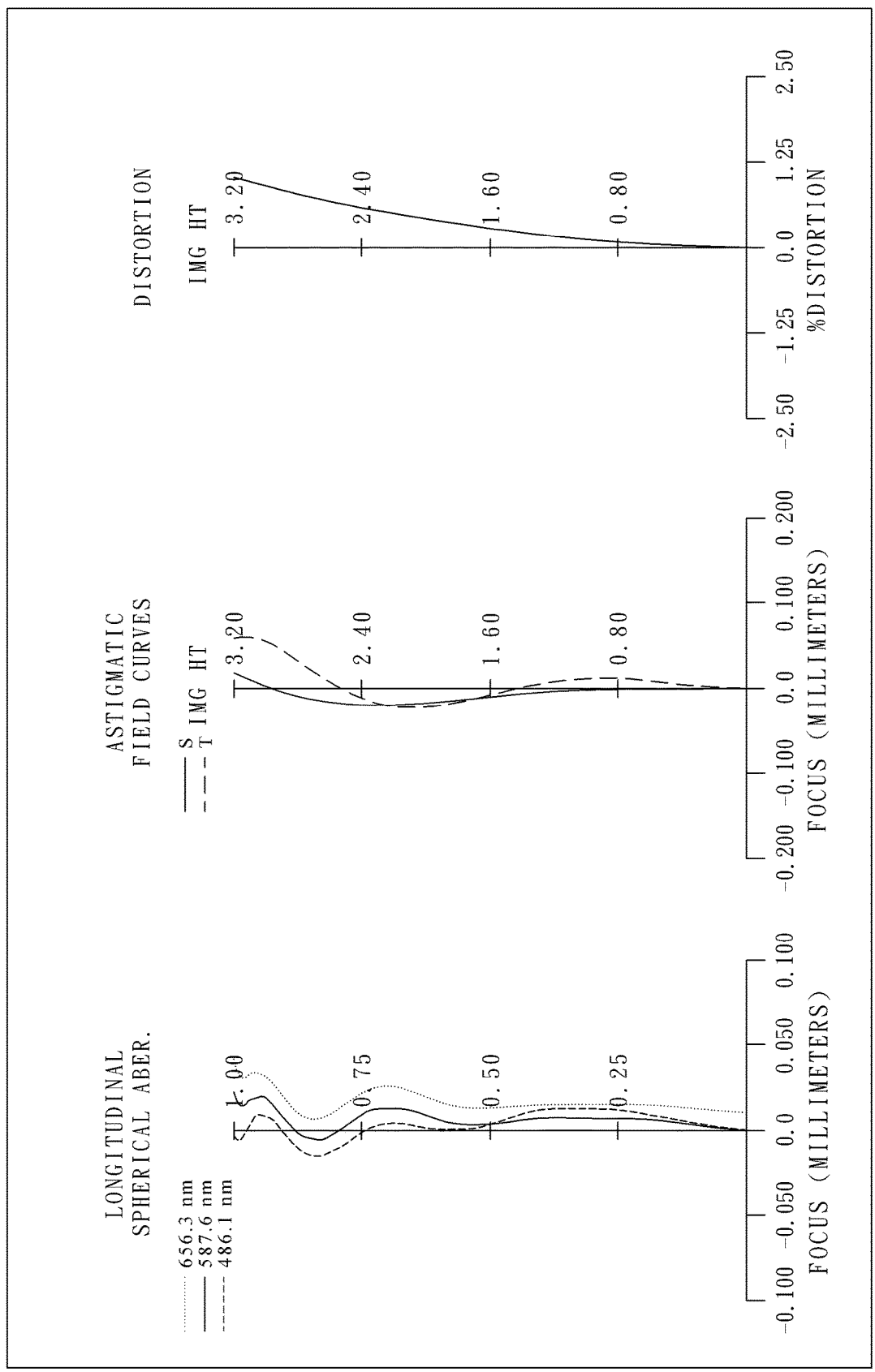
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes an optical imaging system (not otherwise herein labeled) of the present disclosure and an image sensor 580. The optical imaging system includes, in order from an object side to an image side, a first lens element 510, an aperture stop 500, a second lens element 520, a stop 501, a third lens element 530, a fourth lens element 540, and a fifth lens element 550. The optical imaging system includes five lens elements (510, 520, 530, 540 and 550) without any other lens elements being inserted between the first lens element 510 and the fifth lens element 550.

The first lens element 510 with positive refractive power has an object-side surface 511 being convex in a paraxial region thereof, an image-side surface 512 being concave in a paraxial region thereof, both the object-side surface 511 and the image-side surface 512 being aspheric, and one critical point in an off-axial region of the image-side surface 512 thereof. The first lens element 510 is made of plastic material.

The second lens element 520 with negative refractive power has an object-side surface 521 being concave in a paraxial region thereof, an image-side surface 522 being concave in a paraxial region thereof, and both the object-side surface 521 and the image-side surface 522 being aspheric. The second lens element 520 is made of plastic material.

The third lens element 530 with positive refractive power has an object-side surface 531 being convex in a paraxial region thereof, an image-side surface 532 being convex in a paraxial region thereof, and both the object-side surface 531 and the image-side surface 532 being aspheric. The third lens element 530 is made of plastic material.

The fourth lens element 540 with positive refractive power has an object-side surface 541 being concave in a paraxial region thereof, an image-side surface 542 being convex in a paraxial region thereof, and both the object-side surface 541 and the image-side surface 542 being aspheric. The fourth lens element 540 is made of plastic material.

The fifth lens element 550 with negative refractive power has an object-side surface 551 being convex in a paraxial region thereof, an image-side surface 552 being concave in a paraxial region thereof, both the object-side surface 551 and the image-side surface 552 being aspheric, and at least one inflection point on both the object-side surface 551 and the image-side surface 552 thereof. The fifth lens element 550 is made of plastic material.

The optical imaging system further includes a reflective component 590 disposed at an object side of the first lens element 510, and an IR cut filter 560 located between the fifth lens element 550 and an image surface 570. The reflective component 590 is a prism. Both the reflective component 590 and the IR cut filter 560 are made of glass material and will not affect the focal length of the optical imaging system. The image sensor 580 is disposed on or near the image surface 570 of the optical imaging system.

The detailed optical data of the 5th embodiment are shown in TABLE 9, and the aspheric surface data are shown in TABLE 10, wherein the units of the curvature radius, the thickness and the focal length are expressed in mm, and HFOV is a half of the maximal field of view.

TABLE 9

(5th Embodiment)
f = 9.58 mm, Fno = 2.80, HFOV = 18.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Reflective Component (Prism) | Plano | | 5.000 | Glass | 1.517 | 64.2 | — |
| 2 | | Plano | | 0.500 | | | | |
| 3 | Lens 1 | 2.934 | ASP | 0.643 | Plastic | 1.511 | 56.8 | 7.41 |
| 4 | | 12.050 | ASP | 0.174 | | | | |
| 5 | Ape. Stop | Plano | | 0.236 | | | | |
| 6 | Lens 2 | −5.806 | ASP | 0.329 | Plastic | 1.584 | 28.2 | −3.15 |
| 7 | | 2.755 | ASP | 0.381 | | | | |
| 8 | Stop | Plano | | 0.132 | | | | |
| 9 | Lens 3 | 2.654 | ASP | 0.956 | Plastic | 1.582 | 30.2 | 3.32 |
| 10 | | −6.186 | ASP | 0.040 | | | | |
| 11 | Lens 4 | −15.509 | ASP | 0.557 | Plastic | 1.544 | 56.0 | 5.96 |
| 12 | | −2.717 | ASP | 0.040 | | | | |
| 13 | Lens 5 | 10.769 | ASP | 0.533 | Plastic | 1.582 | 30.2 | −3.82 |
| 14 | | 1.810 | ASP | 2.000 | | | | |
| 15 | IR Cut Filter | Plano | | 0.210 | Glass | 1.517 | 64.2 | — |
| 16 | | Plano | | 4.711 | | | | |
| 17 | Image Surface | Plano | | — | | | | |

* Reference wavelength is d-line 587.6 nm.
* The effective radius of Surface 1 is 2.500 mm.
* The effective radius of Surface 8 is 1.630 mm.
* The effective radius of Surface 14 is 1.635 mm.

TABLE 10

Aspheric Coefficients

| Surface # | 3 | 4 | 6 | 7 | 9 |
|---|---|---|---|---|---|
| k = | −3.0262E−01 | 3.7625E+01 | −6.9116E+01 | −7.6162E+00 | −2.6257E+00 |
| A4 = | 2.6338E−03 | 1.0840E−02 | −1.1576E−01 | −1.2401E−01 | −4.8513E−02 |
| A6 = | 3.2838E−03 | −1.8539E−03 | 1.4038E−01 | 1.2857E−01 | −3.2190E−03 |
| A8 = | −3.5323E−03 | 1.7259E−03 | −8.1923E−02 | −5.4500E−02 | 2.5186E−02 |
| A10 = | 1.0837E−03 | −1.7168E−03 | 2.6572E−02 | 5.9707E−03 | −1.5418E−02 |
| A12 = | −2.1761E−04 | 2.0547E−04 | −4.6672E−03 | 3.0770E−03 | 4.2983E−03 |
| A14 = | | | 3.4413E−04 | −1.0858E−03 | −5.5767E−04 |
| A16 = | | | | 1.0088E−04 | 2.6189E−05 |

| Surface # | 10 | 11 | 12 | 13 | 14 |
|---|---|---|---|---|---|
| k = | −7.1547E+01 | −1.7768E+01 | −2.4051E+01 | 2.1332E+01 | −1.0180E+01 |
| A4 = | 3.3808E−02 | 8.1615E−02 | 5.8058E−03 | 5.4692E−02 | 9.6458E−02 |
| A6 = | −1.1703E−01 | −1.5104E−01 | −7.5513E−02 | −1.7148E−01 | −1.4123E−01 |
| A8 = | 1.2602E−01 | 1.4068E−01 | 1.0399E−01 | 2.2420E−01 | 1.4990E−01 |
| A10 = | −6.8496E−02 | −6.7438E−02 | −6.3171E−02 | −1.5597E−01 | −1.0373E−01 |
| A12 = | 2.0552E−02 | 1.7202E−02 | 1.9799E−02 | 5.9261E−02 | 4.2505E−02 |
| A14 = | −3.3104E−03 | −2.3430E−03 | −3.2087E−03 | −1.1656E−02 | −9.2926E−03 |
| A16 = | 2.2923E−04 | 1.3949E−04 | 2.1371E−04 | 9.3028E−04 | 8.3277E−04 |

In the 5th embodiment, the equation of the aspheric surface profiles of the aforementioned lens elements is the same as the equation of the 1st embodiment. Also, the definitions of these parameters shown in table below are the same as those stated in the 3rd embodiment with corresponding values for the 5th embodiment, so an explanation in this regard will not be provided again.

Moreover, these parameters can be calculated from TABLE 9 and TABLE 10 and satisfy the conditions stated in table below.

5th Embodiment

| | | | |
|---|---|---|---|
| f [mm] | 9.58 | TD/TP | 0.80 |
| Fno | 2.80 | $|f/f1| + |f/f2| + |f/f3| + |f/f4| + |f/f5|$ | 11.33 |
| HFOV [deg.] | 18.3 | f/R5 | 3.61 |
| V3 + V5 | 60.5 | f/R10 | 5.29 |
| V4/V5 | 1.85 | f/TD | 2.38 |
| BL/R10 | 3.82 | f2/f345 | −2.03 |
| (T12 + T23)/(T34 + T45) | 11.54 | |f2|/f1 | 0.43 |
| T12/T23 | 0.80 | Y11/Y52 | 1.05 |
| T23/CT3 | 0.54 | Yc12/Y12 | 0.91 |
| TD | 4.02 | | |

6th Embodiment

Figure 6A:
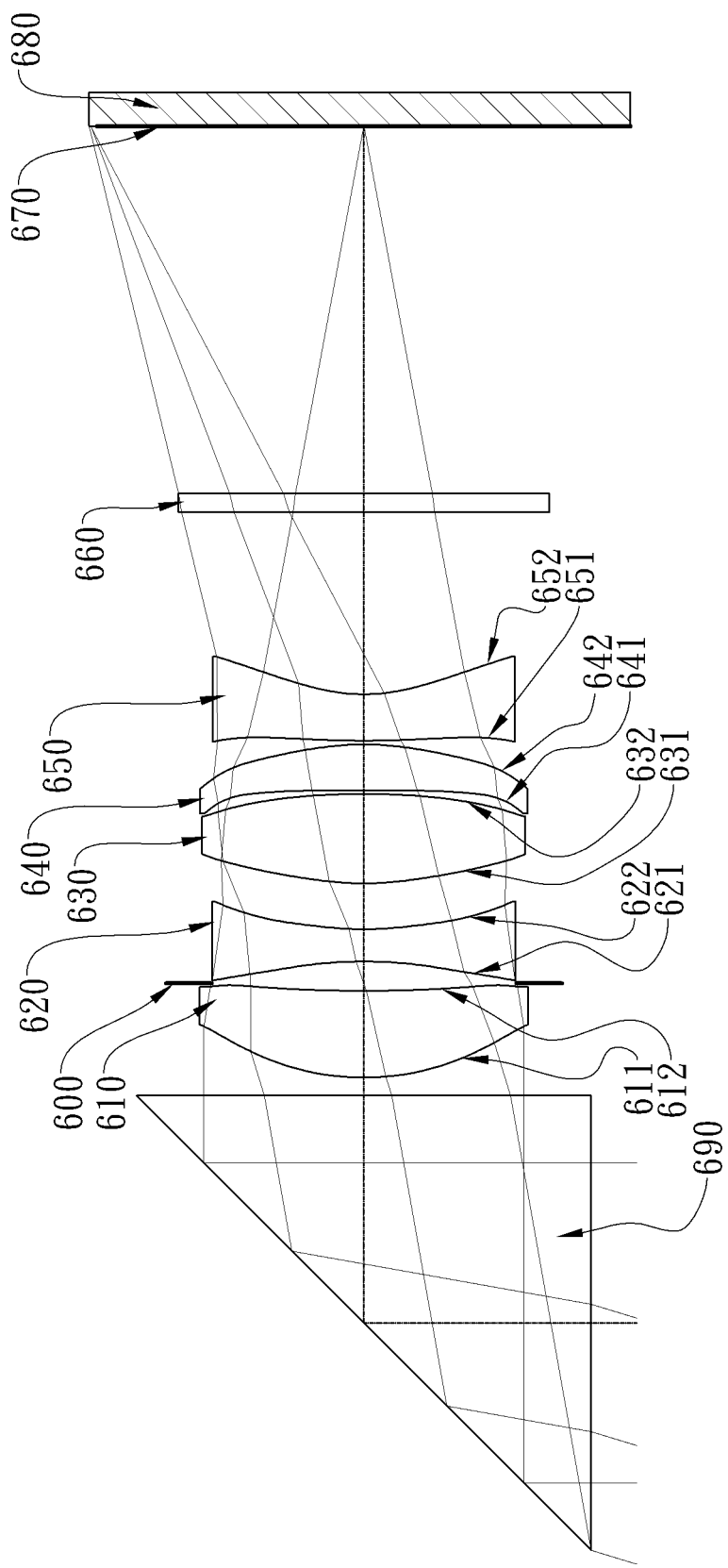
FIG. 6A is a schematic view of an imaging apparatus according to the 6th embodiment of the present disclosure.
Figure 6B:
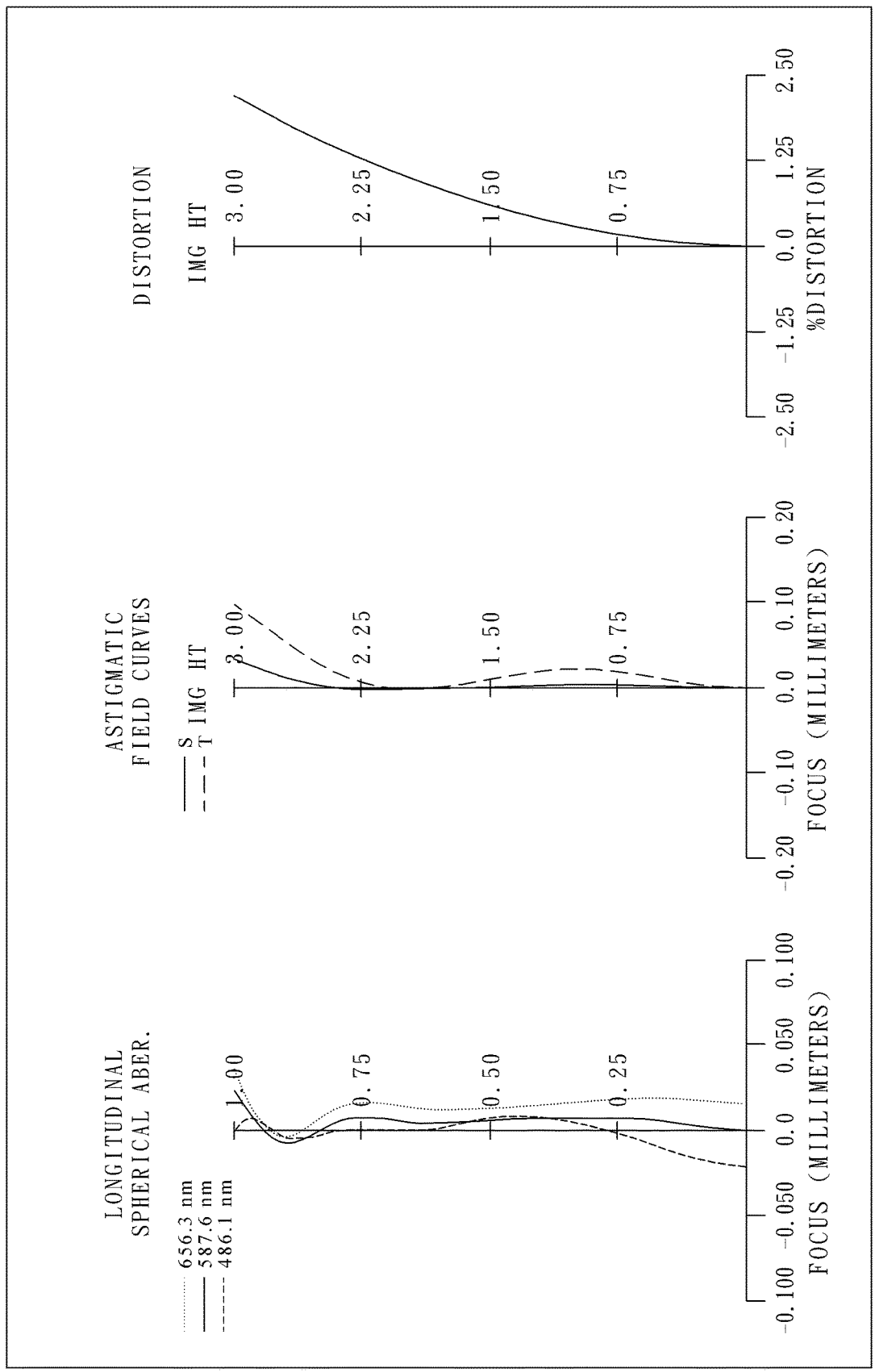
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes an optical imaging system (not otherwise herein labeled) of the present disclosure and an image sensor 680. The optical imaging system includes, in order from an object side to an image side, a first lens element 610, an aperture stop 600, a second lens element 620, a third lens element 630, a fourth lens element 640, and a fifth lens element 650. The optical imaging system includes five lens elements (610, 620, 630, 640 and 650) without any other lens elements being inserted between the first lens element 610 and the fifth lens element 650.

The first lens element 610 with positive refractive power has an object-side surface 611 being convex in a paraxial region thereof, an image-side surface 612 being concave in a paraxial region thereof, both the object-side surface 611 and the image-side surface 612 being aspheric, and one critical point in an off-axial region of the image-side surface 612 thereof. The first lens element 610 is made of plastic material.

The second lens element 620 with negative refractive power has an object-side surface 621 being concave in a paraxial region thereof, an image-side surface 622 being concave in a paraxial region thereof, and both the object-side surface 621 and the image-side surface 622 being aspheric. The second lens element 620 is made of plastic material.

The third lens element 630 with positive refractive power has an object-side surface 631 being convex in a paraxial region thereof, an image-side surface 632 being convex in a paraxial region thereof, and both the object-side surface 631 and the image-side surface 632 being aspheric. The third lens element 630 is made of plastic material.

The fourth lens element 640 with positive refractive power has an object-side surface 641 being concave in a paraxial region thereof, an image-side surface 642 being convex in a paraxial region thereof, and both the object-side surface 641 and the image-side surface 642 being aspheric. The fourth lens element 640 is made of plastic material.

The fifth lens element 650 with negative refractive power has an object-side surface 651 being convex in a paraxial region thereof, an image-side surface 652 being concave in a paraxial region thereof, both the object-side surface 651 and the image-side surface 652 being aspheric, and at least one inflection point on both the object-side surface 651 and the image-side surface 652 thereof. The fifth lens element 650 is made of plastic material.

The optical imaging system further includes a reflective component 690 disposed at an object side of the first lens element 610, and an IR cut filter 660 located between the fifth lens element 650 and an image surface 670. The reflective component 690 is a prism and is made of plastic material. The IR cut filter 660 is made of glass material. Both the reflective component 690 and the IR cut filter 660 will not affect the focal length of the optical imaging system. The image sensor 680 is disposed on or near the image surface 670 of the optical imaging system.

The detailed optical data of the 6th embodiment are shown in TABLE 11, and the aspheric surface data are shown in TABLE 12, wherein the units of the curvature radius, the thickness and the focal length are expressed in mm, and HFOV is a half of the maximal field of view.

TABLE 11

(6th Embodiment)
f = 9.61 mm, Fno = 2.73, HFOV = 17.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Reflective Component (Prism) | Plano | | 5.000 | Plastic | 1.671 | 19.3 | — |
| 2 | | Plano | | 0.200 | | | | |
| 3 | Lens 1 | 2.835 | ASP | 0.953 | Plastic | 1.545 | 56.1 | 6.03 |
| 4 | | 18.225 | ASP | 0.083 | | | | |
| 5 | Ape. Stop | Plano | | 0.239 | | | | |
| 6 | Lens 2 | −6.037 | ASP | 0.355 | Plastic | 1.650 | 21.5 | −3.11 |
| 7 | | 3.109 | ASP | 0.505 | | | | |
| 8 | Lens 3 | 3.214 | ASP | 0.984 | Plastic | 1.671 | 19.3 | 3.46 |
| 9 | | −7.291 | ASP | 0.040 | | | | |
| 10 | Lens 4 | −21.158 | ASP | 0.505 | Plastic | 1.582 | 30.2 | 5.45 |
| 11 | | −2.785 | ASP | 0.040 | | | | |
| 12 | Lens 5 | 12.111 | ASP | 0.511 | Plastic | 1.671 | 19.3 | −3.30 |
| 13 | | 1.841 | ASP | 2.000 | | | | |
| 14 | IR Cut Filter | Plano | | 0.210 | Glass | 1.517 | 64.2 | — |
| 15 | | Plano | | 4.033 | | | | |
| 16 | Image Surface | Plano | | — | | | | |

\* Reference wavelength is d-line 587.6 nm.
\* The effective radius of Surface 1 is 2.500 mm.
\* The effective radius of Surface 13 is 1.620 mm.

TABLE 12

Aspheric Coefficients

| Surface # | 3 | 4 | 6 | 7 | 8 |
|---|---|---|---|---|---|
| k = | −3.7298E−01 | −9.9000E+01 | −8.2815E+01 | −6.3967E+00 | −1.7789E+00 |
| A4 = | 2.1683E−03 | 8.1205E−03 | −1.1828E−01 | −1.2215E−01 | −4.5513E−02 |
| A6 = | 3.0248E−03 | −1.6465E−03 | 1.4031E−01 | 1.2970E−01 | −2.1774E−03 |
| A8 = | −3.1849E−03 | 1.6937E−03 | −8.1881E−02 | −5.4056E−02 | 2.4695E−02 |
| A10 = | 1.1332E−03 | −1.5408E−03 | 2.6581E−02 | 5.8609E−03 | −1.5586E−02 |
| A12 = | −1.8332E−04 | 2.4116E−04 | −4.6943E−03 | 3.0161E−03 | 4.2872E−03 |
| A14 = | | | 3.5782E−04 | −1.0634E−03 | −5.3202E−04 |
| A16 = | | | | 1.0136E−04 | 2.3687E−05 |

| Surface # | 9 | 10 | 11 | 12 | 13 |
|---|---|---|---|---|---|
| k = | −9.5942E+01 | 9.0000E+01 | −2.6248E+01 | 2.9596E+01 | −1.0290E+01 |
| A4 = | 3.0294E−02 | 7.1857E−02 | 5.7047E−03 | 4.6925E−02 | 8.4795E−02 |
| A6 = | −1.1847E−01 | −1.5348E−01 | −7.7173E−02 | −1.7453E−01 | −1.4112E−01 |
| A8 = | 1.2561E−01 | 1.4042E−01 | 1.0286E−01 | 2.2448E−01 | 1.5105E−01 |
| A10 = | −6.8565E−02 | −6.7516E−02 | −6.3174E−02 | −1.5581E−01 | −1.0393E−01 |
| A12 = | 2.0594E−02 | 1.7193E−02 | 1.9844E−02 | 5.9219E−02 | 4.2398E−02 |
| A14 = | −3.2854E−03 | −2.3354E−03 | −3.2041E−03 | −1.1678E−02 | −9.2654E−03 |
| A16 = | 2.2303E−04 | 1.4514E−04 | 2.1516E−04 | 9.3862E−04 | 8.3402E−04 |

In the 6th embodiment, the equation of the aspheric surface profiles of the aforementioned lens elements is the same as the equation of the 1st embodiment. Also, the definitions of these parameters shown in table below are the same as those stated in the 3rd embodiment with corresponding values for the 6th embodiment, so an explanation in this regard will not be provided again.

Moreover, these parameters can be calculated from TABLE 11 and TABLE 12 and satisfy the conditions stated in table below.

| 6th Embodiment | | | |
|---|---|---|---|
| f [mm] | 9.61 | TD/TP | 0.84 |
| Fno | 2.73 | $\|f/f1\| + \|f/f2\| + \|f/f3\| + \|f/f4\| + \|f/f5\|$ | 12.13 |
| HFOV [deg.] | 17.0 | f/R5 | 2.99 |
| V3 + V5 | 38.6 | f/R10 | 5.22 |
| V4/V5 | 1.57 | f/TD | 2.28 |
| BL/R10 | 3.39 | f12/f345 | −2.64 |
| (T12 + T23)/(T34 + T45) | 10.34 | \|f2\|/f1 | 0.52 |
| T12/T23 | 0.64 | Y11/Y52 | 1.11 |
| T23/CT3 | 0.51 | Yc12/Y12 | 0.87 |
| TD | 4.22 | | |

7th Embodiment

Figure 7A:
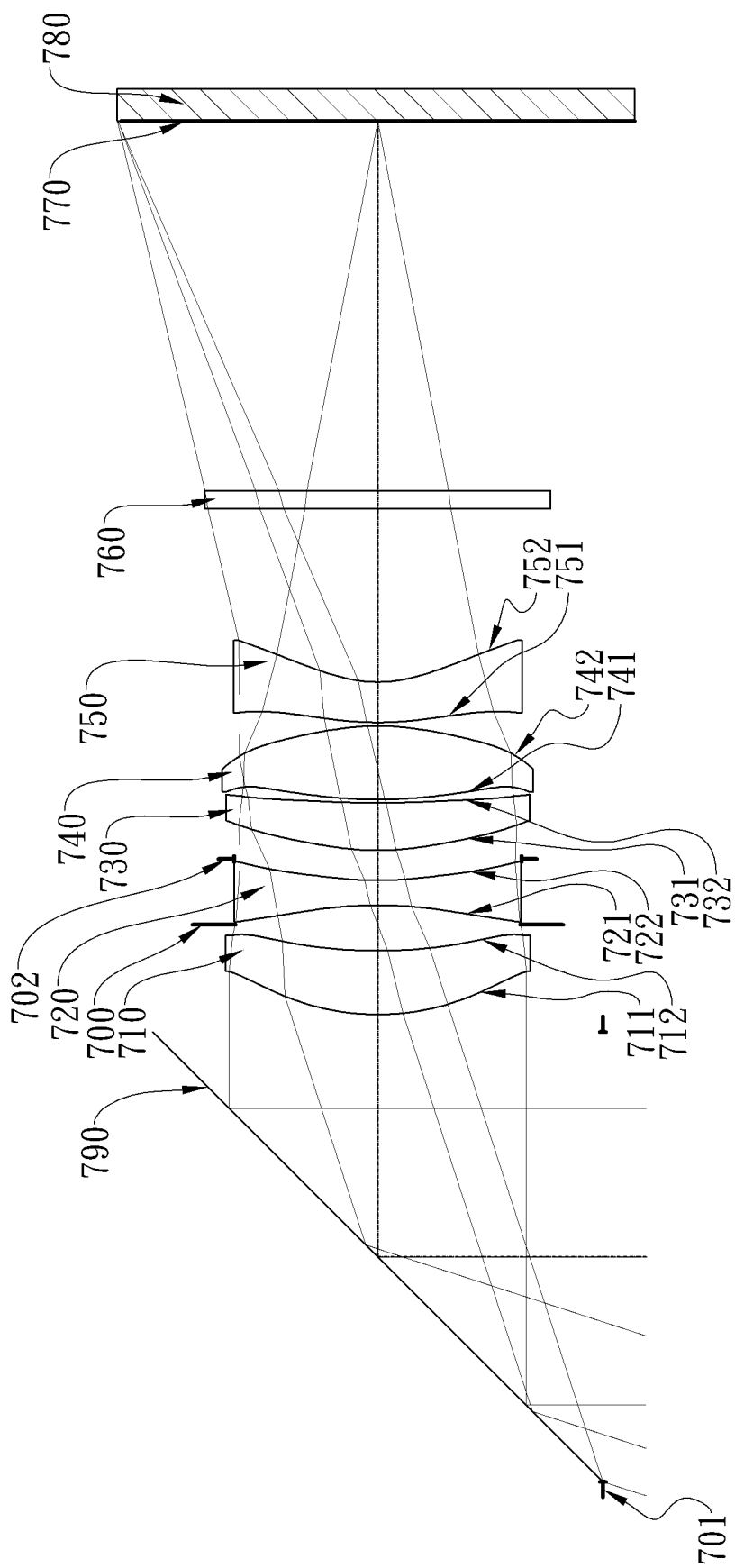
FIG. 7A is a schematic view of an imaging apparatus according to the 7th embodiment of the present disclosure.
Figure 7B:
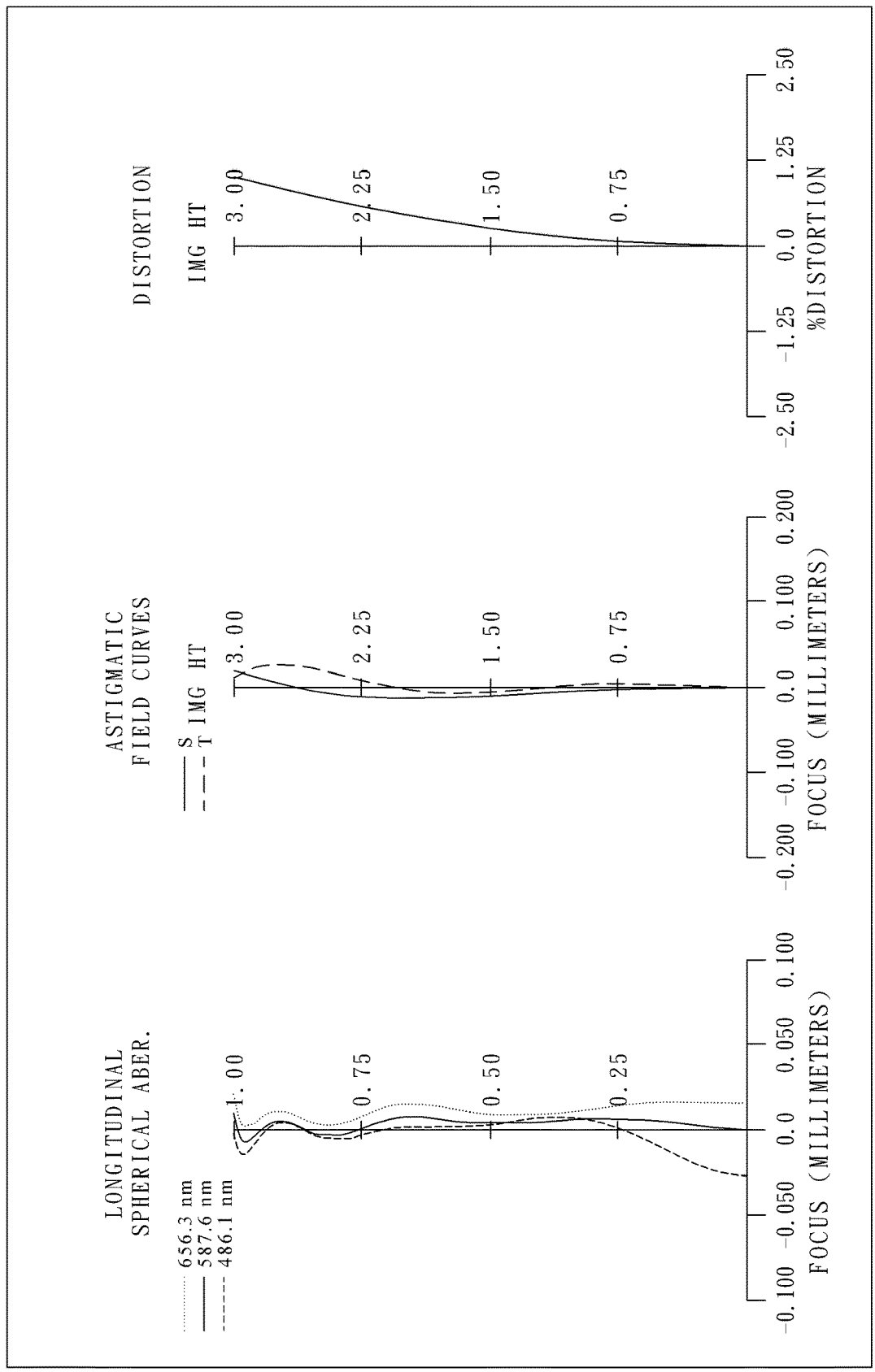
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes an optical imaging system (not otherwise herein labeled) of the present disclosure and an image sensor 780. The optical imaging system includes, in order from an object side to an image side, a stop 701, a first lens element 710, an aperture stop 700, a second lens element 720, a stop 702, a third lens element 730, a fourth lens element 740, and a fifth lens element 750. The optical imaging system includes five lens elements (710, 720, 730, 740 and 750) without any other lens elements being inserted between the first lens element 710 and the fifth lens element 750.

The first lens element 710 with positive refractive power has an object-side surface 711 being convex in a paraxial region thereof, an image-side surface 712 being concave in a paraxial region thereof, both the object-side surface 711 and the image-side surface 712 being aspheric, and one critical point in an off-axial region of the image-side surface 712 thereof. The first lens element 710 is made of plastic material.

The second lens element 720 with negative refractive power has an object-side surface 721 being concave in a paraxial region thereof, an image-side surface 722 being concave in a paraxial region thereof, and both the object-side surface 721 and the image-side surface 722 being aspheric. The second lens element 720 is made of plastic material.

The third lens element 730 with positive refractive power has an object-side surface 731 being convex in a paraxial region thereof, an image-side surface 732 being concave in a paraxial region thereof, and both the object-side surface 731 and the image-side surface 732 being aspheric. The third lens element 730 is made of plastic material.

The fourth lens element 740 with positive refractive power has an object-side surface 741 being convex in a paraxial region thereof, an image-side surface 742 being convex in a paraxial region thereof, and both the object-side surface 741 and the image-side surface 742 being aspheric. The fourth lens element 740 is made of plastic material.

The fifth lens element 750 with negative refractive power has an object-side surface 751 being convex in a paraxial region thereof, an image-side surface 752 being concave in a paraxial region thereof, both the object-side surface 751 and the image-side surface 752 being aspheric, and at least one inflection point on both the object-side surface 751 and the image-side surface 752 thereof. The fifth lens element 750 is made of plastic material.

The optical imaging system further includes a reflective component 790 located between the stop 701 and the first lens element 710, and an IR cut filter 760 located between the fifth lens element 750 and an image surface 770. The reflective component 790 is a mirror. The IR cut filter 760 is made of glass material. Both the reflective component 790 and the IR cut filter 760 will not affect the focal length of the optical imaging system. The image sensor 780 is disposed on or near the image surface 770 of the optical imaging system.

The detailed optical data of the 7th embodiment are shown in TABLE 13, and the aspheric surface data are shown in TABLE 14, wherein the units of the curvature radius, the thickness and the focal length are expressed in mm, and HFOV is a half of the maximal field of view.

TABLE 13

(7th Embodiment)
f = 9.13 mm, Fno = 2.66, HFOV = 18.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | 2.600 | | | | |
| 2 | Reflective Component (Mirror) | Plano | | 2.800 | | | | |
| 3 | Lens 1 | 2.765 | ASP | 0.737 | Plastic | 1.545 | 56.1 | 9.27 |
| 4 | | 5.533 | ASP | 0.301 | | | | |
| 5 | Ape. Stop | Plano | | 0.223 | | | | |
| 6 | Lens 2 | −6.682 | ASP | 0.289 | Plastic | 1.639 | 23.3 | −3.27 |
| 7 | | 3.093 | ASP | 0.247 | | | | |
| 8 | Stop | Plano | | 0.100 | | | | |
| 9 | Lens 3 | 2.922 | ASP | 0.549 | Plastic | 1.660 | 20.4 | 5.59 |
| 10 | | 13.026 | ASP | 0.040 | | | | |
| 11 | Lens 4 | 6.057 | ASP | 0.850 | Plastic | 1.544 | 56.0 | 3.48 |
| 12 | | −2.616 | ASP | 0.040 | | | | |
| 13 | Lens 5 | 3.570 | ASP | 0.467 | Plastic | 1.566 | 37.4 | −4.47 |
| 14 | | 1.411 | ASP | 2.000 | | | | |
| 15 | IR Cut Filter | Plano | | 0.210 | Glass | 1.517 | 64.2 | — |
| 16 | | Plano | | 4.268 | | | | |
| 17 | Image Surface | Plano | | — | | | | |

* Reference wavelength is d-line 587.6 nm.
* The effective radius of Surface 1 is 2.600 mm.
* The effective radius of Surface 3 is 1.760 mm.
* The effective radius of Surface 8 is 1.660 mm.
* The effective radius of Surface 14 is 1.605 mm.

TABLE 14

Aspheric Coefficients

| Surface # | 3 | 4 | 6 | 7 | 9 |
|---|---|---|---|---|---|
| k = | −5.8892E−01 | −2.5732E+01 | −6.7401E+01 | −8.9403E+00 | −2.5268E+00 |
| A4 = | −4.8943E−04 | 1.5365E−02 | −1.1400E−01 | −1.2692E−01 | −4.6173E−02 |
| A6 = | 3.6283E−03 | −1.0973E−03 | 1.3924E−01 | 1.2796E−01 | −1.8703E−03 |
| A8 = | −2.9523E−03 | 1.0902E−03 | −8.2449E−02 | −5.4216E−02 | 2.4744E−02 |
| A10 = | 8.2670E−04 | −1.5977E−03 | 2.6749E−02 | 5.7985E−03 | −1.5414E−02 |
| A12 = | −1.6549E−04 | 2.3214E−04 | −4.5572E−03 | 3.0871E−03 | 4.3306E−03 |
| A14 = | | | 3.1682E−04 | −1.0464E−03 | −5.4530E−04 |
| A16 = | | | | 9.3658E−05 | 1.8787E−05 |

| Surface # | 10 | 11 | 12 | 13 | 14 |
|---|---|---|---|---|---|
| k = | 2.3762E+01 | −3.4858E+01 | −2.3045E+01 | −1.5149E+01 | −6.7755E+00 |
| A4 = | 3.5418E−02 | 7.6656E−02 | 9.8700E−03 | 4.2816E−02 | 7.4467E−02 |
| A6 = | −1.1826E−01 | −1.4888E−01 | −7.9840E−02 | −1.7400E−01 | −1.3763E−01 |
| A8 = | 1.2621E−01 | 1.3983E−01 | 1.0282E−01 | 2.2444E−01 | 1.5017E−01 |
| A10 = | −6.8407E−02 | −6.7971E−02 | −6.2976E−02 | −1.5587E−01 | −1.0365E−01 |
| A12 = | 2.0571E−02 | 1.7235E−02 | 1.9852E−02 | 5.9356E−02 | 4.2339E−02 |
| A14 = | −3.2943E−03 | −2.2976E−03 | −3.1915E−03 | −1.1670E−02 | −9.2608E−03 |
| A16 = | 2.2051E−04 | 1.3872E−04 | 2.0965E−04 | 9.2854E−04 | 8.3402E−04 |

In the 7th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 7th embodiment, so an explanation in this regard will not be provided again.

Moreover, these parameters can be calculated from TABLE 13 and TABLE 14 and satisfy the conditions stated in table below.

| 7th Embodiment | | | |
|---|---|---|---|
| f [mm] | 9.13 | TD | 3.84 |
| Fno | 2.66 | $|f/f1| + |f/f2| + |f/f3| + |f/f4| + |f/f5|$ | 10.07 |
| HFOV [deg.] | 18.0 | f/R5 | 3.12 |
| V3 + V5 | 57.8 | f/R10 | 6.47 |
| V4/V5 | 1.50 | f/TD | 2.38 |
| BL/R10 | 4.59 | f12/f345 | −2.05 |
| (T12 + T23)/(T34 + T45) | 10.89 | $|f2|/f1$ | 0.35 |

-continued

| 7th Embodiment | | | |
|---|---|---|---|
| T12/T23 | 1.51 | Y11/Y52 | 1.07 |
| T23/CT3 | 0.63 | Yc12/Y12 | 0.94 |

8th Embodiment

Figure 8A:
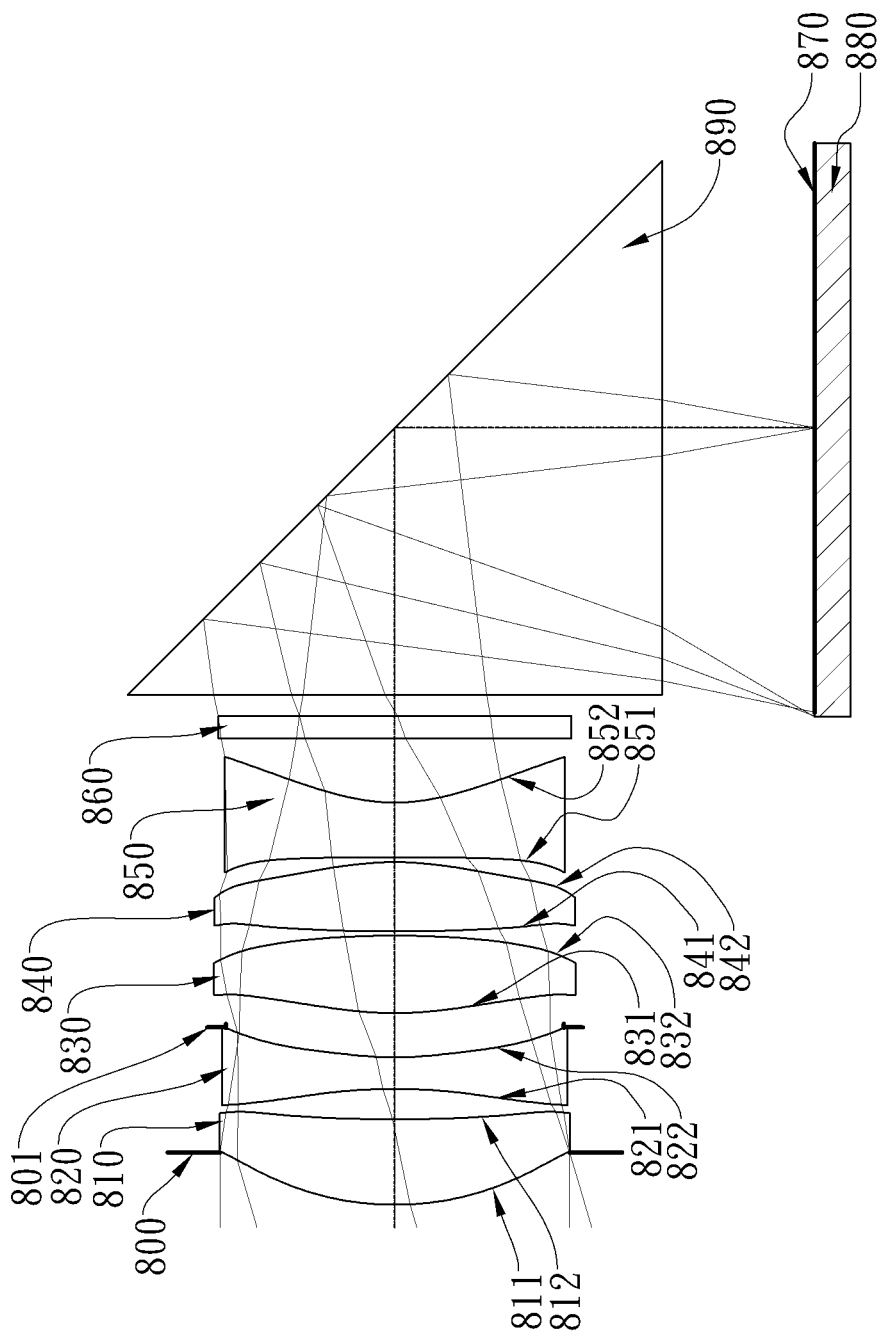
FIG. 8A is a schematic view of an imaging apparatus according to the 8th embodiment of the present disclosure.
Figure 8B:
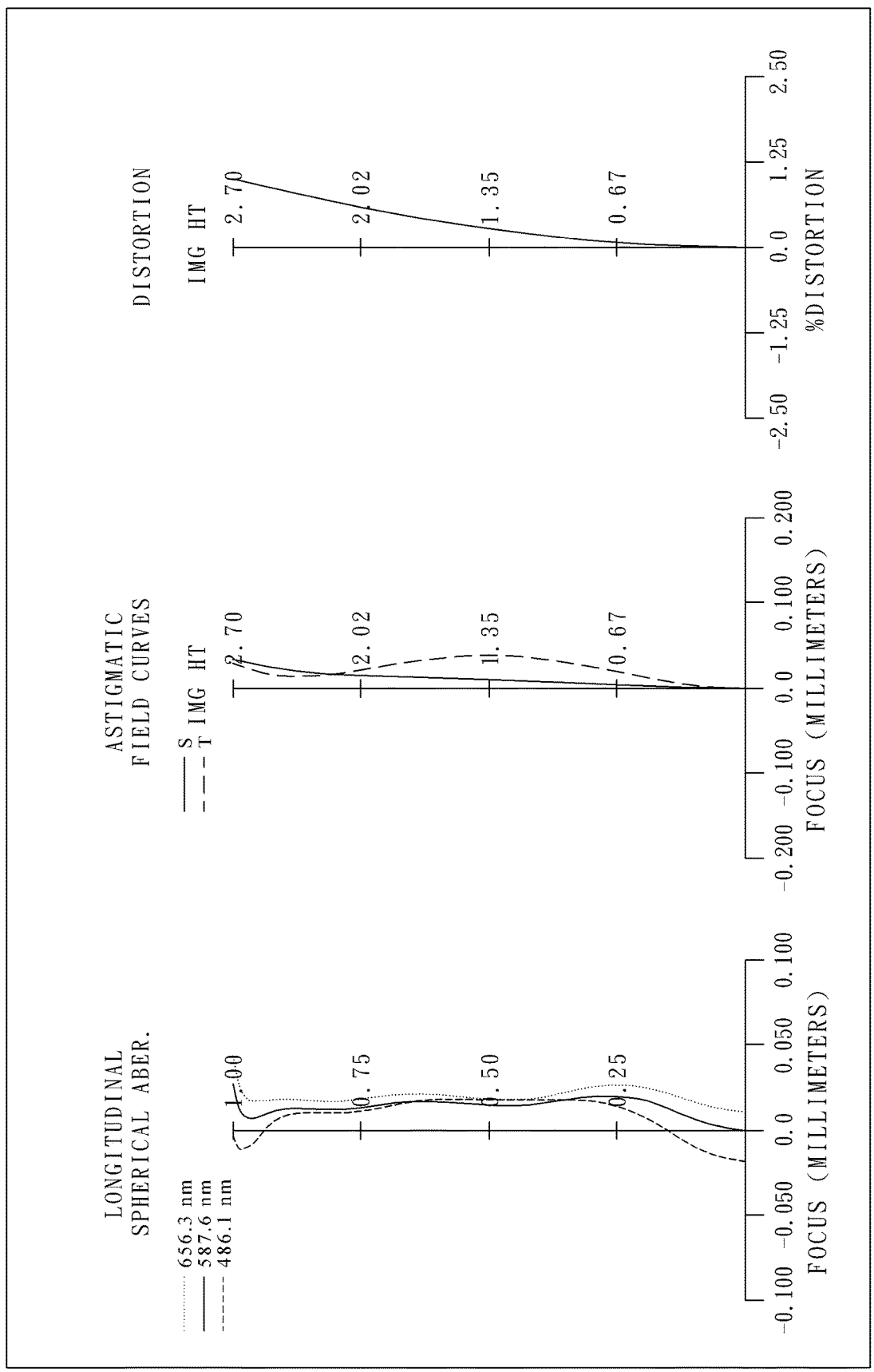
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus includes an optical imaging system (not otherwise herein labeled) of the present disclosure and an image sensor 880. The optical imaging system includes, in order from an object side to an image side, an aperture stop 800, a first lens element 810, a second lens element 820, a stop 801, a third lens element 830, a fourth lens element 840, and a fifth lens element 850. The optical imaging system includes five lens elements (810, 820, 830, 840 and 850) without any other lens elements being inserted between the first lens element 810 and the fifth lens element 850.

The first lens element 810 with positive refractive power has an object-side surface 811 being convex in a paraxial region thereof, an image-side surface 812 being concave in a paraxial region thereof, both the object-side surface 811 and the image-side surface 812 being aspheric, and one critical point in an off-axial region of the image-side surface 812 thereof. The first lens element 810 is made of plastic material.

The second lens element 820 with negative refractive power has an object-side surface 821 being concave in a paraxial region thereof, an image-side surface 822 being concave in a paraxial region thereof, and both the object-side surface 821 and the image-side surface 822 being aspheric. The second lens element 820 is made of plastic material.

The third lens element 830 with positive refractive power has an object-side surface 831 being convex in a paraxial region thereof, an image-side surface 832 being convex in a paraxial region thereof, and both the object-side surface 831 and the image-side surface 832 being aspheric. The third lens element 830 is made of plastic material.

The fourth lens element 840 with positive refractive power has an object-side surface 841 being convex in a paraxial region thereof, an image-side surface 842 being convex in a paraxial region thereof, and both the object-side surface 841 and the image-side surface 842 being aspheric. The fourth lens element 840 is made of plastic material.

The fifth lens element 850 with negative refractive power has an object-side surface 851 being concave in a paraxial region thereof, an image-side surface 852 being concave in a paraxial region thereof, both the object-side surface 851 and the image-side surface 852 being aspheric, and at least one inflection point on both the object-side surface 851 and the image-side surface 852 thereof. The fifth lens element 850 is made of plastic material.

The optical imaging system further includes an IR cut filter 860 located between the fifth lens element 850 and a reflective component 890, and the reflective component 890 located between the IR cut filter 860 and an image surface 870. The reflective component 890 is a prism. Both the reflective component 890 and the IR cut filter 860 are made of glass material and will not affect the focal length of the optical imaging system. The image sensor 880 is disposed on or near the image surface 870 of the optical imaging system.

The detailed optical data of the 8th embodiment are shown in TABLE 15, and the aspheric surface data are shown in TABLE 16, wherein the units of the curvature radius, the thickness and the focal length are expressed in mm, and HFOV is a half of the maximal field of view.

TABLE 15

(8th Embodiment)
f = 9.06 mm, Fno = 2.77, HFOV = 16.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.489 | | | | |
| 2 | Lens 1 | 2.759 | ASP | 0.800 | Plastic | 1.545 | 56.0 | 5.93 |
| 3 | | 16.977 | ASP | 0.283 | | | | |
| 4 | Lens 2 | −7.357 | ASP | 0.297 | Plastic | 1.614 | 26.0 | −3.35 |
| 5 | | 2.897 | ASP | 0.282 | | | | |
| 6 | Stop | Plano | | 0.132 | | | | |
| 7 | Lens 3 | 3.127 | ASP | 0.726 | Plastic | 1.639 | 23.5 | 3.61 |
| 8 | | −7.997 | ASP | 0.040 | | | | |
| 9 | Lens 4 | 34.124 | ASP | 0.649 | Plastic | 1.544 | 56.0 | 4.69 |
| 10 | | −2.742 | ASP | 0.040 | | | | |
| 11 | Lens 5 | −153.846 | ASP | 0.518 | Plastic | 1.584 | 28.2 | −2.92 |
| 12 | | 1.730 | ASP | 0.600 | | | | |
| 13 | IR Cut Filter | Plano | | 0.210 | Glass | 1.517 | 64.2 | — |
| 14 | | Plano | | 0.200 | | | | |
| 15 | Reflective Component (Prism) | Plano | | 5.000 | Glass | 1.517 | 64.2 | — |
| 16 | | Plano | | 1.420 | | | | |
| 17 | Image Surface | Plano | | — | | | | |

* Reference wavelength is d-line 587.6 nm.
* The effective radius of Surface 6 is 1.580 mm.
* The effective radius of Surface 12 is 1.590 mm.

TABLE 16

Aspheric Coefficients

| Surface # | 2 | 3 | 4 | 5 | 7 |
|---|---|---|---|---|---|
| k = | −3.0107E−01 | 4.9105E+01 | −9.8738E+01 | −1.0433E+01 | −4.1798E+00 |
| A4 = | 2.6963E−03 | 6.8466E−03 | −1.1635E−01 | −1.2290E−01 | −4.9279E−02 |
| A6 = | 2.8908E−03 | −1.2867E−03 | 1.4017E−01 | 1.3050E−01 | −1.8425E−03 |
| A8 = | −3.1588E−03 | 1.6059E−03 | −8.1544E−02 | −5.3881E−02 | 2.4710E−02 |
| A10 = | 1.2513E−03 | −1.6728E−03 | 2.6777E−02 | 5.9499E−03 | −1.5822E−02 |
| A12 = | −2.8332E−04 | 2.3817E−04 | −4.7155E−03 | 3.1071E−03 | 4.2806E−03 |
| A14 = | | | 3.4408E−04 | −1.0642E−03 | −5.4174E−04 |
| A16 = | | | | 8.3281E−05 | 2.3783E−05 |

| Surface # | 8 | 9 | 10 | 11 | 12 |
|---|---|---|---|---|---|
| k = | −9.8460E+01 | −9.0208E+01 | −2.6294E+01 | 9.0000E+01 | −9.6394E+00 |
| A4 = | 3.5837E−02 | 7.4994E−02 | 1.0424E−02 | 4.9873E−02 | 8.9901E−02 |
| A6 = | −1.1995E−01 | −1.4840E−01 | −7.5498E−02 | −1.7315E−01 | −1.4447E−01 |
| A8 = | 1.2526E−01 | 1.4090E−01 | 1.0404E−01 | 2.2362E−01 | 1.5129E−01 |
| A10 = | −6.8626E−02 | −6.7682E−02 | −6.2587E−02 | −1.5612E−01 | −1.0393E−01 |
| A12 = | 2.0543E−02 | 1.7171E−02 | 1.9785E−02 | 5.9353E−02 | 4.2802E−02 |
| A14 = | −3.2975E−03 | −2.3080E−03 | −3.4864E−03 | −1.1604E−02 | −9.4088E−03 |
| A16 = | 2.3136E−04 | 1.3562E−04 | 2.7602E−04 | 8.9863E−04 | 8.3860E−04 |

In the 8th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 8th embodiment, so an explanation in this regard will not be provided again.

Moreover, these parameters can be calculated from TABLE 15 and TABLE 16 and satisfy the conditions stated in table below.

| 8th Embodiment | | | |
|---|---|---|---|
| f [mm] | 9.06 | TD | 3.77 |
| Fno | 2.77 | $|f/f1| + |f/f2| + |f/f3| + |f/f4| + |f/f5|$ | 11.77 |
| HFOV [deg.] | 16.4 | f/R5 | 2.90 |
| V3 + V5 | 51.7 | f/R10 | 5.24 |
| V4/V5 | 1.98 | f/TD | 2.40 |
| BL/R10 | 4.30 | f12/f345 | −2.99 |
| (T12 + T23)/(T34 + T45) | 8.71 | |f2|/f1 | 0.56 |
| T12/T23 | 0.68 | Y11/Y52 | 1.03 |
| T23/CT3 | 0.57 | Yc12/Y12 | 0.90 |

9th Embodiment

Figure 9A:
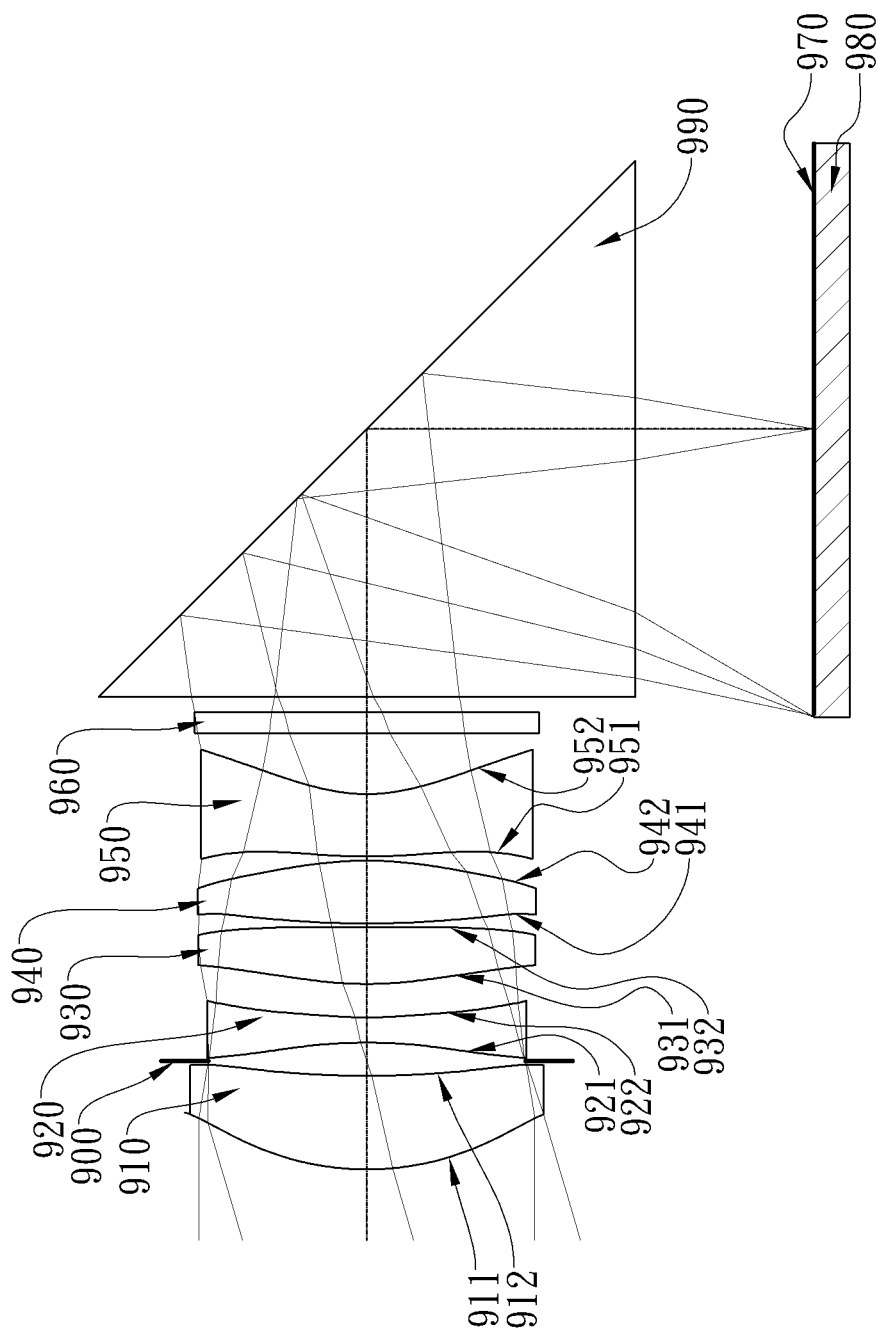
FIG. 9A is a schematic view of an imaging apparatus according to the 9th embodiment of the present disclosure.
Figure 9B:
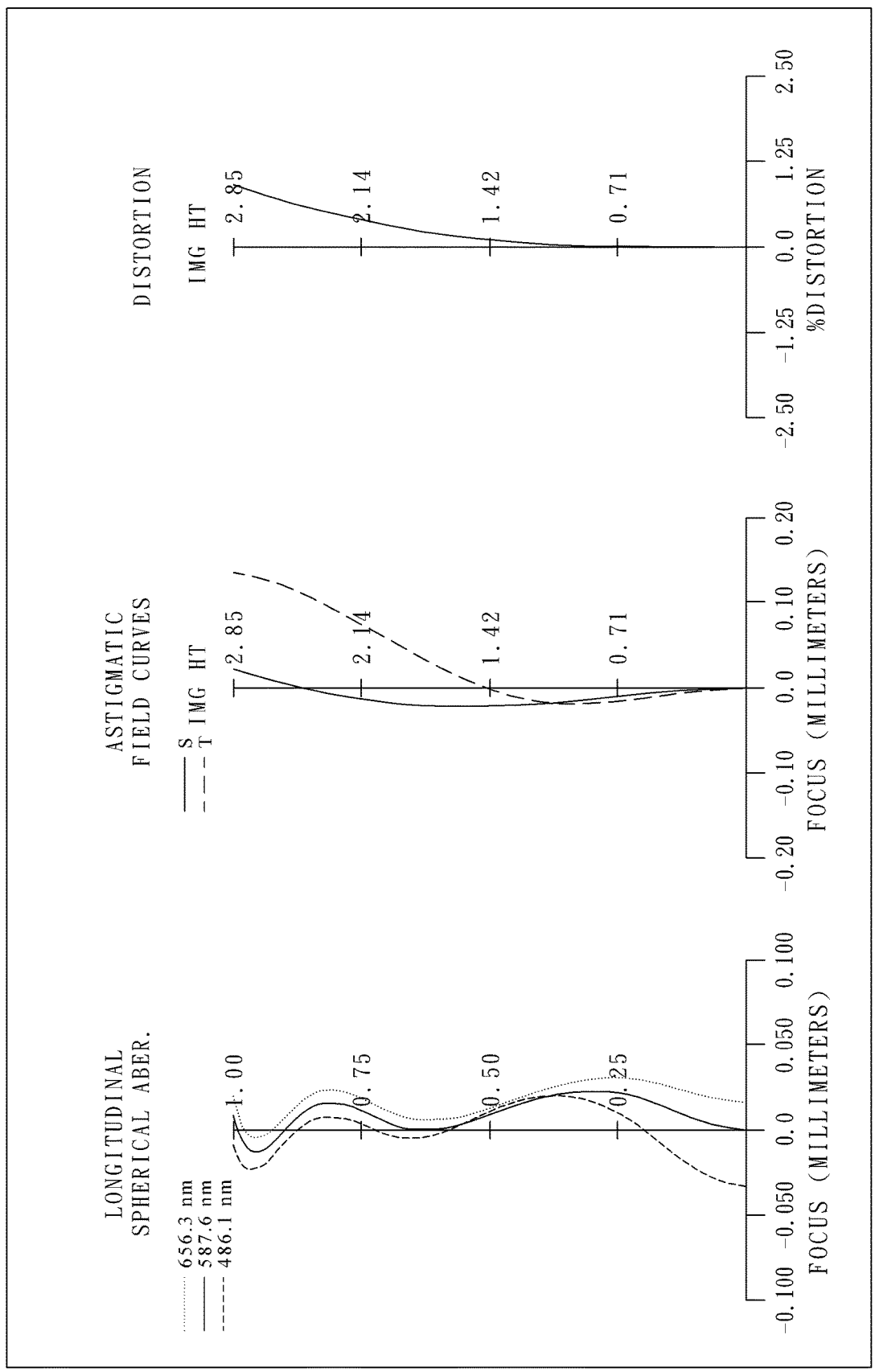
FIG. 9B shows longitudinal spherical aberration curves, astigmatic field curves and a distortion curve of the imaging apparatus according to the 9th embodiment.

FIG. 9A is a schematic view of an imaging apparatus according to the 9th embodiment of the present disclosure. FIG. 9B shows, in order from left to right, longitudinal spherical aberration curves, astigmatic field curves and a distortion curve of the imaging apparatus according to the 9th embodiment.

In FIG. 9A, the imaging apparatus includes an optical imaging system (not otherwise herein labeled) of the present disclosure and an image sensor 980. The optical imaging system includes, in order from an object side to an image side, a first lens element 910, an aperture stop 900, a second lens element 920, a third lens element 930, a fourth lens element 940, and a fifth lens element 950. The optical imaging system includes five lens elements (910, 920, 930, 940 and 950) without any other lens elements being inserted between the first lens element 910 and the fifth lens element 950.

The first lens element 910 with positive refractive power has an object-side surface 911 being convex in a paraxial region thereof, an image-side surface 912 being concave in a paraxial region thereof, both the object-side surface 911 and the image-side surface 912 being aspheric, and one critical point in an off-axial region of the image-side surface 912 thereof. The first lens element 910 is made of plastic material.

The second lens element 920 with negative refractive power has an object-side surface 921 being concave in a paraxial region thereof, an image-side surface 922 being concave in a paraxial region thereof, and both the object-side surface 921 and the image-side surface 922 being aspheric. The second lens element 920 is made of plastic material.

The third lens element 930 with positive refractive power has an object-side surface 931 being convex in a paraxial region thereof, an image-side surface 932 being concave in a paraxial region thereof, and both the object-side surface 931 and the image-side surface 932 being aspheric. The third lens element 930 is made of plastic material.

The fourth lens element 940 with positive refractive power has an object-side surface 941 being convex in a paraxial region thereof, an image-side surface 942 being convex in a paraxial region thereof, and both the object-side surface 941 and the image-side surface 942 being aspheric. The fourth lens element 940 is made of plastic material.

The fifth lens element 950 with negative refractive power has an object-side surface 951 being convex in a paraxial region thereof, an image-side surface 952 being concave in a paraxial region thereof, both the object-side surface 951 and the image-side surface 952 being aspheric, and at least one inflection point on both the object-side surface 951 and the image-side surface 952 thereof. The fifth lens element 950 is made of plastic material.

The optical imaging system further includes an IR cut filter 960 located between the fifth lens element 950 and a reflective component 990, and the reflective component 990 located between the IR cut filter 960 and an image surface 970. The reflective component 990 is a prism. Both the reflective component 990 and the IR cut filter 960 are made of glass material and will not affect the focal length of the optical imaging system. The image sensor 980 is disposed on or near the image surface 970 of the optical imaging system.

The detailed optical data of the 9th embodiment are shown in TABLE 17, and the aspheric surface data are shown in TABLE 18, wherein the units of the curvature radius, the thickness and the focal length are expressed in mm, and HFOV is a half of the maximal field of view.

TABLE 17

(9th Embodiment)
f = 9.62 mm, Fno = 2.90, HFOV = 16.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.778 | ASP | 0.924 | Plastic | 1.511 | 56.8 | 7.22 |
| 2 | | 9.985 | ASP | 0.146 | | | | |
| 3 | Ape. Stop | Plano | | 0.181 | | | | |
| 4 | Lens 2 | −6.659 | ASP | 0.250 | Plastic | 1.639 | 23.5 | −3.87 |
| 5 | | 3.992 | ASP | 0.331 | | | | |
| 6 | Lens 3 | 3.427 | ASP | 0.558 | Plastic | 1.671 | 19.3 | 5.35 |
| 7 | | 71.129 | ASP | 0.040 | | | | |
| 8 | Lens 4 | 12.340 | ASP | 0.622 | Plastic | 1.534 | 55.9 | 4.97 |
| 9 | | −3.325 | ASP | 0.040 | | | | |
| 10 | Lens 5 | 5.287 | ASP | 0.617 | Plastic | 1.584 | 28.2 | −4.38 |
| 11 | | 1.651 | ASP | 0.600 | | | | |
| 12 | IR Cut Filter | Plano | | 0.210 | Glass | 1.517 | 64.2 | — |
| 13 | | Plano | | 0.150 | | | | |
| 14 | Reflective Component (Prism) | Plano | | 5.300 | Glass | 1.517 | 64.2 | — |
| 15 | | Plano | | 1.755 | | | | |
| 16 | Image Surface | Plano | | — | | | | |

* Reference wavelength is d-line 587.6 nm.

TABLE 18

Aspheric Coefficients

| Surface # | 1 | 2 | 4 | 5 | 6 |
|---|---|---|---|---|---|
| k = | −4.1992E−01 | −6.6960E+01 | −9.7941E+01 | −8.7356E+00 | −3.0917E+00 |
| A4 = | 1.7883E−03 | 1.0375E−02 | −1.1400E−01 | −1.2661E−01 | −4.8295E−02 |
| A6 = | 3.2275E−03 | −1.9160E−03 | 1.4065E−01 | 1.2766E−01 | −2.6813E−03 |
| A8 = | −3.3798E−03 | 1.8725E−03 | −8.2207E−02 | −5.4006E−02 | 2.4675E−02 |
| A10 = | 1.1290E−03 | −1.5558E−03 | 2.6645E−02 | 6.0192E−02 | −1.5641E−02 |
| A12 = | −1.9031E−04 | 2.2352E−04 | −4.6426E−03 | 2.9893E−03 | 4.2779E−03 |
| A14 = | | | 3.4401E−04 | −1.0962E−03 | −5.3367E−04 |
| A16 = | | | | 1.1207E−04 | 2.4595E−05 |

| Surface # | 7 | 8 | 9 | 10 | 11 |
|---|---|---|---|---|---|
| k = | −9.1489E+01 | 2.5456E+01 | −3.1278E+01 | −8.6880E+01 | −9.2972E+00 |
| A4 = | 3.2171E−02 | 7.0691E−02 | 7.8012E−03 | 3.9136E−02 | 8.5367E−02 |
| A6 = | −1.1842E−01 | −1.5200E−01 | −7.6690E−02 | −1.7225E−01 | −1.4370E−01 |
| A8 = | 1.2579E−01 | 1.4070E−01 | 1.0357E−01 | 2.2453E−01 | 1.5155E−01 |
| A10 = | −6.8557E−02 | −6.7388E−02 | −6.3069E−02 | −1.5597E−01 | −1.0356E−01 |
| A12 = | 2.0586E−02 | 1.7244E−02 | 1.9840E−02 | 5.9252E−02 | 4.2273E−02 |
| A14 = | −3.2883E−03 | −2.3265E−03 | −3.2056E−03 | −1.1654E−02 | −9.2539E−03 |
| A16 = | 2.2128E−04 | 1.3609E−04 | 2.1505E−04 | 9.3310E−04 | 8.3277E−04 |

In the 9th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 9th embodiment, so an explanation in this regard will not be provided again.

Moreover, these parameters can be calculated from TABLE 17 and TABLE 18 and satisfy the conditions stated in table below.

| 9th Embodiment | | | |
|---|---|---|---|
| f [mm] | 9.62 | TD | 3.71 |
| Fno | 2.90 | |f/f1| + |f/f2| + |f/f3| + |f/f4| + |f/f5| | 9.74 |
| HFOV [deg.] | 16.3 | f/R5 | 2.81 |

-continued

| 9th Embodiment | | | |
|---|---|---|---|
| V3 + V5 | 47.5 | f/R10 | 5.83 |
| V4/V5 | 1.98 | f/TD | 2.59 |
| BL/R10 | 4.85 | f12/f345 | −2.96 |
| (T12 + T23)/(T34 + T45) | 8.23 | |f2|/f1 | 0.54 |
| T12/T23 | 0.99 | Y11/Y52 | 1.06 |
| T23/CT3 | 0.59 | Yc12/Y12 | 0.98 |

10th Embodiment

Figure 10A:
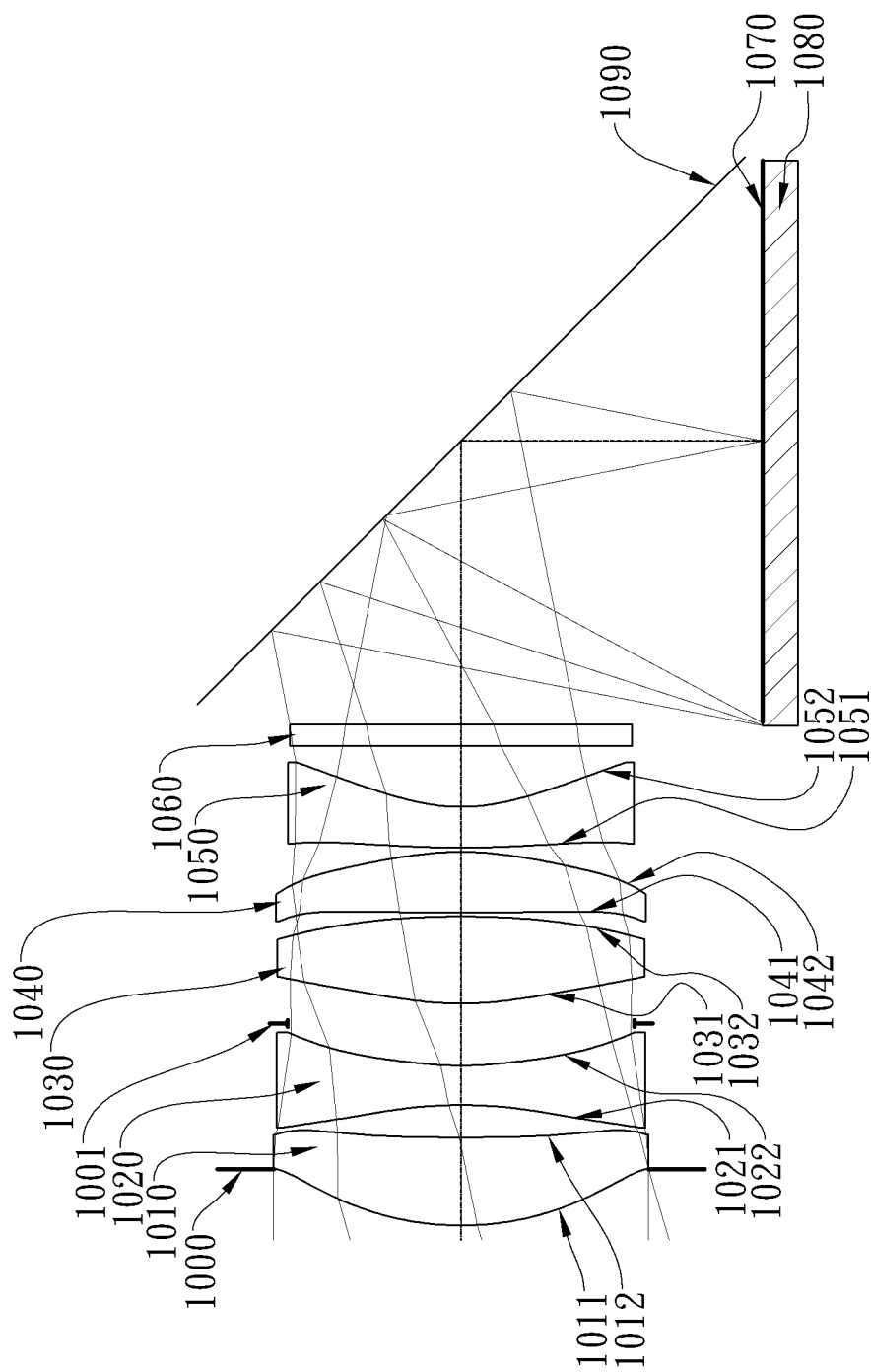
FIG. 10A is a schematic view of an imaging apparatus according to the 10th embodiment of the present disclosure.
Figure 10B:
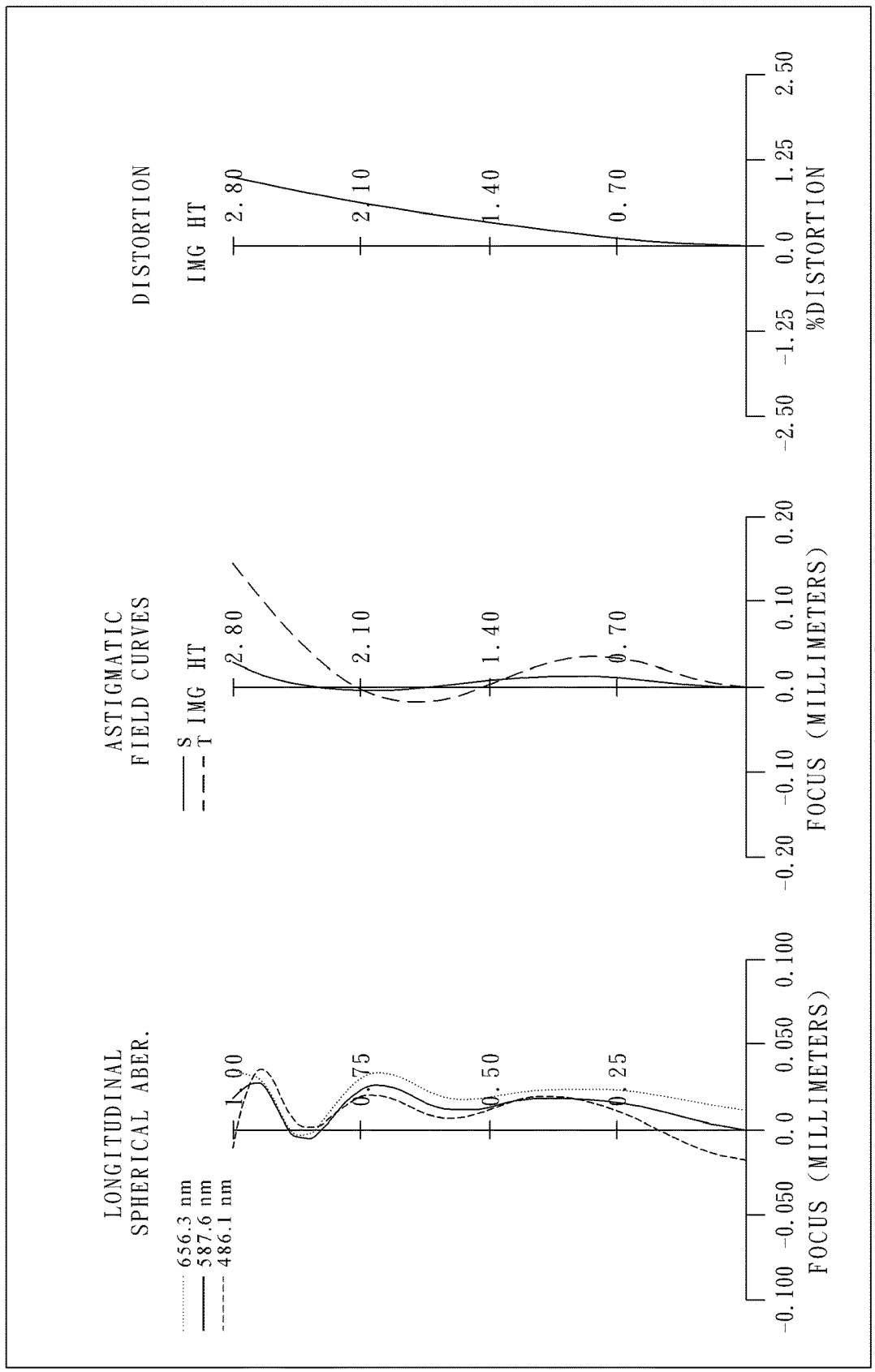
FIG. 10B shows longitudinal spherical aberration curves, astigmatic field curves and a distortion curve of the imaging apparatus according to the 10th embodiment.

FIG. 10A is a schematic view of an imaging apparatus according to the 10th embodiment of the present disclosure. FIG. 10B shows, in order from left to right, longitudinal spherical aberration curves, astigmatic field curves and a distortion curve of the imaging apparatus according to the 10th embodiment.

In FIG. 10A, the imaging apparatus includes an optical imaging system (not otherwise herein labeled) of the present disclosure and an image sensor 1080. The optical imaging system includes, in order from an object side to an image side, an aperture stop 1000, a first lens element 1010, a second lens element 1020, a stop 1001, a third lens element 1030, a fourth lens element 1040, and a fifth lens element 1050. The optical imaging system includes five lens elements (1010, 1020, 1030, 1040 and 1050) without any other lens elements being inserted between the first lens element 1010 and the fifth lens element 1050.

The first lens element 1010 with positive refractive power has an object-side surface 1011 being convex in a paraxial region thereof, an image-side surface 1012 being concave in a paraxial region thereof, both the object-side surface 1011 and the image-side surface 1012 being aspheric, and one critical point in an off-axial region of the image-side surface 1012 thereof. The first lens element 1010 is made of plastic material.

The second lens element 1020 with negative refractive power has an object-side surface 1021 being concave in a paraxial region thereof, an image-side surface 1022 being concave in a paraxial region thereof, and both the object-side surface 1021 and the image-side surface 1022 being aspheric. The second lens element 1020 is made of plastic material.

The third lens element 1030 with positive refractive power has an object-side surface 1031 being convex in a paraxial region thereof, an image-side surface 1032 being convex in a paraxial region thereof, and both the object-side surface 1031 and the image-side surface 1032 being aspheric. The third lens element 1030 is made of plastic material.

The fourth lens element 1040 with positive refractive power has an object-side surface 1041 being concave in a paraxial region thereof, an image-side surface 1042 being convex in a paraxial region thereof, and both the object-side surface 1041 and the image-side surface 1042 being aspheric. The fourth lens element 1040 is made of plastic material.

The fifth lens element 1050 with negative refractive power has an object-side surface 1051 being convex in a paraxial region thereof, an image-side surface 1052 being concave in a paraxial region thereof, both the object-side surface 1051 and the image-side surface 1052 being aspheric, and at least one inflection point on both the object-side surface 1051 and the image-side surface 1052 thereof. The fifth lens element 1050 is made of plastic material.

The optical imaging system further includes an IR cut filter 1060 located between the fifth lens element 1050 and a reflective component 1090, and the reflective component 1090 located between the IR cut filter 1060 and an image surface 1070. The reflective component 1090 is a mirror. The IR cut filter 1060 is made of glass material. Both the reflective component 1090 and the IR cut filter 1060 will not affect the focal length of the optical imaging system. The image sensor 1080 is disposed on or near the image surface 1070 of the optical imaging system.

The detailed optical data of the 10th embodiment are shown in TABLE 19, and the aspheric surface data are shown in TABLE 20, wherein the units of the curvature radius, the thickness and the focal length are expressed in mm, and HFOV is a half of the maximal field of view.

TABLE 19

(10th Embodiment)
f = 9.50 mm, Fno = 2.57, HFOV = 16.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.554 | | | | |
| 2 | Lens 1 | 2.935 | ASP | 0.867 | Plastic | 1.544 | 55.9 | 5.98 |
| 3 | | 26.991 | ASP | 0.320 | | | | |
| 4 | Lens 2 | −5.234 | ASP | 0.389 | Plastic | 1.614 | 26.0 | −3.07 |
| 5 | | 3.033 | ASP | 0.416 | | | | |
| 6 | Stop | Plano | | 0.196 | | | | |
| 7 | Lens 3 | 3.092 | ASP | 0.859 | Plastic | 1.639 | 23.3 | 3.61 |
| 8 | | −8.086 | ASP | 0.040 | | | | |
| 9 | Lens 4 | −54.926 | ASP | 0.598 | Plastic | 1.544 | 56.0 | 5.25 |
| 10 | | −2.724 | ASP | 0.040 | | | | |
| 11 | Lens 5 | 10.792 | ASP | 0.403 | Plastic | 1.614 | 26.0 | −3.51 |
| 12 | | 1.770 | ASP | 0.600 | | | | |
| 13 | IR Cut Filter | Plano | | 0.210 | Glass | 1.517 | 64.2 | — |
| 14 | | Plano | | 2.800 | | | | |
| 15 | Reflective Component (Mirror) | Plano | | 2.967 | | | | |
| 16 | Image Surface | Plano | | — | | | | |

\* Reference wavelength is d-line 587.6 nm.
\* The effective radius of Surface 6 is 1.710 mm.
\* The effective radius of Surface 12 is 1.630 mm.

TABLE 20

| Aspheric Coefficients | | | | | |
|---|---|---|---|---|---|
| Surface # | 2 | 3 | 4 | 5 | 7 |
| k = | −2.9562E−01 | 8.3085E+01 | −6.4819E+01 | −6.0391E+00 | −2.9358E+00 |
| A4 = | 2.7988E−03 | 1.2049E−02 | −1.1675E−01 | −1.2272E−01 | −4.8415E−02 |
| A6 = | 3.1329E−03 | −1.6626E−03 | 1.4083E−01 | 1.2862E−01 | −3.0483E−03 |
| A8 = | −3.2960E−03 | 1.7459E−03 | −8.1947E−02 | −5.4230E−02 | 2.4868E−02 |
| A10 = | 1.1305E−03 | −1.5467E−03 | 2.6576E−02 | 5.9852E−03 | −1.5539E−02 |
| A12 = | −1.8850E−04 | 2.2597E−04 | −4.6722E−03 | 3.0529E−03 | 4.2983E−03 |
| A14 = | | | 3.5104E−04 | −1.0763E−03 | −5.3561E−04 |
| A16 = | | | | 1.0067E−04 | 2.1576E−05 |
| Surface # | 8 | 9 | 10 | 11 | 12 |
| k = | −9.9000E+01 | −9.9000E+01 | −2.8830E+01 | −1.0907E+01 | −1.0414E+01 |
| A4 = | 3.1104E−02 | 7.6887E−02 | 4.7930E−03 | 4.7090E−02 | 8.8852E−02 |
| A6 = | −1.1789E−01 | −1.5267E−01 | −7.6366E−02 | −1.7122E−01 | −1.4227E−01 |
| A8 = | 1.2580E−01 | 1.4059E−01 | 1.0349E−01 | 2.2494E−01 | 1.5125E−01 |
| A10 = | −6.8531E−02 | −6.7408E−02 | −6.3044E−02 | −1.5589E−01 | −1.0361E−01 |
| A12 = | 2.0587E−02 | 1.7249E−02 | 1.9828E−02 | 5.9201E−02 | 4.2271E−02 |
| A14 = | −3.2884E−03 | −2.3291E−03 | −3.2068E−03 | −1.1671E−02 | −9.2591E−03 |
| A16 = | 2.2192E−04 | 1.3811E−04 | 2.1316E−04 | 9.3454E−04 | 8.3405E−04 |

In the 10th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 10th embodiment, so an explanation in this regard will not be provided again.

Moreover, these parameters can be calculated from TABLE 19 and TABLE 20 and satisfy the conditions stated in table below.

| 10th Embodiment | | | |
|---|---|---|---|
| f [mm] | 9.50 | TD | 4.13 |
| Fno | 2.57 | |f/f1| + |f/f2| + |f/f3| + |f/f4| + |f/f5| | 11.83 |
| HFOV [deg.] | 16.2 | f/R5 | 3.07 |
| V3 + V5 | 49.3 | f/R10 | 5.37 |
| V4/V5 | 2.15 | f/TD | 2.30 |
| BL/R10 | 3.72 | f12/f345 | −2.47 |
| (T12 + T23)/(T34 + T45) | 11.65 | |f2|/f1 | 0.51 |
| T12/T23 | 0.52 | Y11/Y52 | 1.13 |
| T23/CT3 | 0.71 | Yc12/Y12 | 0.85 |

11th Embodiment

Figure 11A:
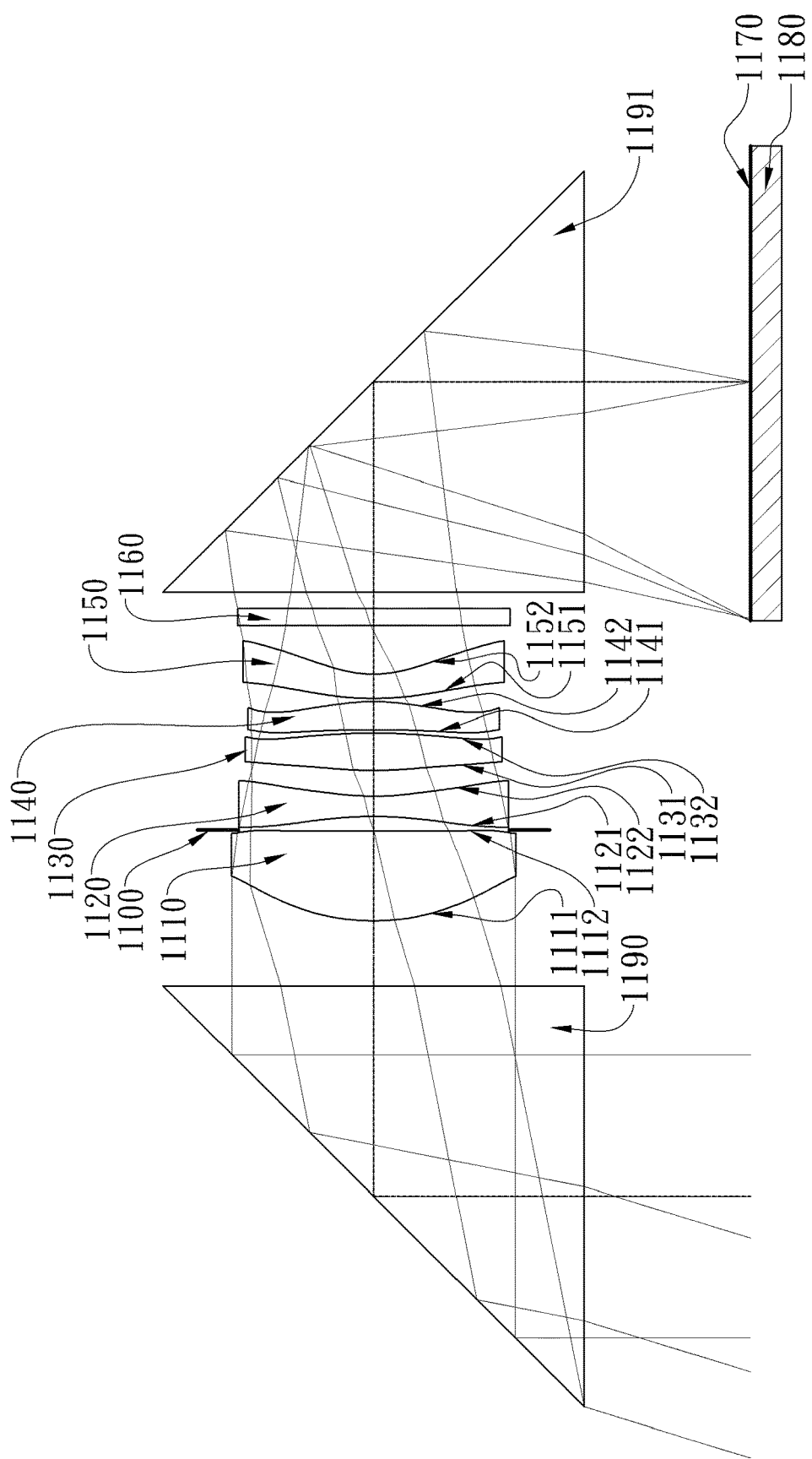
FIG. 11A is a schematic view of an imaging apparatus according to the 11th embodiment of the present disclosure.
Figure 11B:
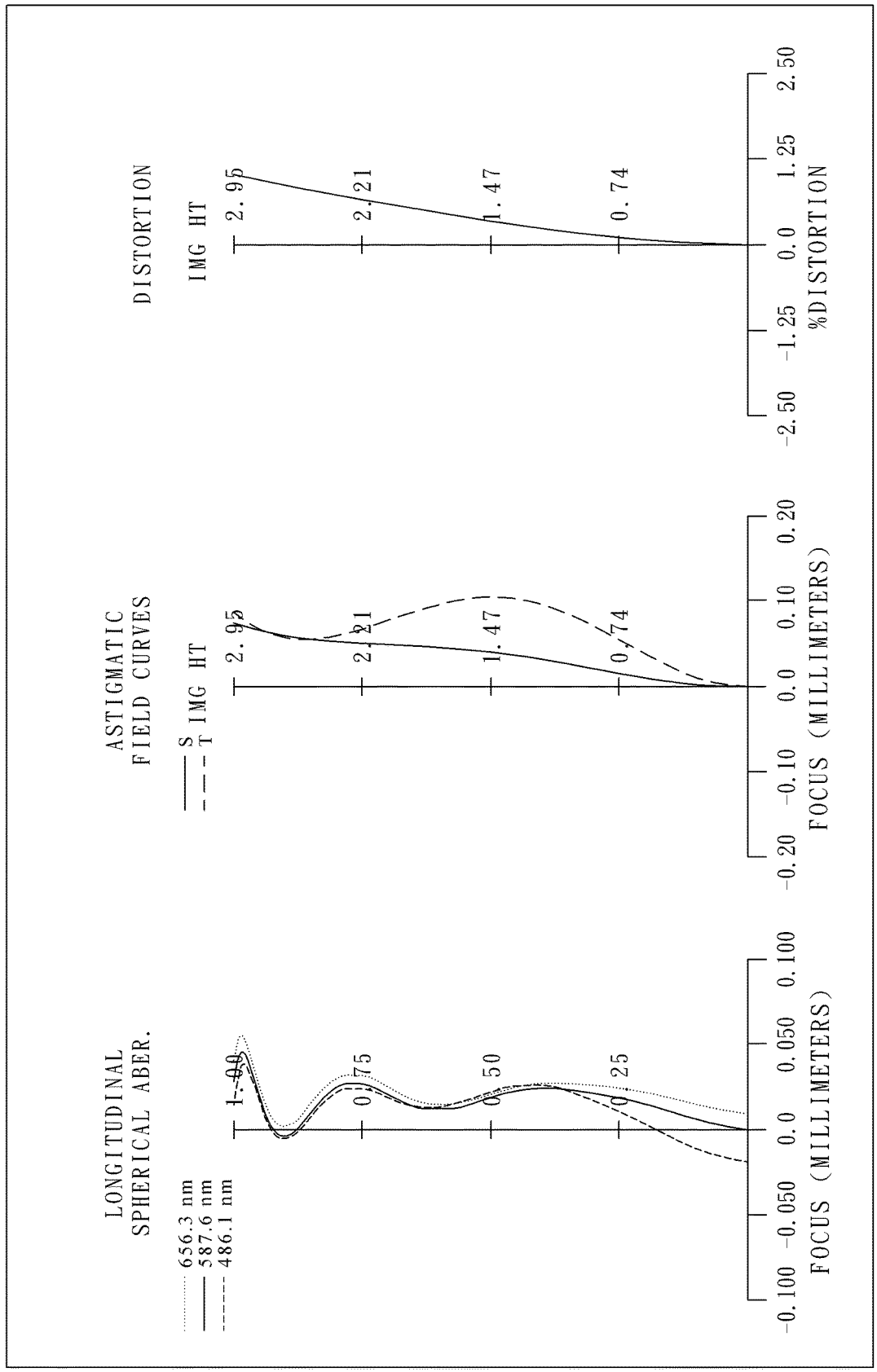
FIG. 11B shows longitudinal spherical aberration curves, astigmatic field curves and a distortion curve of the imaging apparatus according to the 11th embodiment.

FIG. 11A is a schematic view of an imaging apparatus according to the 11th embodiment of the present disclosure. FIG. 11B shows, in order from left to right, longitudinal spherical aberration curves, astigmatic field curves and a distortion curve of the imaging apparatus according to the 11th embodiment.

In FIG. 11A, the imaging apparatus includes an optical imaging system (not otherwise herein labeled) of the present disclosure and an image sensor 1180. The optical imaging system includes, in order from an object side to an image side, a first lens element 1110, an aperture stop 1100, a second lens element 1120, a third lens element 1130, a fourth lens element 1140, and a fifth lens element 1150. The optical imaging system includes five lens elements (1110, 1120, 1130, 1140 and 1150) without any other lens elements being inserted between the first lens element 1110 and the fifth lens element 1150.

The first lens element 1110 with positive refractive power has an object-side surface 1111 being convex in a paraxial region thereof, an image-side surface 1112 being convex in a paraxial region thereof, both the object-side surface 1111 and the image-side surface 1112 being aspheric, and two critical points in an off-axial region of the image-side surface 1112 thereof. The first lens element 1110 is made of plastic material.

The second lens element 1120 with negative refractive power has an object-side surface 1121 being concave in a paraxial region thereof, an image-side surface 1122 being concave in a paraxial region thereof, and both the object-side surface 1121 and the image-side surface 1122 being aspheric. The second lens element 1120 is made of plastic material.

The third lens element 1130 with positive refractive power has an object-side surface 1131 being convex in a paraxial region thereof, an image-side surface 1132 being convex in a paraxial region thereof, and both the object-side surface 1131 and the image-side surface 1132 being aspheric. The third lens element 1130 is made of plastic material.

The fourth lens element 1140 with positive refractive power has an object-side surface 1141 being concave in a paraxial region thereof, an image-side surface 1142 being convex in a paraxial region thereof, and both the object-side surface 1141 and the image-side surface 1142 being aspheric. The fourth lens element 1140 is made of plastic material.

The fifth lens element 1150 with negative refractive power has an object-side surface 1151 being convex in a paraxial region thereof, an image-side surface 1152 being concave in a paraxial region thereof, both the object-side surface 1151 and the image-side surface 1152 being aspheric, and at least one inflection point on both the object-side surface 1151 and the image-side surface 1152 thereof. The fifth lens element 1150 is made of plastic material.

The optical imaging system further includes a reflective component 1190 disposed at an object side of the first lens element 1110, an IR cut filter 1160 located between the fifth lens element 1150 and a reflective component 1191, and the reflective component 1191 located between the IR cut filter 1160 and an image surface 1170. Both the reflective component 1190 and the reflective component 1191 are prisms. The reflective component 1190, the reflective component 1191 and the IR cut filter 1160 are all made of glass material and will not affect the focal length of the optical imaging system. The image sensor 1180 is disposed on or near the image surface 1170 of the optical imaging system.

The detailed optical data of the 11th embodiment are shown in TABLE 21, and the aspheric surface data are shown in TABLE 22, wherein the units of the curvature radius, the thickness and the focal length are expressed in mm, and HFOV is a half of the maximal field of view.

surface 1112 thereof. Two vertical distances between the two critical points and an optical axis are Yc12, a vertical distance between a maximum effective diameter position on the image-side surface 1112 of the first lens element 1110 and the optical axis is Y12, and they satisfy the condition: Yc12/Y12=0.33, and Yc12/Y12=0.81, respectively.

As the other definitions of these parameters shown in table below are the same as those stated in the 3rd embodi-

TABLE 21

(11th Embodiment)
f = 9.46 mm, Fno = 2.70, HFOV = 17.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Reflective Component (Prism) | Plano | | 5.200 | Glass | 1.517 | 64.2 | — |
| 2 | | Plano | | 0.800 | | | | |
| 3 | Lens 1 | 2.716 | ASP | 1.108 | Plastic | 1.545 | 56.1 | 4.90 |
| 4 | | −142.857 | ASP | 0.016 | | | | |
| 5 | Ape. Stop | Plano | | 0.168 | | | | |
| 6 | Lens 2 | −6.267 | ASP | 0.250 | Plastic | 1.614 | 26.0 | −3.10 |
| 7 | | 2.767 | ASP | 0.319 | | | | |
| 8 | Lens 3 | 4.273 | ASP | 0.461 | Plastic | 1.660 | 20.4 | 4.00 |
| 9 | | −6.611 | ASP | 0.040 | | | | |
| 10 | Lens 4 | −12.087 | ASP | 0.345 | Plastic | 1.544 | 56.0 | 5.45 |
| 11 | | −2.406 | ASP | 0.040 | | | | |
| 12 | Lens 5 | 3.792 | ASP | 0.300 | Plastic | 1.614 | 26.0 | −3.62 |
| 13 | | 1.359 | ASP | 0.600 | | | | |
| 14 | IR Cut Filter | Plano | | 0.210 | Glass | 1.517 | 64.2 | — |
| 15 | | Plano | | 0.200 | | | | |
| 16 | Reflective Component (Prism) | Plano | | 5.200 | Glass | 1.517 | 64.2 | — |
| 17 | | Plano | | 2.047 | | | | |
| 18 | Image Surface | Plano | | — | | | | |

* Reference wavelength is d-line 587.6 nm.
* The effective radius of Surface 1 is 2.600 mm.
* The effective radius of Surface 13 is 1.610 mm.

TABLE 22

Aspheric Coefficients

| Surface # | 3 | 4 | 6 | 7 | 8 |
|---|---|---|---|---|---|
| k = | −7.2181E−01 | 9.0000E+01 | −9.9000E+01 | −9.5088E+00 | −1.4956E+01 |
| A4 = | 5.8743E−04 | 5.8949E−03 | −1.1276E−01 | −1.2682E−01 | −5.2127E−02 |
| A6 = | 4.7542E−03 | −9.4563E−04 | 1.3995E−01 | 1.2675E−01 | 1.2139E−03 |
| A8 = | −3.7242E−03 | 2.2802E−03 | −8.1439E−02 | −5.4422E−02 | 2.5899E−02 |
| A10 = | 1.1532E−03 | −1.5633E−03 | 2.6807E−02 | 6.0501E−03 | −1.5984E−02 |
| A12 = | −1.9132E−04 | 1.9668E−04 | −4.7326E−03 | 3.0098E−03 | 4.2871E−03 |
| A14 = | | | 3.4313E−04 | −1.0884E−03 | −5.5731E−04 |
| A16 = | | | | 1.0186E−04 | 2.7584E−05 |

| Surface # | 9 | 10 | 11 | 12 | 13 |
|---|---|---|---|---|---|
| k = | −7.9317E+01 | 5.3912E+01 | −2.6686E+01 | −2.7415E+00 | −7.2067E+00 |
| A4 = | 4.5920E−02 | 6.8706E−02 | 2.4998E−02 | 4.5745E−02 | 6.2182E−02 |
| A6 = | −1.2128E−01 | −1.4343E−01 | −7.9188E−02 | −1.7727E−01 | −1.3592E−01 |
| A8 = | 1.2637E−01 | 1.4274E−01 | 1.0654E−01 | 2.2409E−01 | 1.4997E−01 |
| A10 = | −6.7176E−02 | −6.7559E−02 | −6.1405E−02 | −1.5446E−01 | −1.0348E−01 |
| A12 = | 2.0559E−02 | 1.7150E−02 | 1.9200E−02 | 5.9089E−02 | 4.2215E−02 |
| A14 = | −3.4189E−03 | −2.2941E−03 | −3.2068E−03 | −1.1684E−02 | −9.2182E−03 |
| A16 = | 2.4041E−04 | 1.4563E−04 | 2.3366E−04 | 9.2082E−04 | 8.2352E−04 |

In the 11th embodiment, the equation of the aspheric surface profiles of the aforementioned lens elements is the same as the equation of the 1st embodiment.

In the 11th embodiment, the first lens element 1110 has two critical points in an off-axial region of the image-side ment with corresponding values for the 11th embodiment, an explanation in this regard will not be provided again.

Moreover, these parameters can be calculated from TABLE 21 and TABLE 22 and satisfy the conditions stated in table below.

| 11th Embodiment | | | |
|---|---|---|---|
| f [mm] | 9.46 | TD | 3.05 |
| Fno | 2.70 | TD/TP | 0.59 |
| HFOV [deg.] | 17.1 | \|f/f1\| + \|f/f2\| + \|f/f3\| + \|f/f4\| + \|f/f5\| | 11.69 |
| V3 + V5 | 46.4 | f/R 5 | 2.21 |
| V4/V5 | 2.16 | f/R 10 | 6.96 |
| BL/R10 | 6.08 | f/TD | 3.10 |
| (T12 + T23)/(T34 + T45) | 6.29 | f12/f345 | −3.76 |
| T12/T23 | 0.58 | \|f2\|/f1 | 0.63 |
| T23/CT3 | 0.69 | Y11/Y52 | 1.09 |

12th Embodiment

Figure 12A:
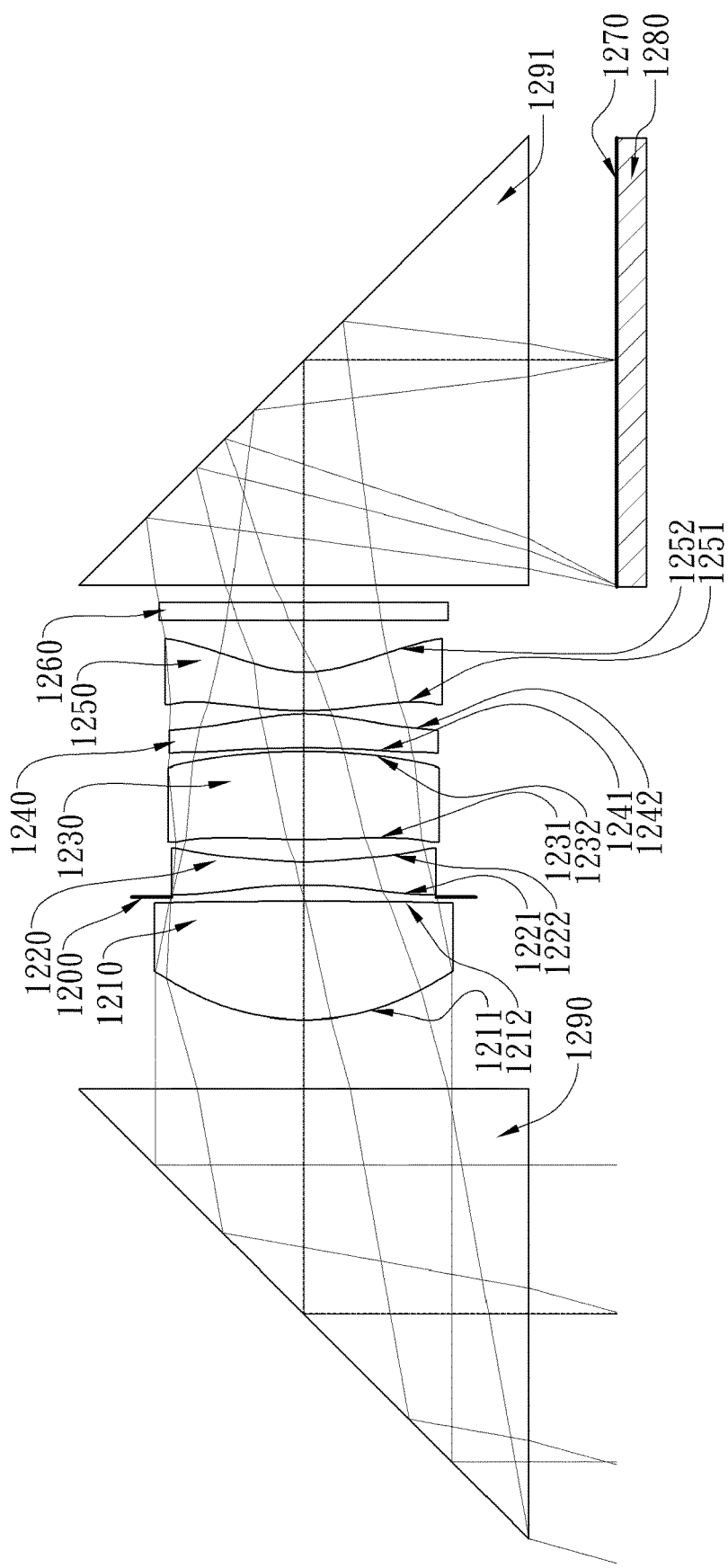
FIG. 12A is a schematic view of an imaging apparatus according to the 12th embodiment of the present disclosure.
Figure 12B:
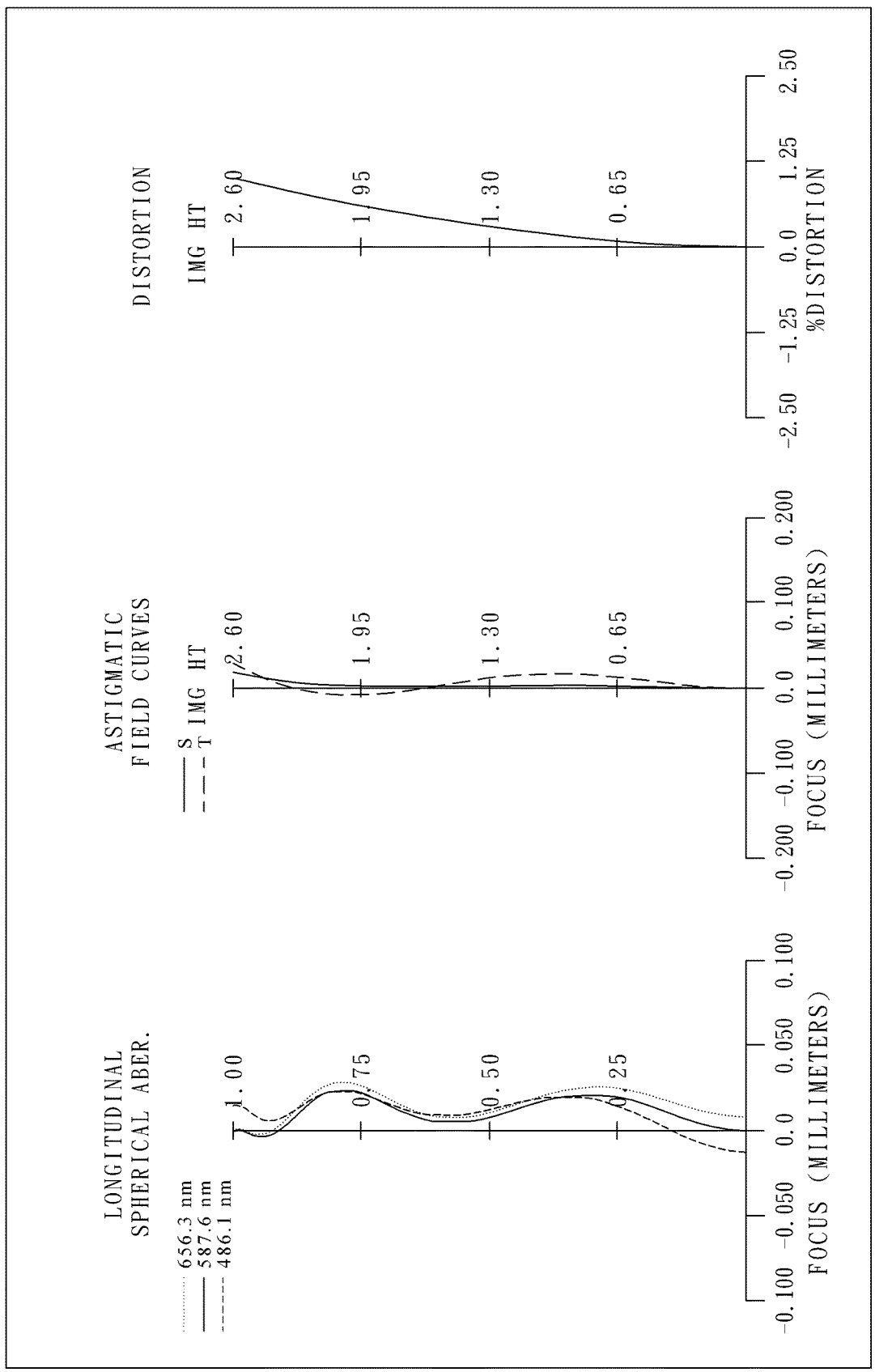
FIG. 12B shows longitudinal spherical aberration curves, astigmatic field curves and a distortion curve of the imaging apparatus according to the 12th embodiment.

FIG. 12A is a schematic view of an imaging apparatus according to the 12th embodiment of the present disclosure. FIG. 12B shows, in order from left to right, longitudinal spherical aberration curves, astigmatic field curves and a distortion curve of the imaging apparatus according to the 12th embodiment.

In FIG. 12A, the imaging apparatus includes an optical imaging system (not otherwise herein labeled) of the present disclosure and an image sensor 1280. The optical imaging system includes, in order from an object side to an image side, a first lens element 1210, an aperture stop 1200, a second lens element 1220, a third lens element 1230, a fourth lens element 1240, and a fifth lens element 1250. The optical imaging system includes five lens elements (1210, 1220, 1230, 1240 and 1250) without any other lens elements being inserted between the first lens element 1210 and the fifth lens element 1250.

The first lens element 1210 with positive refractive power has an object-side surface 1211 being convex in a paraxial region thereof, an image-side surface 1212 being convex in a paraxial region thereof, both the object-side surface 1211 and the image-side surface 1212 being aspheric, and two critical points in an off-axial region of the image-side surface 1212 thereof. The first lens element 1210 is made of plastic material.

The second lens element 1220 with negative refractive power has an object-side surface 1221 being concave in a paraxial region thereof, an image-side surface 1222 being concave in a paraxial region thereof, and both the object-side surface 1221 and the image-side surface 1222 being aspheric. The second lens element 1220 is made of plastic material.

The third lens element 1230 with positive refractive power has an object-side surface 1231 being convex in a paraxial region thereof, an image-side surface 1232 being convex in a paraxial region thereof, and both the object-side surface 1231 and the image-side surface 1232 being aspheric. The third lens element 1230 is made of plastic material.

The fourth lens element 1240 with positive refractive power has an object-side surface 1241 being concave in a paraxial region thereof, an image-side surface 1242 being convex in a paraxial region thereof, and both the object-side surface 1241 and the image-side surface 1242 being aspheric. The fourth lens element 1240 is made of plastic material.

The fifth lens element 1250 with negative refractive power has an object-side surface 1251 being convex in a paraxial region thereof, an image-side surface 1252 being concave in a paraxial region thereof, both the object-side surface 1251 and the image-side surface 1252 being aspheric, and at least one inflection point on both the object-side surface 1251 and the image-side surface 1252 thereof. The fifth lens element 1250 is made of plastic material.

The optical imaging system further includes a reflective component 1290 disposed at an object side of the first lens element 1210, and an IR cut filter 1260 located between the fifth lens element 1250 and a reflective component 1291, and the reflective component 1291 located between the IR cut filter 1260 and an image surface 1270. Both the reflective component 1290 and the reflective component 1291 are prisms. The reflective component 1290, the reflective component 1291 and the IR cut filter 1260 are all made of glass material and will not affect the focal length of the optical imaging system. The image sensor 1280 is disposed on or near the image surface 1270 of the optical imaging system.

The detailed optical data of the 12th embodiment are shown in TABLE 23, and the aspheric surface data are shown in TABLE 24, wherein the units of the curvature radius, the thickness and the focal length are expressed in mm, and HFOV is a half of the maximal field of view.

TABLE 23

(12th Embodiment)
f = 9.26 mm, Fno = 2.70, HFOV = 15.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Reflective Component (Prism) | Plano | | 5.200 | Glass | 1.517 | 64.2 | — |
| 2 | | Plano | | 0.800 | | | | |
| 3 | Lens 1 | 2.813 | ASP | 1.370 | Plastic | 1.545 | 56.1 | 4.83 |
| 4 | | −34.427 | ASP | 0.046 | | | | |
| 5 | Ape. Stop | Plano | | 0.141 | | | | |
| 6 | Lens 2 | −7.228 | ASP | 0.271 | Plastic | 1.614 | 26.0 | −3.85 |
| 7 | | 3.558 | ASP | 0.257 | | | | |
| 8 | Lens 3 | 8.247 | ASP | 1.016 | Plastic | 1.671 | 19.3 | 5.47 |
| 9 | | −6.286 | ASP | 0.040 | | | | |
| 10 | Lens 4 | −10.038 | ASP | 0.393 | Plastic | 1.544 | 56.0 | 5.55 |
| 11 | | −2.354 | ASP | 0.040 | | | | |
| 12 | Lens 5 | 4.684 | ASP | 0.444 | Plastic | 1.614 | 26.0 | −3.55 |
| 13 | | 1.435 | ASP | 0.600 | | | | |
| 14 | IR Cut Filter | Plano | | 0.210 | Glass | 1.517 | 64.2 | — |
| 15 | | Plano | | 0.200 | | | | |

TABLE 23-continued (12th Embodiment)
f = 9.26 mm, Fno = 2.70, HFOV = 15.5 deg.

| Surface # | | Curvature Radius | Thickness | Material | Index | Abbe # | Focal Length |
|---|---|---|---|---|---|---|---|
| 16 | Reflective Component (Prism) | Plano | 5.200 | Glass | 1.517 | 64.2 | — |
| 17 | | Plano | 1.017 | | | | |
| 18 | Image Surface | Plano | — | | | | |

* Reference wavelength is d-line 587.6 nm.
* The effective radius of Surface 1 is 2.600 mm.
* The effective radius of Surface 13 is 1.610 mm.

TABLE 24

| Aspheric Coefficients | | | | | |
|---|---|---|---|---|---|
| Surface # | 3 | 4 | 6 | 7 | 8 |
| k = | −5.7851E−01 | 4.6106E+01 | −9.9000E+01 | −1.1765E+01 | −1.0929E+01 |
| A4 = | 1.5197E−03 | 4.1123E−03 | −1.1046E−01 | −1.2735E−01 | −5.1856E−02 |
| A6 = | 3.8647E−03 | −3.5554E−04 | 1.3995E−01 | 1.2807E−01 | −5.3430E−04 |
| A8 = | −3.4947E−03 | 2.8757E−03 | −8.1721E−02 | −5.3415E−02 | 2.4522E−02 |
| A10 = | 1.2769E−03 | −1.6895E−03 | 2.6987E−02 | 5.9384E−03 | −1.6235E−02 |
| A12 = | −1.9132E−04 | 1.9668E−04 | −4.7326E−03 | 3.0098E−03 | 4.2871E−03 |
| A14 = | | | 3.4313E−04 | −1.0884E−03 | −5.5731E−04 |
| A16 = | | | | 1.0186E−04 | 2.7584E−05 |
| Surface # | 9 | 10 | 11 | 12 | 13 |
| k = | −3.4730E+01 | 3.7100E+01 | −2.0435E+01 | −3.8473E+00 | −7.2034E+00 |
| A4 = | 4.5633E−02 | 7.0040E−02 | 3.0202E−02 | 4.2433E−02 | 5.7077E−02 |
| A6 = | −1.2257E−01 | −1.4223E−01 | −8.2264E−02 | −1.8011E−01 | −1.3281E−01 |
| A8 = | 1.2529E−01 | 1.4298E−01 | 1.0514E−01 | 2.2502E−01 | 1.4895E−01 |
| A10 = | −6.7737E−02 | −6.8396E−02 | −6.1780E−02 | −1.5497E−01 | −1.0334E−01 |
| A12 = | 2.0559E−02 | 1.7150E−02 | 1.9200E−02 | 5.9089E−02 | 4.2215E−02 |
| A14 = | −3.4189E−03 | −2.2941E−03 | −3.2068E−03 | −1.1684E−02 | −9.2182E−03 |
| A16 = | 2.4041E−04 | 1.4563E−04 | 2.3366E−04 | 9.2082E−04 | 8.2352E−04 |

In the 12th embodiment, the equation of the aspheric surface profiles of the aforementioned lens elements is the same as the equation of the 1st embodiment.

In the 12th embodiment, the first lens element 1210 has two critical points in an off-axial region of the image-side surface 1212 thereof. Two vertical distances between the two critical points and an optical axis are Yc12, a vertical distance between a maximum effective diameter position on an image-side surface 1212 of the first lens element 1210 and the optical axis is Y12, and they satisfy the condition: Yc12/Y12=0.76, and Yc12/Y12=0.78, respectively.

As the other definitions of these parameters shown in table below are the same as those stated in the 3rd embodiment with corresponding values for the 12th embodiment, an explanation in this regard will not be provided again.

Moreover, these parameters can be calculated from TABLE 23 and TABLE 24 and satisfy the conditions stated in table below.

| 12th Embodiment | | | |
|---|---|---|---|
| f [mm] | 9.26 | TD | 4.02 |
| Fno | 2.70 | TD/TP | 0.77 |
| HFOV [deg.] | 15.5 | \|f/f1\| + \|f/f2\| + \|f/f3\| + \|f/f4\| + \|f/f5\| | 10.29 |
| V3 + V5 | 45.3 | f/R5 | 1.12 |
| V4/V5 | 2.16 | f/R10 | 6.46 |
| BL/R10 | 5.04 | f/TD | 2.31 |
| (T12 + T23)/(T34 + T45) | 5.55 | f12/f345 | 16.98 |
| T12/T23 | 0.73 | \|f2\|/f1 | 0.80 |
| T23/CT3 | 0.25 | Y11/Y52 | 1.12 |

13th Embodiment

Figure 13A:
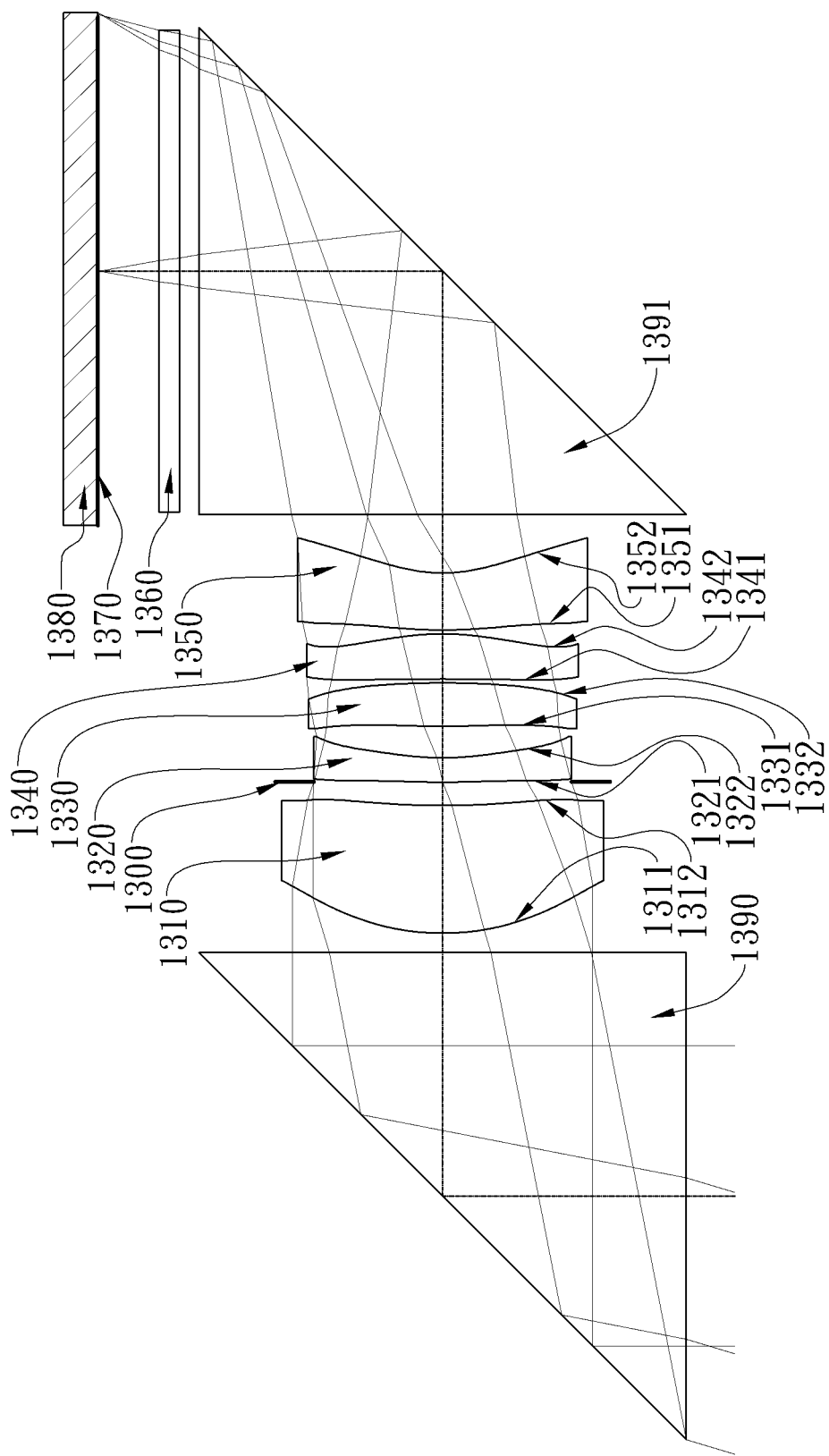
FIG. 13A is a schematic view of an imaging apparatus according to the 13th embodiment of the present disclosure.
Figure 13B:
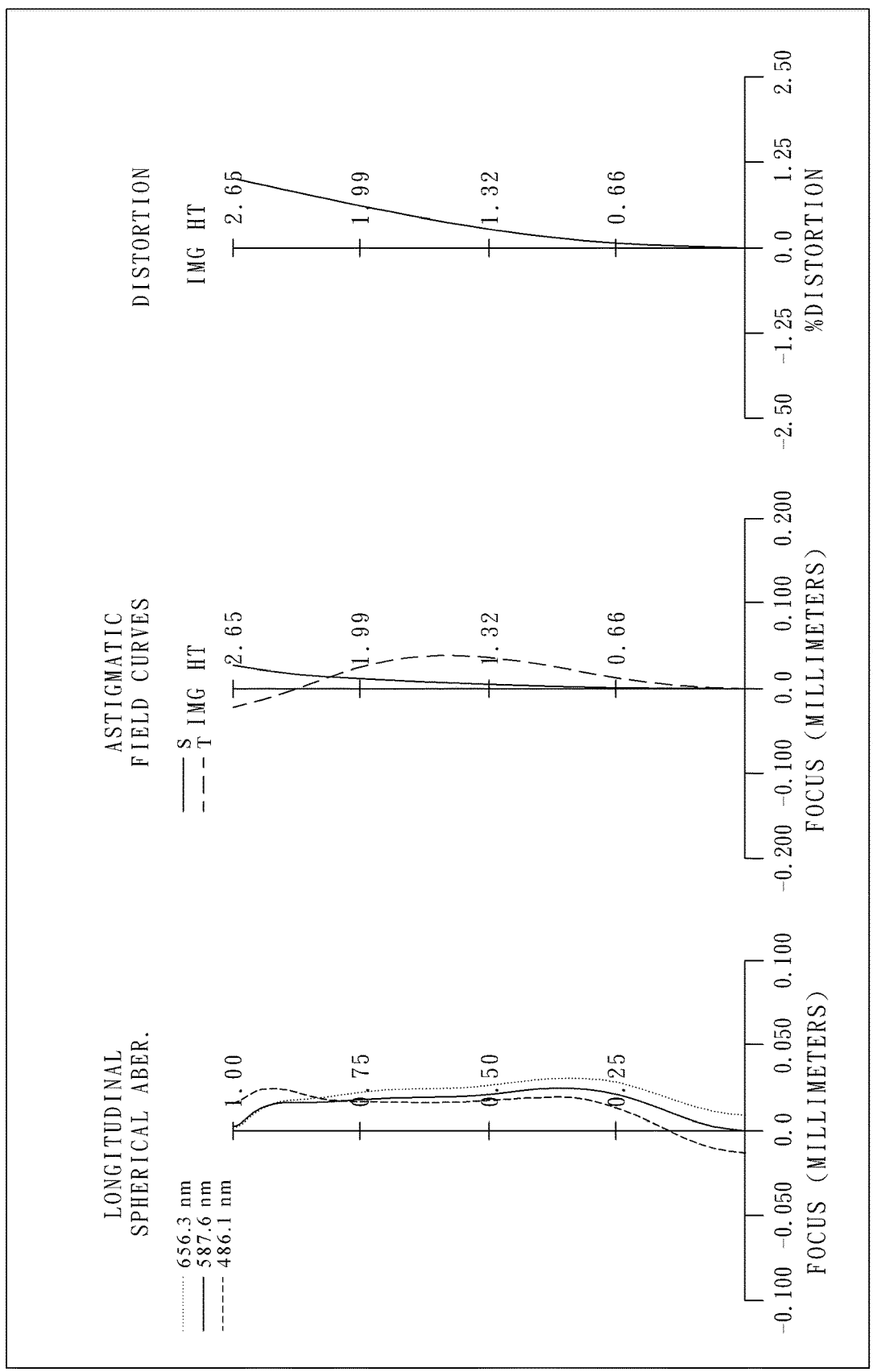
FIG. 13B shows longitudinal spherical aberration curves, astigmatic field curves and a distortion curve of the imaging apparatus according to the 13th embodiment.

FIG. 13A is a schematic view of an imaging apparatus according to the 13th embodiment of the present disclosure. FIG. 13B shows, in order from left to right, longitudinal spherical aberration curves, astigmatic field curves and a distortion curve of the imaging apparatus according to the 13th embodiment.

In FIG. 13A, the imaging apparatus includes an optical imaging system (not otherwise herein labeled) of the present disclosure and an image sensor 1380. The optical imaging system includes, in order from an object side to an image side, a first lens element 1310, an aperture stop 1300, a second lens element 1320, a third lens element 1330, a fourth lens element 1340, and a fifth lens element 1350. The optical imaging system includes five lens elements (1310, 1320, 1330, 1340 and 1350) without any other lens elements being inserted between the first lens element 1310 and the fifth lens element 1350.

The first lens element 1310 with positive refractive power has an object-side surface 1311 being convex in a paraxial region thereof, an image-side surface 1312 being concave in a paraxial region thereof, both the object-side surface 1311 and the image-side surface 1312 being aspheric, and one critical point in an off-axial region of the image-side surface 1312 thereof. The first lens element 1310 is made of glass material.

The second lens element 1320 with negative refractive power has an object-side surface 1321 being convex in a paraxial region thereof, an image-side surface 1322 being concave in a paraxial region thereof, and both the object-side surface 1321 and the image-side surface 1322 being aspheric. The second lens element 1320 is made of plastic material.

The third lens element 1330 with positive refractive power has an object-side surface 1331 being convex in a paraxial region thereof, an image-side surface 1332 being convex in a paraxial region thereof, and both the object-side surface 1331 and the image-side surface 1332 being aspheric. The third lens element 1330 is made of plastic material.

The fourth lens element 1340 with positive refractive power has an object-side surface 1341 being concave in a paraxial region thereof, an image-side surface 1342 being convex in a paraxial region thereof, and both the object-side surface 1341 and the image-side surface 1342 being aspheric. The fourth lens element 1340 is made of plastic material.

The fifth lens element 1350 with negative refractive power has an object-side surface 1351 being convex in a paraxial region thereof, an image-side surface 1352 being concave in a paraxial region thereof, both the object-side surface 1351 and the image-side surface 1352 being aspheric, and at least one inflection point on both the object-side surface 1351 and the image-side surface 1352 thereof. The fifth lens element 1350 is made of plastic material.

The optical imaging system further includes a reflective component 1390 disposed at an object side of the first lens element 1310, a reflective component 1391 located between the fifth lens element 1350 and an IR cut filter 1360, and the IR cut filter 1360 located between the reflective component 1391 and an image surface 1370. Both the reflective component 1390 and the reflective component 1391 are prisms. The reflective component 1390, the reflective component 1391 and the IR cut filter 1360 are all made of glass material and will not affect the focal length of the optical imaging system. The image sensor 1380 is disposed on or near the image surface 1370 of the optical imaging system.

The detailed optical data of the 13th embodiment are shown in TABLE 25, and the aspheric surface data are shown in TABLE 26, wherein the units of the curvature radius, the thickness and the focal length are expressed in mm, and HFOV is a half of the maximal field of view.

TABLE 25

(13th Embodiment)
f = 8.63 mm, Fno = 2.80, HFOV = 16.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Reflective Component (Prism) | Plano | | 5.000 | Glass | 1.517 | 64.2 | — |
| 2 | | Plano | | 0.200 | | | | |
| 3 | Lens 1 | 2.514 | ASP | 1.311 | Glass | 1.497 | 81.6 | 6.93 |
| 4 | | 7.685 | ASP | 0.244 | | | | |
| 5 | Ape. Stop | Plano | | −0.005 | | | | |
| 6 | Lens 2 | 6.806 | ASP | 0.250 | Plastic | 1.582 | 30.2 | −6.76 |
| 7 | | 2.462 | ASP | 0.325 | | | | |
| 8 | Lens 3 | 9.837 | ASP | 0.445 | Plastic | 1.582 | 30.2 | 8.20 |
| 9 | | −9.120 | ASP | 0.040 | | | | |
| 10 | Lens 4 | −18.525 | ASP | 0.464 | Plastic | 1.544 | 56.0 | 5.54 |
| 11 | | −2.617 | ASP | 0.040 | | | | |
| 12 | Lens 5 | 5.002 | ASP | 0.586 | Plastic | 1.566 | 37.4 | −4.16 |
| 13 | | 1.532 | ASP | 0.600 | | | | |
| 14 | Reflective Component (Prism) | Plano | | 5.000 | Glass | 1.517 | 64.2 | — |
| 15 | | Plano | | 0.200 | | | | |
| 16 | IR Cut Filter | Plano | | 0.210 | Glass | 1.517 | 64.2 | — |
| 17 | | Plano | | 0.623 | | | | |
| 18 | Image Surface | Plano | | — | | | | |

\* Reference wavelength is d-line 587.6 nm.
\* The effective radius of Surface 1 is 2.500 mm.

TABLE 26

Aspheric Coefficients

| Surface # | 3 | 4 | 6 | 7 | 8 |
|---|---|---|---|---|---|
| k = | −5.4272E−01 | −9.8612E+01 | −7.3457E+01 | −9.6813E+00 | −6.5422E+00 |
| A4 = | 1.7448E−03 | 9.3726E−03 | −1.2377E−01 | −1.2453E−01 | −4.9434E−02 |
| A6 = | 2.0474E−03 | −2.7056E−03 | 1.4078E−01 | 1.2648E−01 | −4.3786E−03 |
| A8 = | −2.5482E−03 | −3.3363E−03 | −7.8449E−02 | −4.9782E−02 | 2.1379E−02 |

TABLE 26-continued

| Aspheric Coefficients | | | | | |
|---|---|---|---|---|---|
| A10 = | 9.0922E−04 | −4.2243E−04 | 2.5884E−02 | 7.0570E−03 | −1.4491E−02 |
| A12 = | −1.9897E−04 | 2.8991E−04 | −4.6790E−03 | 3.1127E−03 | 4.2505E−03 |
| A14 = | | | 3.5024E−04 | −1.0729E−03 | −5.2894E−04 |
| A16 = | | | | 9.8220E−05 | 3.2343E−05 |

| Surface # | 9 | 10 | 11 | 12 | 13 |
|---|---|---|---|---|---|
| k = | −2.3193E+01 | −9.6418E+01 | −2.2204E+01 | −3.8593E+01 | −7.6938E+00 |
| A4 = | 3.5157E−02 | 7.4270E−02 | 2.2763E−02 | 3.9882E−02 | 5.3167E−02 |
| A6 = | −1.2133E−01 | −1.4870E−01 | −7.7349E−02 | −1.7675E−01 | −1.3189E−01 |
| A8 = | 1.2488E−01 | 1.4348E−01 | 1.0549E−01 | 2.2580E−01 | 1.5033E−01 |
| A10 = | −6.8992E−02 | −6.7685E−02 | −6.1029E−02 | −1.5469E−01 | −1.0380E−01 |
| A12 = | 2.0573E−02 | 1.7197E−02 | 1.9801E−02 | 5.9284E−02 | 4.2261E−02 |
| A14 = | −3.2905E−03 | −2.3366E−03 | −3.2134E−03 | −1.1652E−02 | −9.2246E−03 |
| A16 = | 2.2689E−04 | 1.3934E−04 | 2.1778E−04 | 9.3372E−04 | 8.3163E−04 |

In the 13th embodiment, the equation of the aspheric surface profiles of the aforementioned lens elements is the same as the equation of the 1st embodiment. Also, the definitions of these parameters shown in table below are the same as those stated in the 3rd embodiment with corresponding values for the 13th embodiment, an explanation in this regard will not be provided again.

Moreover, these parameters can be calculated from TABLE 25 and TABLE 26 and satisfy the conditions stated in table below.

| 13th Embodiment | | | |
|---|---|---|---|
| f [mm] | 8.63 | TD/TP | 0.74 |
| Fno | 2.80 | $|f/f1| + |f/f2| + |f/f3| +$ | 7.21 |
| | | $|f/f4| + |f/f5|$ | |
| HFOV [deg.] | 16.9 | f/R5 | 0.88 |
| V3 + V5 | 67.7 | f/R10 | 5.63 |
| V4/V5 | 1.50 | f/TD | 2.33 |
| BL/R10 | 4.33 | f12/f345 | 3.23 |
| (T12 + T23)/(T34 + T45) | 7.05 | $|f2|/f1$ | 0.98 |
| T12/T23 | 0.74 | Y11/Y52 | 1.11 |
| T23/CT3 | 0.73 | Yc12/Y12 | 0.86 |
| TD | 3.70 | | |

14th Embodiment

Figure 14A:
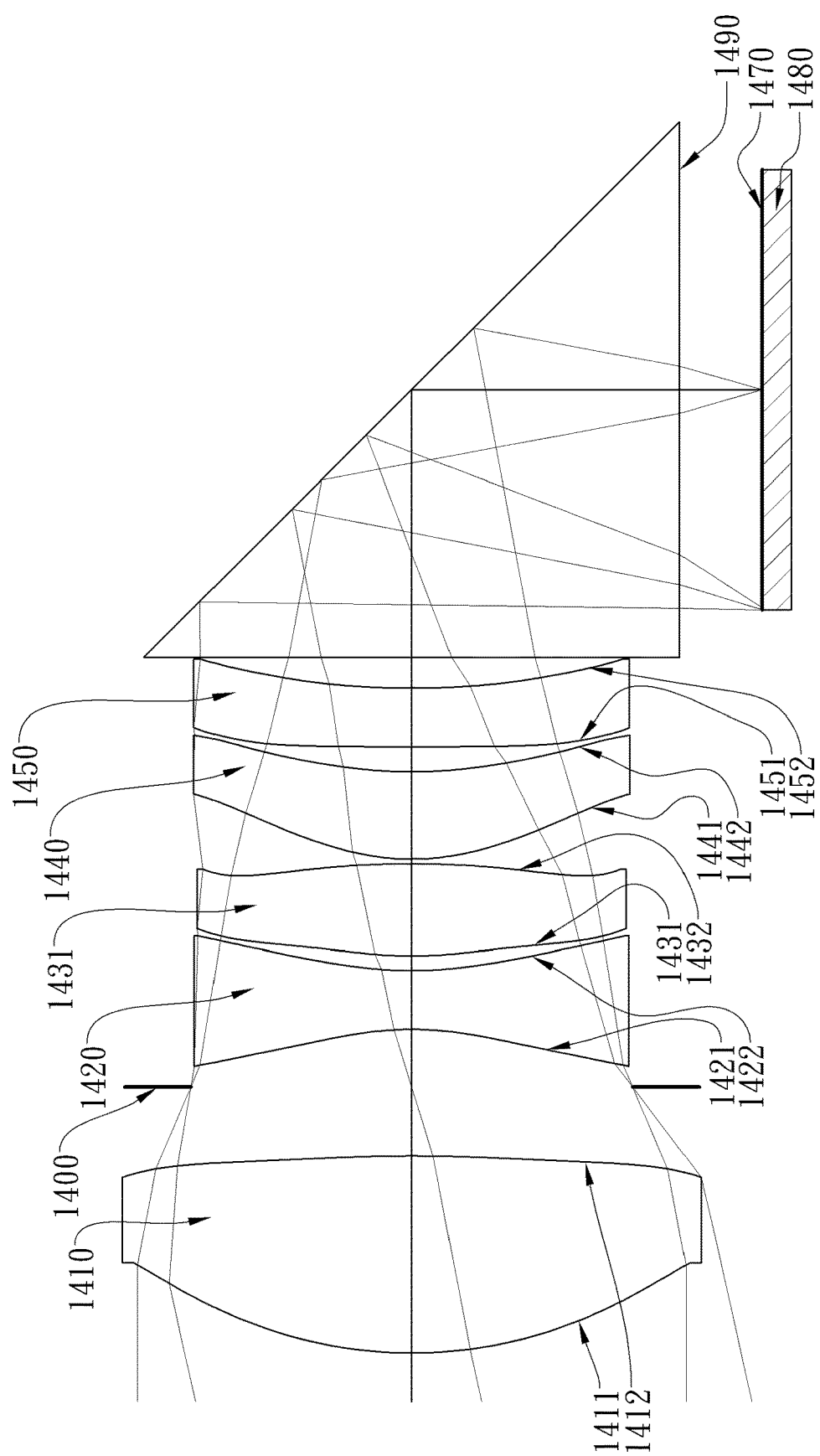
FIG. 14A is a schematic view of an imaging apparatus according to the 14th embodiment of the present disclosure.
Figure 14B:
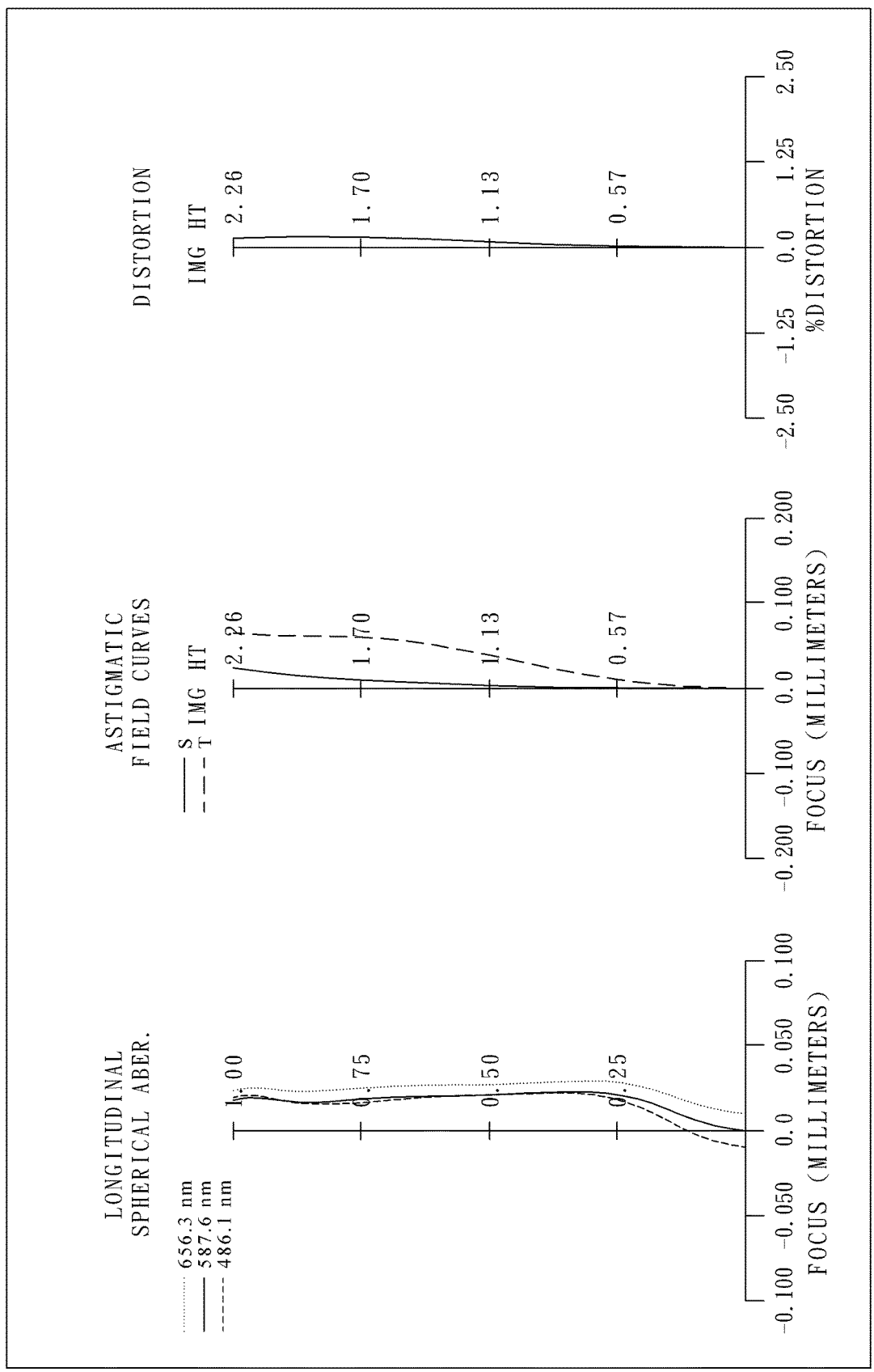
FIG. 14B shows longitudinal spherical aberration curves, astigmatic field curves and a distortion curve of the imaging apparatus according to the 14th embodiment.

FIG. 14A is a schematic view of an imaging apparatus according to the 14th embodiment of the present disclosure. FIG. 14B shows, in order from left to right, longitudinal spherical aberration curves, astigmatic field curves and a distortion curve of the imaging apparatus according to the 14th embodiment.

In FIG. 14A, the imaging apparatus includes an optical imaging system (not otherwise herein labeled) of the present disclosure and an image sensor 1480. The optical imaging system includes, in order from an object side to an image side, a first lens element 1410, an aperture stop 1400, a second lens element 1420, a third lens element 1430, a fourth lens element 1440, and a fifth lens element 1450. The optical imaging system includes five lens elements (1410, 1420, 1430, 1440 and 1450) without any other lens elements being inserted between the first lens element 1410 and the fifth lens element 1450.

The first lens element 1410 with positive refractive power has an object-side surface 1411 being convex in a paraxial region thereof, an image-side surface 1412 being convex in a paraxial region thereof, and both the object-side surface 1411 and the image-side surface 1412 being aspheric. The first lens element 1410 is made of plastic material.

The second lens element 1420 with negative refractive power has an object-side surface 1421 being concave in a paraxial region thereof, an image-side surface 1422 being concave in a paraxial region thereof, and both the object-side surface 1421 and the image-side surface 1422 being aspheric. The second lens element 1420 is made of plastic material.

The third lens element 1430 with positive refractive power has an object-side surface 1431 being convex in a paraxial region thereof, an image-side surface 1432 being convex in a paraxial region thereof, and both the object-side surface 1431 and the image-side surface 1432 being aspheric. The third lens element 1430 is made of plastic material.

The fourth lens element 1440 with positive refractive power has an object-side surface 1441 being convex in a paraxial region thereof, an image-side surface 1442 being concave in a paraxial region thereof, and both the object-side surface 1441 and the image-side surface 1442 being aspheric. The fourth lens element 1440 is made of plastic material.

The fifth lens element 1450 with negative refractive power has an object-side surface 1451 being convex in a paraxial region thereof, an image-side surface 1452 being concave in a paraxial region thereof, and both the object-side surface 1451 and the image-side surface 1452 being aspheric. The fifth lens element 1450 is made of plastic material.

The optical imaging system further includes a reflective component 1490 located between the fifth lens element 1450 and an image surface 1470. The reflective component 1490 is a prism made of glass material and will not affect the focal length of the optical imaging system. The image sensor 1480 is disposed on or near the image surface 1470 of the optical imaging system.

The detailed optical data of the 14th embodiment are shown in TABLE 27, and the aspheric surface data are shown in TABLE 28, wherein the units of the curvature radius, the thickness and the focal length are expressed in mm, and HFOV is a half of the maximal field of view.

TABLE 27

(14th Embodiment)
f = 10.13 mm, Fno = 1.80, HFOV = 12.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.538 | ASP | 2.021 | Plastic | 1.544 | 55.9 | 6.76 |
| 2 | | −16.317 | ASP | 0.710 | | | | |
| 3 | Ape. Stop | Plano | | 0.594 | | | | |
| 4 | Lens 2 | −2.930 | ASP | 0.600 | Plastic | 1.639 | 23.5 | −2.46 |
| 5 | | 3.668 | ASP | 0.152 | | | | |
| 6 | Lens 3 | 3.950 | ASP | 0.945 | Plastic | 1.639 | 23.5 | 4.53 |
| 7 | | −9.817 | ASP | 0.050 | | | | |
| 8 | Lens 4 | 2.493 | ASP | 0.897 | Plastic | 1.544 | 55.9 | 9.00 |
| 9 | | 4.435 | ASP | 0.255 | | | | |
| 10 | Lens 5 | 29.271 | ASP | 0.600 | Plastic | 1.544 | 55.9 | −20.82 |
| 11 | | 8.109 | ASP | 0.315 | | | | |
| 12 | Reflective Component (Prism) | Plano | | 5.500 | Glass | 1.517 | 64.2 | — |
| 13 | | | | 0.844 | | | | |
| 14 | Image Surface | Plano | | — | | | | |

\* Reference wavelength is d-line 587.6 nm.

TABLE 28

Aspheric Coefficients

| Surface # | 1 | 2 | 4 | 5 | 6 |
|---|---|---|---|---|---|
| k = | −3.1549E−01 | −5.6431E+00 | −1.1974E+01 | −1.7811E+01 | −2.4227E+01 |
| A4 = | 1.4476E−04 | 6.1391E−03 | 7.5899E−03 | | −1.9304E−02 |
| A6 = | 1.2335E−04 | −1.0859E−03 | −1.3797E−03 | | 4.2519E−03 |
| A8 = | −5.1173E−05 | 1.2296E−04 | 9.8001E−05 | | −3.3428E−05 |
| A10 = | 6.8148E−06 | −1.1758E−05 | | | −1.8547E−05 |
| A12 = | −4.6246E−07 | 4.0921E−07 | | | |

| Surface # | 7 | 8 | 9 | 10 | 11 |
|---|---|---|---|---|---|
| k = | −1.4371E+01 | −4.8899E+00 | −1.1048E+01 | −9.0000E+01 | −9.0000E+01 |
| A4 = | −4.2175E−03 | 1.2362E−02 | −1.5338E−02 | −2.3229E−02 | 1.5410E−02 |
| A6 = | 1.3873E−03 | −3.2599E−03 | 1.7273E−02 | 2.5316E−02 | −3.5560E−03 |
| A8 = | 2.3709E−04 | 1.7076E−04 | −8.6137E−03 | −1.2584E−02 | 4.2081E−04 |
| A10 = | | | 2.2557E−03 | 3.7538E−03 | −1.4338E−05 |
| A12 = | | | −2.4665E−04 | −5.8835E−04 | |
| A14 = | | | −6.1107E−06 | 3.6697E−05 | |
| A16 = | | | 2.2475E−06 | | |

In the 14th embodiment, the equation of the aspheric surface profiles of the aforementioned lens elements is the same as the equation of the 1st embodiment. Also, the definitions of these parameters shown in table below are the same as those stated in the 1st embodiment with corresponding values for the 14th embodiment, an explanation in this regard will not be provided again.

Moreover, these parameters can be calculated from TABLE 27 and TABLE 28 and satisfy the conditions stated in table below.

| 14th Embodiment | | | |
|---|---|---|---|
| f [mm] | 10.13 | TD | 6.82 |
| Fno | 1.80 | |f/f1| + |f/f2| + |f/f3| + |f/f4| + |f/f5| | 9.46 |
| HFOV [deg.] | 12.5 | f/R5 | 2.56 |
| V3 + V5 | 79.4 | f/R10 | 1.25 |
| V4/V5 | 1.00 | f/TD | 1.48 |
| BL/R10 | 0.82 | f12/f345 | −2.98 |
| (T12 + T23)/(T34 + T45) | 4.77 | |f2|/f1 | 0.36 |
| T12/T23 | 8.58 | Y11/Y52 | 1.45 |
| T23/CT3 | 0.16 | | |

15th Embodiment

Figure 17A:
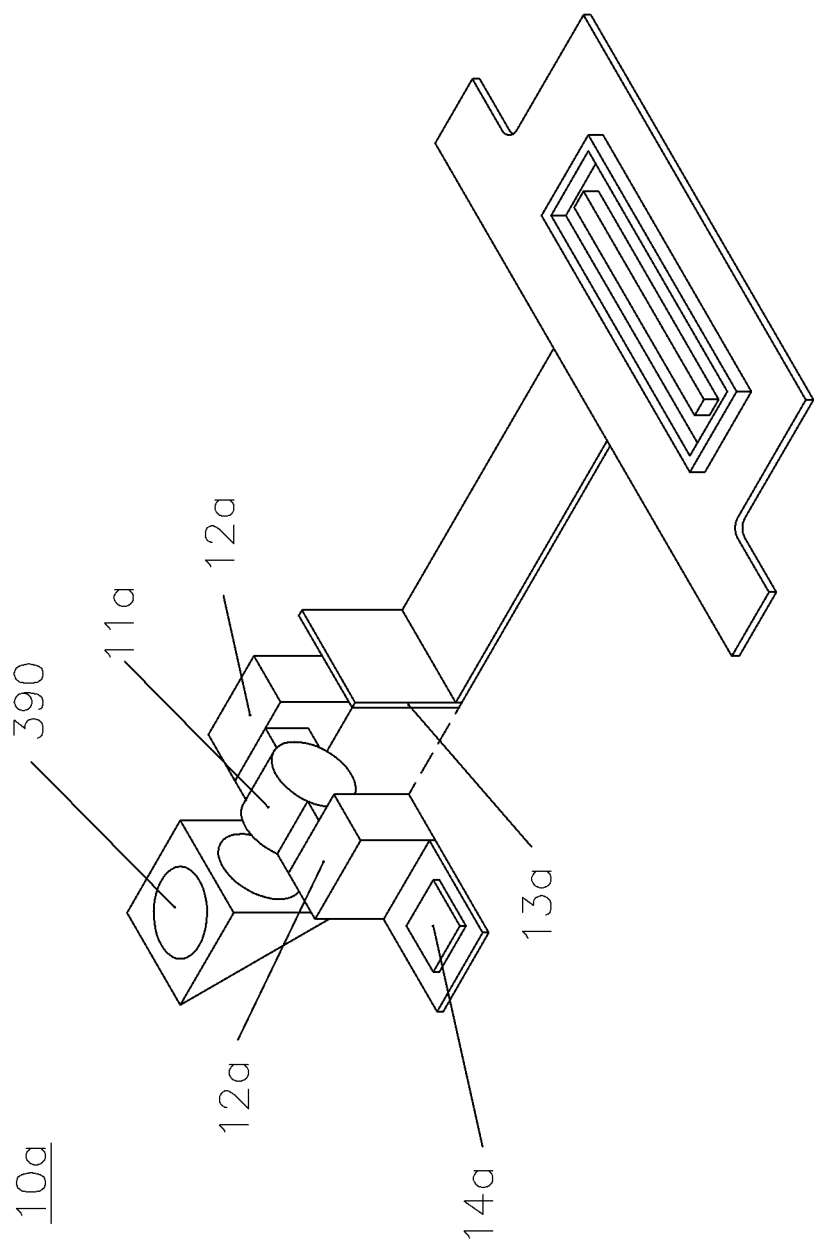
FIG. 17A is a 3-dimensional schematic view of an imaging apparatus according to the 15th embodiment.

FIG. 17A is a 3-dimensional schematic view of an imaging apparatus 10a according to the 15th embodiment. In the present embodiment, the imaging apparatus 10a is a camera module. The imaging apparatus 10a includes an image lens 11a, a driving device 12a, and an image sensor 13a. The image lens 11a includes the optical imaging system of the 3th embodiment described above (the reflective component 390 is disposed at the object side of the image lens 11a), and a lens barrel (not otherwise herein labeled) for carrying the optical imaging system. The imaging apparatus 10a retrieves the light and renders an image by using the image lens 11a, using the driving device 12a to adjust the focus to make the object 30 (Please refer to FIG. 18B) imaged on the image sensor 13a, and outputs the image data thereafter.

The driving device 12a may be an auto-focus model that can be driven by a voice coil motor (VCM), a micro electro-mechanical system (MEMS), a piezoelectric system, shape memory metal and other driving systems. The driving device 12a allows the image lens 11a to obtain a better imaging position, providing a clear image wherever an object 30 (Please refer to FIG. 18B) being positioned with different object distances.

The imaging apparatus 10a may be configured to equip an image sensor 13a (e.g., CMOS, CCD) with high sensitivity and low noise on the image surface of the optical imaging system to truly provide the satisfactory image quality obtained from the optical imaging system.

In addition, the imaging apparatus 10a may further include an image stabilizer 14a, which may be a dynamic sensing element such as accelerometer, a gyroscope or a Hall effect sensor. The image stabilizer 14a in the 15th embodiment is a gyroscope but not limited. By adjusting the optical imaging system in different axial directions to provide a compensation for the blurred image due to shaking in a shooting moment, the image quality under dynamic and low-light scenes can further be improved and the enhanced image compensation function such as optical image stabilization (OIS) or electronic image stabilization (EIS) can also be provided.

16th Embodiment

Figure 17B:
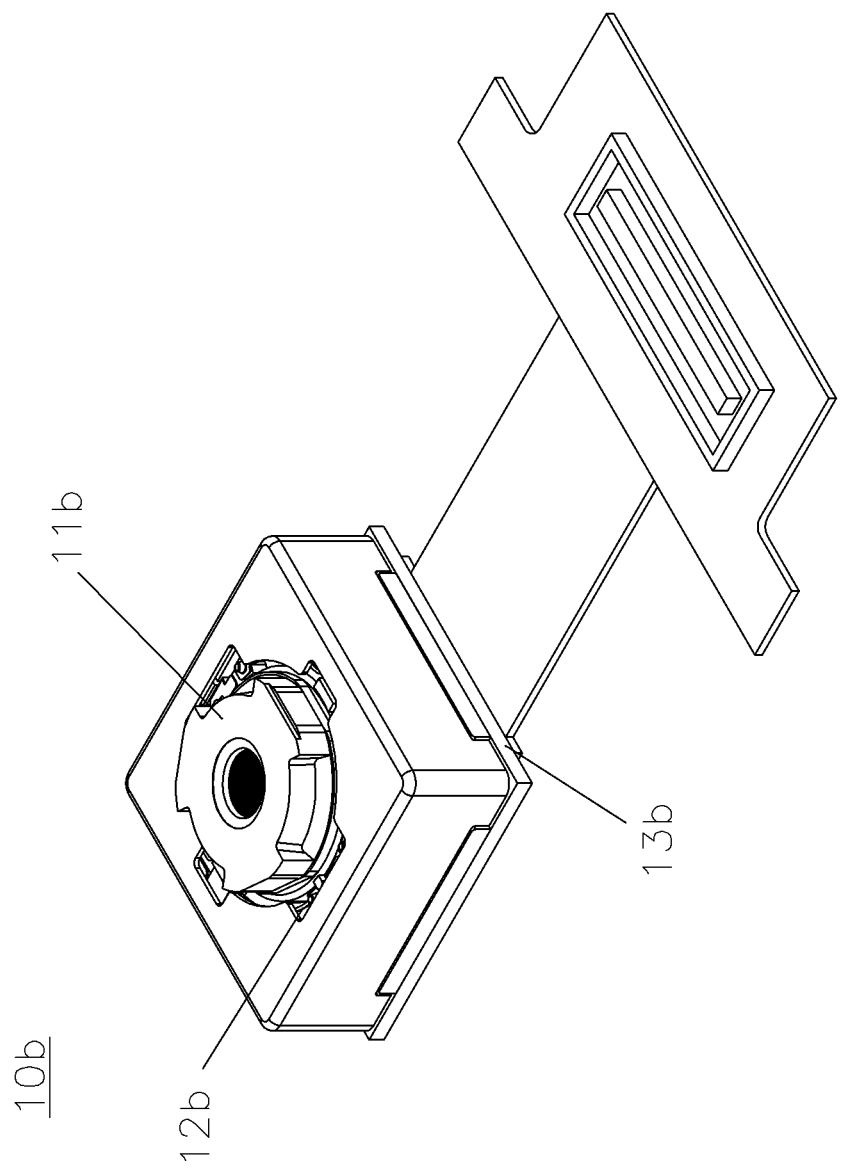
FIG. 17B is a 3-dimensional schematic view of an imaging apparatus according to the 16th embodiment.

FIG. 17B is a 3-dimensional schematic view of an imaging apparatus 10b according to the 16th embodiment. In the present embodiment, the imaging apparatus 10b is a camera module. The imaging apparatus 10b includes a wide angle image lens 11b, a driving device 12b, and an image sensor 13b. The wide angle image lens 11b includes a lens barrel (not otherwise labeled) for carrying the optical imaging system. The functions of other components are the same as the 15th embodiment and thus an explanation in this regard will not be provided again.

17th Embodiment

Figure 18A:
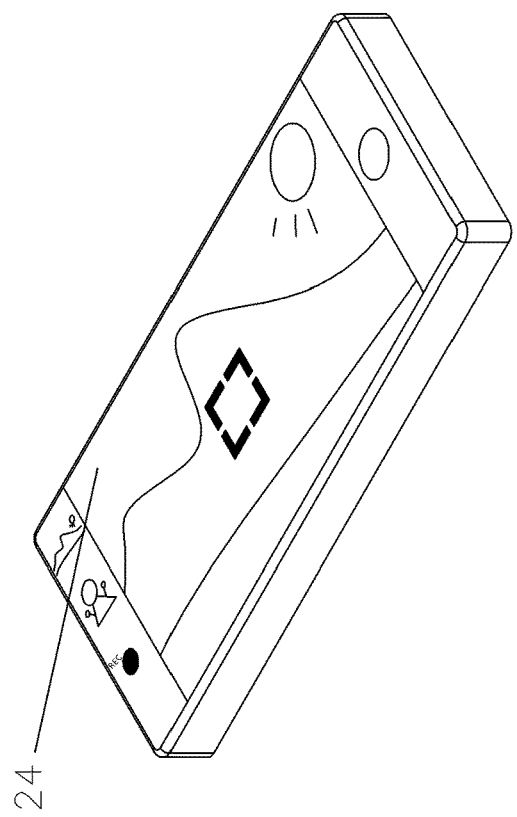
FIG. 18A is a 3-dimensional schematic view of an electronic device according to the 17th embodiment.
Figure 18A:
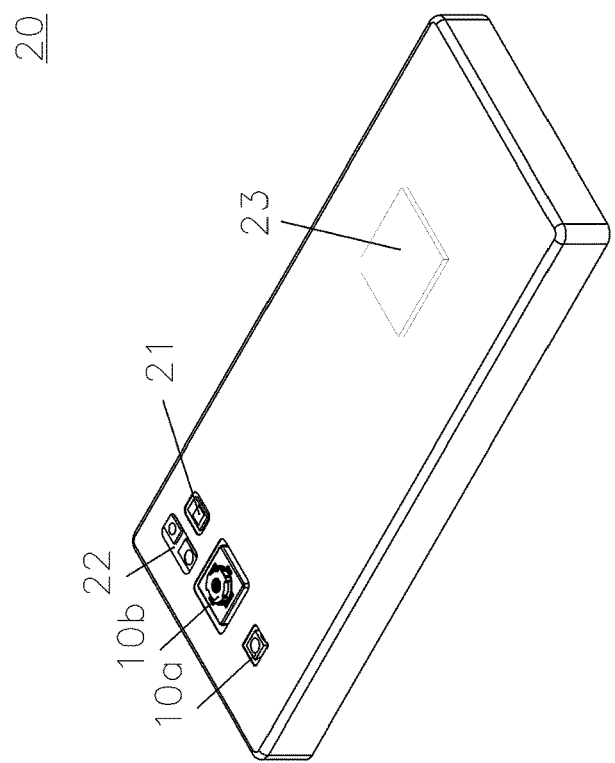
Figure 18B:
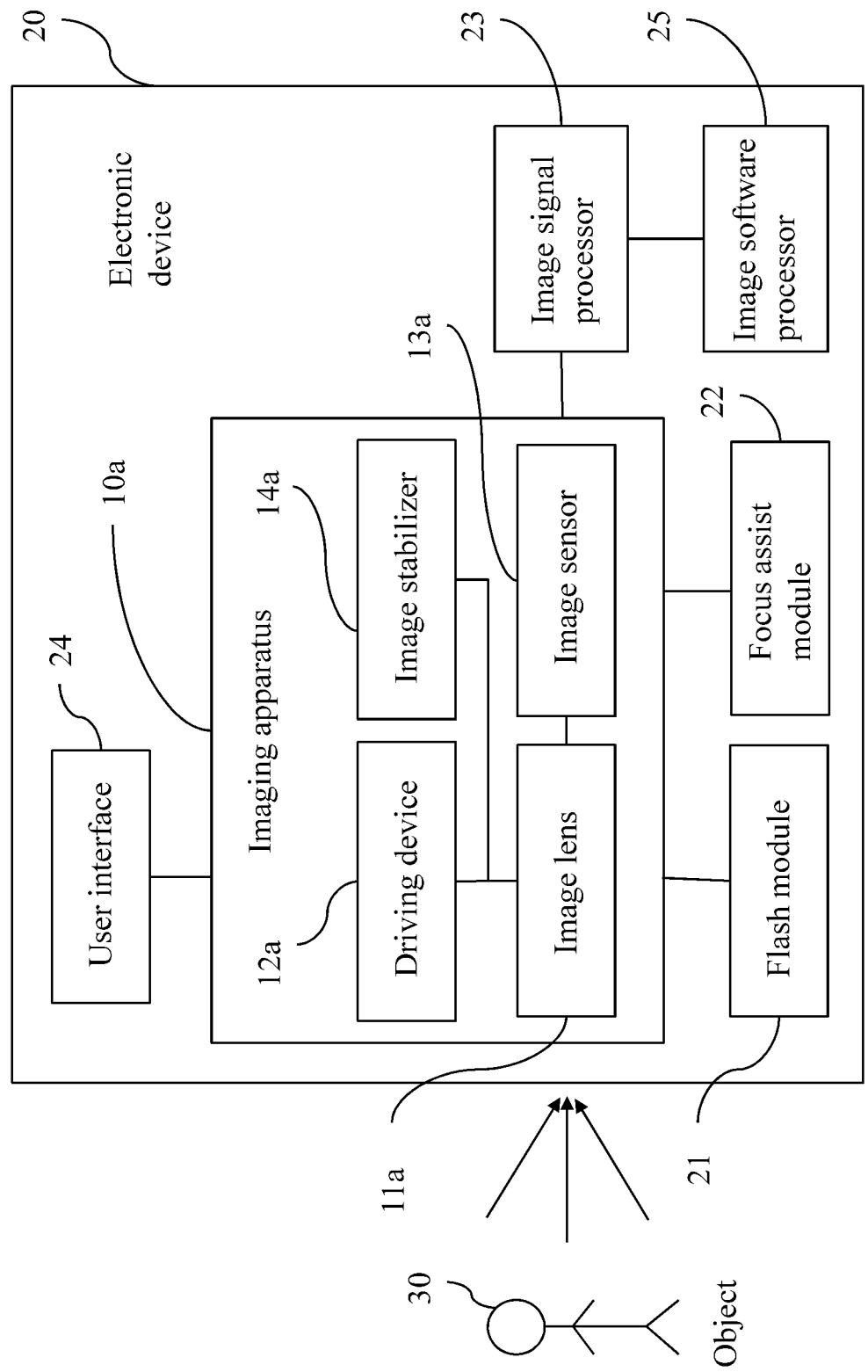
FIG. 18B is a schematic view of the electronic device according to the 17th embodiment.

Please refer to FIG. 18A and FIG. 18B. FIG. 18A is a 3-dimensional schematic view of an electronic device according to the 17th embodiment. FIG. 18B is a schematic view of the electronic device according to the FIG. 18A. In the present embodiment, the electronic device 20 is a smart phone. The electronic device 20 includes an imaging apparatus 10a of the 15th embodiment, a flash module 21, a focus assist module 22, an image signal processor 23, a user interface 24, and an image software processor 25.

When a user shoots an object 30 through the user interface 24, the electronic device 20 retrieves the light and renders an image via the imaging apparatus 10a, triggering the flash module 21 to compensate the light, and focuses instantly according to the distance information of the object 30 provided by the focus assist module 22. The images are further optimized by the image signal processor 23 to further enhance the image quality generated by the optical imaging system. The focus assist module 22 may adopt an infrared ray or laser focus assist system to achieve quick focusing. The user interface 24 may use a touch screen or a physical shooting button cooperated with various functions of the image software processor 25 to perform image capturing and image processing. In the present embodiment, the electronic device 20 further includes an imaging apparatus 10b of the 16th embodiment, where the imaging apparatus 10a is a telescope lens and the imaging apparatus 10b is a wide angle image lens but not limited. For example, both the imaging apparatus 10a and 10b may be telescope lenses.

The imaging apparatus 10a of the present disclosure is not limited to be applied to the smart phone. The imaging apparatus 10a may be used in a system of moving focus and features in both excellent aberration correction and satisfactory image quality. For example, the imaging apparatus 10a may be applied to a variety of applications such as smart electronic products, tablet computers, wearable devices, medical devices, precision instruments, surveillance cameras, portable video recorders, identification systems, multi-lens devices, somatosensory detections, virtual realities, motion devices, home intelligent auxiliary systems and other electronic devices. The aforementioned electronic apparatus is merely exemplary of practical use of the present disclosure and does not limit the scope of application of the imaging apparatus of the present disclosure.

The foregoing description, for purpose of explanation, has been described with reference to specific embodiments. It is to be noted that TABLES 1-28 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging system, comprising five lens elements, the five lens elements being, in order from an object side to an image side:
   a first lens element having positive refractive power;
   a second lens element having negative refractive power;
   a third lens element having positive refractive power;
   a fourth lens element having positive refractive power; and
   a fifth lens element having negative refractive power,
   wherein an Abbe number of the third lens element is V3, an Abbe number of the fifth lens element is V5, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the following conditions are satisfied:

$20.0 < V3 + V5 < 70.0$;

$4.4 < (T12 + T23)/(T34 + T45) < 25$;

$0.05 < T12/T23 < 3.3$.

2. The optical imaging system of claim 1, wherein the axial distance between the first lens element and the second lens element is T12, the axial distance between the second lens element and the third lens element is T23, and the following condition is satisfied:

$0.19 < T12/T23 < 3.3$.

3. The optical imaging system of claim 1, wherein a focal length of the optical imaging system is f, a curvature radius of an object-side surface of the third lens element is R5, and the following condition is satisfied:

$$1.5 < f/R5 < 5.5.$$

4. The optical imaging system of claim 1, wherein an axial distance between an image-side surface of the fifth lens element and an image surface is BL, a curvature radius of the image-side surface of the fifth lens element is R10, and the following condition is satisfied:

$$3.0 < BL/R10.$$

5. The optical imaging system of claim 1, wherein a focal length of the optical imaging system is f, a focal length of the first lens element is f1, a focal length of the second lens element is f2, a focal length of the third lens element is f3, a focal length of the fourth lens element is f4, a focal length of the fifth lens element is f5 and the following condition is satisfied:

$$8.0 < |f/f1| + |f/f2| + |f/f3| + |f/f4| + |f/f5| < 20.0.$$

6. The optical imaging system of claim 1, wherein a focal length of the optical imaging system is f, an axial distance between an object-side surface of the first lens element and an image-side surface of the fifth lens element is TD, and the following condition is satisfied:

$$1.40 < f/TD.$$

7. The optical imaging system of claim 1, wherein a focal length of the first lens element is f1, a focal length of the second lens element is f2, the following condition is satisfied:

$$|f2|/f1 < 1.0.$$

8. The optical imaging system of claim 1, wherein a vertical distance between a maximum effective diameter position on an object-side surface of the first lens element and an optical axis is Y11, a vertical distance between a maximum effective diameter position on an image-side surface of the fifth lens element and the optical axis is Y52, and the following condition is satisfied:

$$0.80 < Y11/Y52 < 1.50.$$

9. The optical imaging system of claim 1, wherein at least three lens elements among the first lens element, the second lens element, the third lens element, the fourth lens element and the fifth lens element have an Abbe number less than 40.0.

10. The optical imaging system of claim 1, wherein the first lens element has at least one critical point in an off-axial region of an image-side surface thereof, a vertical distance between the at least one critical point and an optical axis is Yc12, a vertical distance between a maximum effective diameter position on the image-side surface of the first lens element and the optical axis is Y12, and the following condition is satisfied:

$$0.60 < Yc12/Y12 < 1.0.$$

11. The optical imaging system of claim 1, wherein the fifth lens element has at least one inflection point on at least one surface of an object-side surface and an image-side surface thereof.

12. The optical imaging system of claim 1, further comprising at least one reflective component disposed at an object side of the first lens element.

13. The optical imaging system of claim 12, wherein the at least one reflective component is a prism, an axial distance between an object-side surface of the first lens element and an image-side surface of the fifth lens element is TD, a total length of internal optical paths of the prism is TP, and the following condition is satisfied:

$$0.20 < TD/TP < 1.35.$$

14. An imaging apparatus, comprising the optical imaging system of claim 1 and an image sensor disposed on an image surface of the optical imaging system.

15. An electronic device, comprising the imaging apparatus of claim 14.

16. An optical imaging system, comprising five lens elements, the five lens elements being, in order from an object side to an image side:
   a first lens element having positive refractive power;
   a second lens element with negative refractive power having an image-side surface being concave in a paraxial region thereof;
   a third lens element with positive refractive power having an object-side surface being convex in a paraxial region thereof;
   a fourth lens element having positive refractive power; and
   a fifth lens element having negative refractive power having an image-side surface being concave in a paraxial region thereof,
   wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the optical imaging system is f, a curvature radius of the object-side surface of the third lens element is R5, and the following conditions are satisfied:

$$4.4 < (T12+T23)/(T34+T45) < 100;$$

$$0.19 < T12/T23 < 9.7;$$

$$0.22 < f/R5 < 8.0.$$

17. The optical imaging system of claim 16, wherein the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, and the following condition is satisfied:

$$4.4 < (T12+T23)/(T34+T45) < 25.$$

18. The optical imaging system of claim 16, wherein the focal length of the optical imaging system is f, the curvature radius of the object-side surface of the third lens element is R5, and the following condition is satisfied:

$$1.5 < f/R5 < 5.5.$$

19. The optical imaging system of claim 16, wherein the focal length of the optical imaging system is f, a curvature radius of the image-side surface of the fifth lens element is R10, and the following condition is satisfied:

$$4.0 < f/R10 < 10.$$

20. The optical imaging system of claim 16, wherein an Abbe number of the fourth lens element is V4, an Abbe number of the fifth lens element is V5, and the following condition is satisfied:

$1.3<V4/V5.$

21. The optical imaging system of claim 16, wherein an axial distance between the image-side surface of the fifth lens element and an image surface is BL, a curvature radius of the image-side surface of the fifth lens element is R10, and the following condition is satisfied:

$3.0<BL/R10.$

22. The optical imaging system of claim 16, wherein the focal length of the optical imaging system is f, a focal length of the first lens element is f1, a focal length of the second lens element is f2, a focal length of the third lens element is f3, a focal length of the fourth lens element is f4, a focal length of the fifth lens element is f5, and the following condition is satisfied:

$8.0<|f/f1|+|f/f2|+|f/f3|+|f/f4|+|f/f5|<20.0.$

23. The optical imaging system of claim 16, wherein the focal length of the optical imaging system is f, an axial distance between an object-side surface of the first lens element and the image-side surface of the fifth lens element is TD, and the following condition is satisfied:

$1.40<f/TD.$

24. The optical imaging system of claim 16, wherein a focal length of the first lens element is f1, a focal length of the second lens element is f2, the following condition is satisfied:

$|f2|/f1<1.0.$

25. The optical imaging system of claim 16, wherein a vertical distance between a maximum effective diameter position on an object-side surface of the first lens element and an optical axis is Y11, a vertical distance between a maximum effective diameter position on the image-side surface of the fifth lens element and the optical axis is Y52, and the following condition is satisfied:

$0.80<Y11/Y52<1.50.$

26. The optical imaging system of claim 16, wherein an axial distance between an object-side surface of the first lens element and the image-side surface of the fifth lens element is TD, and the following condition is satisfied:

$TD<7$ mm.

27. The optical imaging system of claim 16, wherein the first lens element has at least one critical point in an off-axial region of an image-side surface thereof, a vertical distance between the at least one critical point and an optical axis is Yc12, a vertical distance between a maximum effective diameter position on the image-side surface of the first lens element and the optical axis is Y12, and the following condition is satisfied:

$0.60<Yc12/Y12<1.0.$

28. The optical imaging system of claim 16, wherein the fifth lens element has at least one inflection point on at least one surface of an object-side surface and an image-side surface thereof.

29. The optical imaging system of claim 16, further comprising at least one reflective component disposed at an object side of the first lens element.

30. The optical imaging system of claim 29, wherein the at least one reflective component is a prism, an axial distance between an object-side surface of the first lens element and the image-side surface of the fifth lens element is TD, a total length of internal optical paths of the prism is TP, and the following condition is satisfied:

$0.20<TD/TP<1.35.$

31. An imaging apparatus, comprising the optical imaging system of claim 16 and an image sensor disposed on an image surface of the optical imaging system.

32. An electronic device, comprising the imaging apparatus of claim 31.

33. An optical imaging system, comprising five lens elements, the five lens elements being, in order from an object side to an image side:
a first lens element having positive refractive power;
a second lens element having negative refractive power;
a third lens element having positive refractive power;
a fourth lens element having positive refractive power; and
a fifth lens element having negative refractive power,
wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a central thickness of the third lens element is CT3, a composite focal length of the first lens element and the second lens element is f12, a composite focal length of the third lens element, the fourth lens element and the fifth lens element is f345, and the following conditions are satisfied:

$2.7<(T12+T23)/(T34+T45)<100;$ $0.50<T23/CT3<1.24;$ $-5.5<f12/f345<0.$

34. The optical imaging system of claim 33, wherein the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, and the following condition is satisfied:

$4.4<(T12+T23)/(T34+T45)<20.$

35. The optical imaging system of claim 33, wherein the composite focal length of the first lens element and the second lens element is f12, the composite focal length of the third lens element, the fourth lens element and the fifth lens element is f345, and the following condition is satisfied:

$-2.5<f12/f345<-0.58.$

36. The optical imaging system of claim 33, wherein an axial distance between an image-side surface of the fifth lens element and an image surface is BL, a curvature radius of the image-side surface of the fifth lens element is R10, and the following condition is satisfied:

$3.0<BL/R10.$

37. The optical imaging system of claim 33, wherein a focal length of the optical imaging system is f, a focal length of the first lens element is f1, a focal length of the second lens element is f2, a focal length of the third lens element is f3, a focal length of the fourth lens element is f4, a focal length of the fifth lens element is f5, and the following condition is satisfied:

$$8.0<|f/f1|+|f/f2|+|f/f3|+|f/f4|+|f/f5|<20.0.$$

38. The optical imaging system of claim 33, wherein at least three lens elements among the first lens element, the second lens element, the third lens element, the fourth lens element and the fifth lens element have an Abbe number less than 40.0.

39. An optical imaging system, comprising five lens elements, the five lens elements being, in order from an object side to an image side:
 a first lens element having positive refractive power;
 a second lens element having negative refractive power;
 a third lens element having positive refractive power;
 a fourth lens element having positive refractive power; and
 a fifth lens element having negative refractive power,
 wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the optical imaging system is f, a curvature radius of an image-side surface of the fifth lens element is R10, and the following conditions are satisfied:

$$4.4<(T12+T23)/(T34+T45)<20;$$

$$4.0<f/R10<10.$$

40. The optical imaging system of claim 39, wherein the fifth lens element has the image-side surface being concave in a paraxial region thereof, and at least one inflection point on at least one surface of an object-side surface and the image-side surface thereof.

* * * * *